(12) United States Patent
Chevrier et al.

(10) Patent No.: US 10,260,984 B2
(45) Date of Patent: Apr. 16, 2019

(54) SPOOL MANAGEMENT SYSTEM AND METHOD OF USE THEREOF

(71) Applicant: PLOMBCO INC., Salaberry-de-Valleyfield (CA)

(72) Inventors: Maxime Chevrier, Saint-Michel (CA); Mathieu Pare, Beauharnois (CA); Stephane Boulet, St-Urbain-Premier (CA); Lorrain Boulerice, Saint-Chrysostome (CA); Denis Legault, Salaberry-de-Valleyfield (CA); Jean Prevost, Notre-Dame-de-l'île-Perrot (CA)

(73) Assignee: Plombco Inc., Valleyfield, Quebec (CA)

( * ) Notice: Subject to any disclaimer, the term of this patent is extended or adjusted under 35 U.S.C. 154(b) by 175 days.

(21) Appl. No.: 15/238,827

(22) Filed: Aug. 17, 2016

(65) Prior Publication Data
US 2017/0247221 A1 Aug. 31, 2017

Related U.S. Application Data

(63) Continuation of application No. 15/056,445, filed on Feb. 29, 2016.

(51) Int. Cl.
*G01M 1/36* (2006.01)
*G01M 1/32* (2006.01)
(Continued)

(52) U.S. Cl.
CPC ............ *G01M 1/326* (2013.01); *B65H 49/32* (2013.01); *B65H 75/14* (2013.01); *B65H 75/182* (2013.01); *B65H 75/44* (2013.01); *B65H 2701/37* (2013.01)

(58) Field of Classification Search
CPC ...... B65H 75/44; B65H 75/14; B65H 75/182; B65H 2701/37; B65H 49/32;
(Continued)

(56) References Cited

U.S. PATENT DOCUMENTS

| 2,703,684 A | 3/1955 | Warfield |
|---|---|---|
| 3,121,193 A | 2/1964 | Engelsted |

(Continued)

FOREIGN PATENT DOCUMENTS

| DE | 000019922085 | 12/2000 |
|---|---|---|
| DE | 19922085 | 12/2000 |

(Continued)

OTHER PUBLICATIONS

International Search Report of PCT/EP2014/050912, published in Jul. 2009 by Pieter Jan Kramer officer of the European Patent Office.
(Continued)

*Primary Examiner* — Harshad R Patel
*Assistant Examiner* — Nigel H Plumb
(74) *Attorney, Agent, or Firm* — Mathieu Audet

(57) ABSTRACT

A spool-supplying apparatus for managing a plurality of spools is presented and is comprising a spool support frame, a spool-supporting axle secured in cantilever, at a first end thereof, to the spool support frame, the spool-supporting axle being configured to support a plurality of axially-supported spools thereon, the plurality of spools axially engaging the spool-supporting axle through a second end thereof, and a spool unwinder operatively associated with the spool-supplying apparatus for unwinding a spool, the spool unwinder being configured to rotatably engage a first spool from the second end of the spool-supporting axle. A method of using the spool-supplying apparatus is also presented.

20 Claims, 49 Drawing Sheets

(51) Int. Cl.
  *B65H 75/14* (2006.01)
  *B65H 75/18* (2006.01)
  *B65H 75/44* (2006.01)
  *B65H 49/32* (2006.01)

(58) Field of Classification Search
  CPC .......... G01M 1/326; G01M 1/04; G01M 1/32; G01M 1/16; F16F 15/32
  See application file for complete search history.

(56) References Cited

U.S. PATENT DOCUMENTS

| | | | |
|---|---|---|---|
| 3,190,004 A * | 6/1965 | Land | B65H 35/0093 242/594.4 |
| 3,298,730 A | 1/1967 | Soley | |
| 3,319,989 A | 5/1967 | Ross | |
| 3,452,310 A | 6/1969 | Israelson | |
| 4,101,095 A | 7/1978 | Carter | |
| 4,250,478 A | 2/1981 | Cardone | |
| 4,297,930 A | 11/1981 | Putzke | |
| 5,134,766 A | 8/1992 | Miller | |
| 5,195,236 A | 3/1993 | Miechowicki | |
| 5,382,935 A | 1/1995 | Doyelle | |
| 5,435,613 A | 7/1995 | Jung | |
| 5,531,399 A | 7/1996 | Weisburn | |
| 5,676,332 A | 10/1997 | Kraus | |
| 5,775,634 A | 7/1998 | Fettes | |
| 5,992,232 A | 11/1999 | Saitoh | |
| 6,290,164 B1 | 9/2001 | O'Connor | |
| 6,616,089 B2 | 9/2003 | Gross | |
| 6,857,595 B1 | 2/2005 | Schaefer | |
| 6,862,933 B2 | 3/2005 | Gross | |
| 7,108,222 B1 | 9/2006 | Schaefer | |
| 7,134,333 B2 | 11/2006 | Gross | |
| 7,614,582 B2 | 11/2009 | Hafner | |
| 7,931,342 B2 | 4/2011 | Spaulding | |
| 8,256,481 B2 | 9/2012 | Lammlein | |
| 8,336,379 B2 | 12/2012 | Rogalla | |
| 8,505,423 B2 | 8/2013 | Hedtke | |
| 8,561,464 B2 | 10/2013 | Peinelt | |
| 8,769,807 B2 | 7/2014 | Lawson | |
| 8,943,940 B2 | 2/2015 | Hedtke, Jr. | |
| 9,290,289 B2 | 3/2016 | Hedtke, Jr. | |
| 2003/0085315 A1 | 5/2003 | Rodriguez | |
| 2004/0094263 A1 | 5/2004 | Middelstadt | |
| 2005/0229702 A1 | 10/2005 | Haydu | |
| 2006/0016309 A1 | 1/2006 | Spaulding | |
| 2006/0076359 A1 | 4/2006 | Gross | |
| 2008/0135676 A1 | 6/2008 | Hafner | |
| 2008/0272225 A1 | 11/2008 | Hein | |
| 2010/0058859 A1 * | 3/2010 | Rogalla | G01M 1/326 73/470 |
| 2010/0154611 A1 | 6/2010 | Lammlein | |
| 2010/0175522 A1 | 7/2010 | Hedtke | |
| 2011/0197672 A1 | 8/2011 | Peinelt | |
| 2011/0283790 A1 * | 11/2011 | Hedtke, Jr. | B26D 5/20 73/468 |
| 2012/0073764 A1 | 3/2012 | Lawson | |
| 2013/0320686 A1 | 12/2013 | Morton | |
| 2014/0000432 A1 * | 1/2014 | Hedtke, Jr. | B26D 3/08 83/865 |
| 2014/0367050 A1 | 12/2014 | Hans-Ulrich Burgel | |
| 2015/0027225 A1 | 1/2015 | Rogalla | |
| 2015/0090032 A1 | 4/2015 | Hedtke, Jr. | |
| 2016/0193745 A1 | 7/2016 | Hedtke, Jr. | |

FOREIGN PATENT DOCUMENTS

| | | |
|---|---|---|
| EP | 1253414 | 11/2005 |
| EP | 1124123 | 7/2008 |
| EP | 2757284 | 7/2014 |
| WO | WO2015168106 | 11/2015 |

OTHER PUBLICATIONS

Written Opinion of the International searching Authority of PCT/EP2014/050912, published in Jul. 2009 by Pieter Jan Kramer officer of the European Patent Office.

International Search Report (PCT/CA2016/000056); Author Daniel Weslake, Published by WIPO, Publication date Nov. 16, 2016.

Written Opinion of the International Searching Authority (PCT/CA2016/000056); Author Daniel Weslake, Published by WIPO, Publication date Nov. 16, 2016.

International Search Report of PCT/CA2016/000167, published in Jul. 2016 by Jean-Francois Desrosiers officer of the European Patent Office.

Written Opinion of the International searching Authority of PCT/CA2016/000167, published in Jul. 2016 by Jean-François Desrosiers officer of the European Patent Office.

* cited by examiner

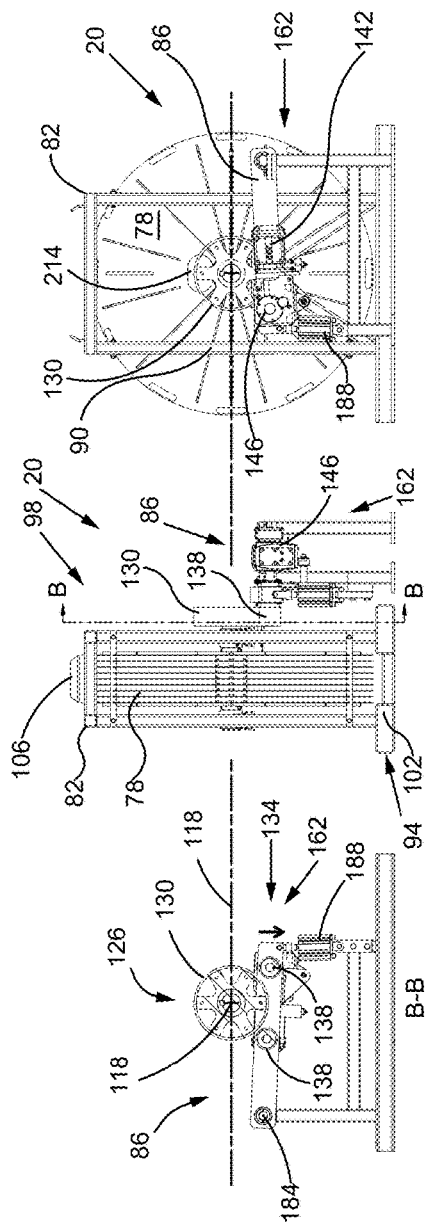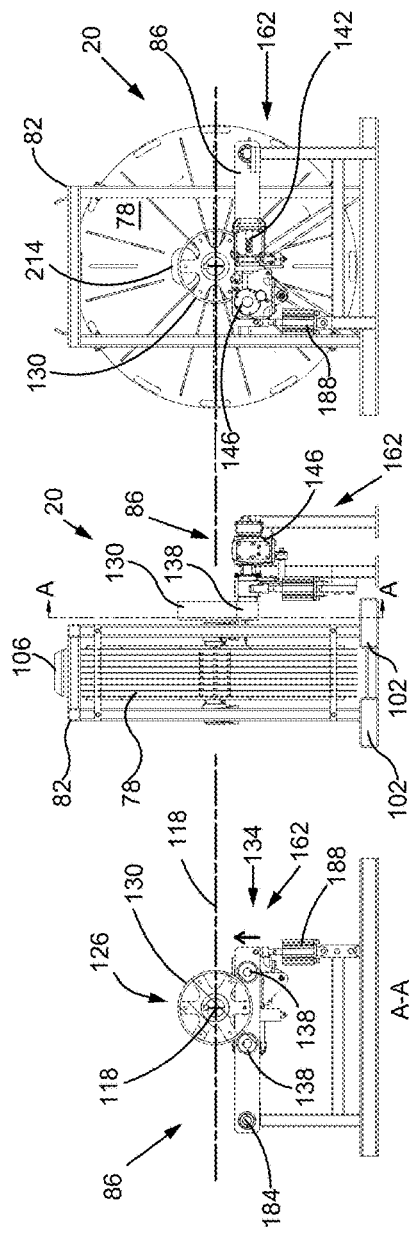

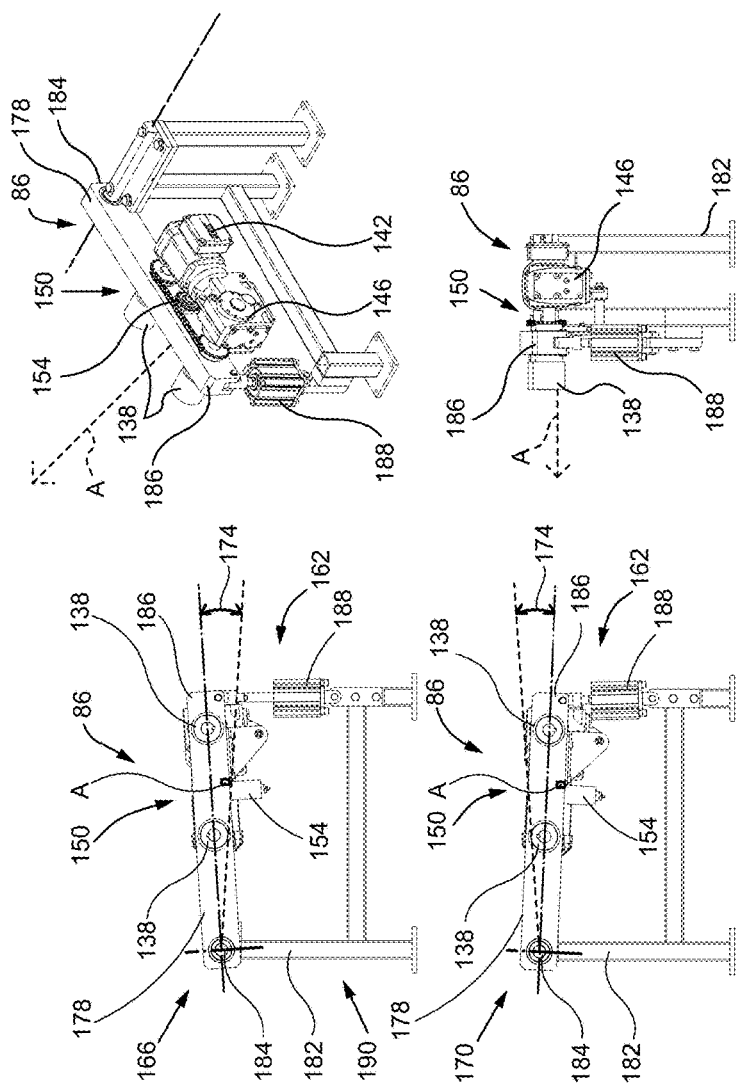

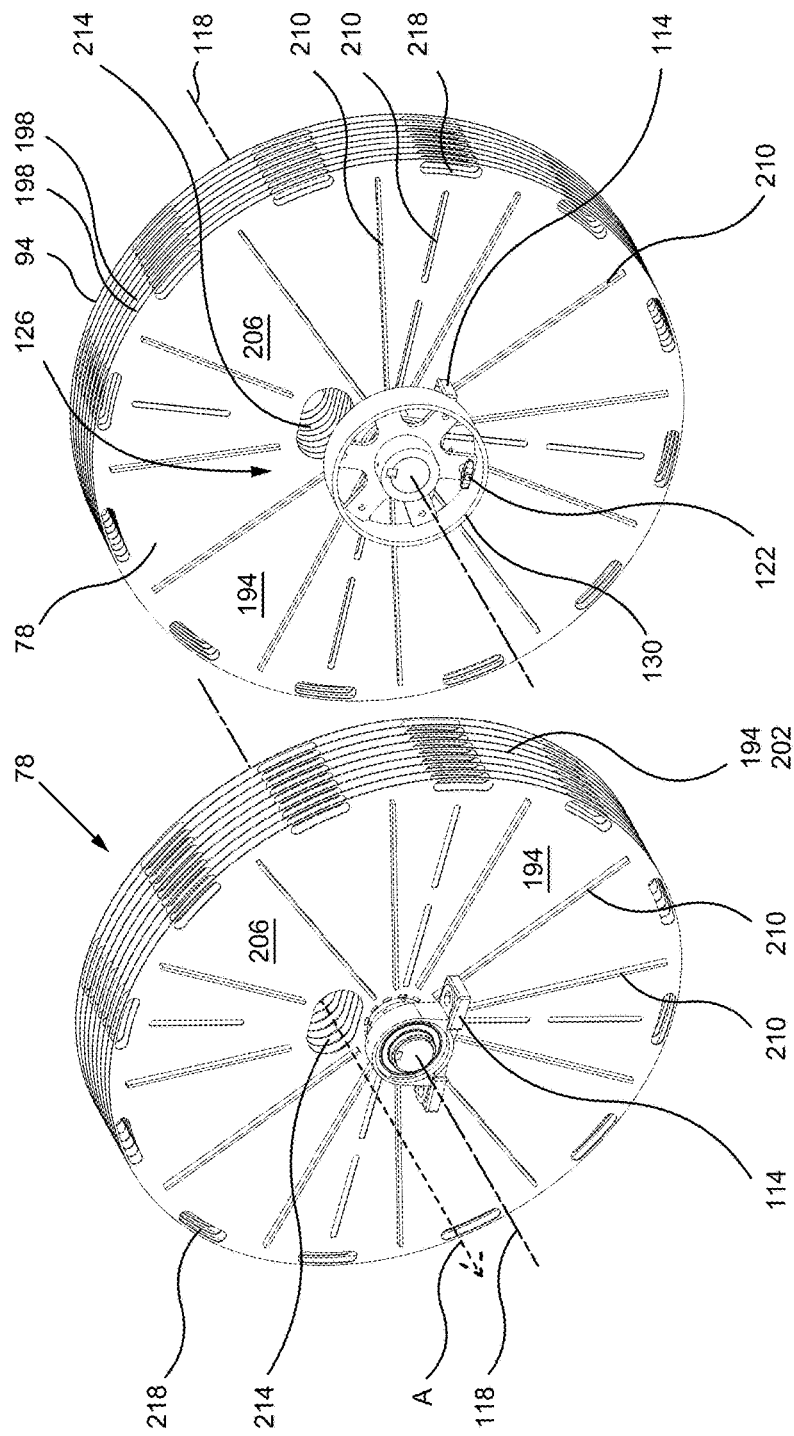

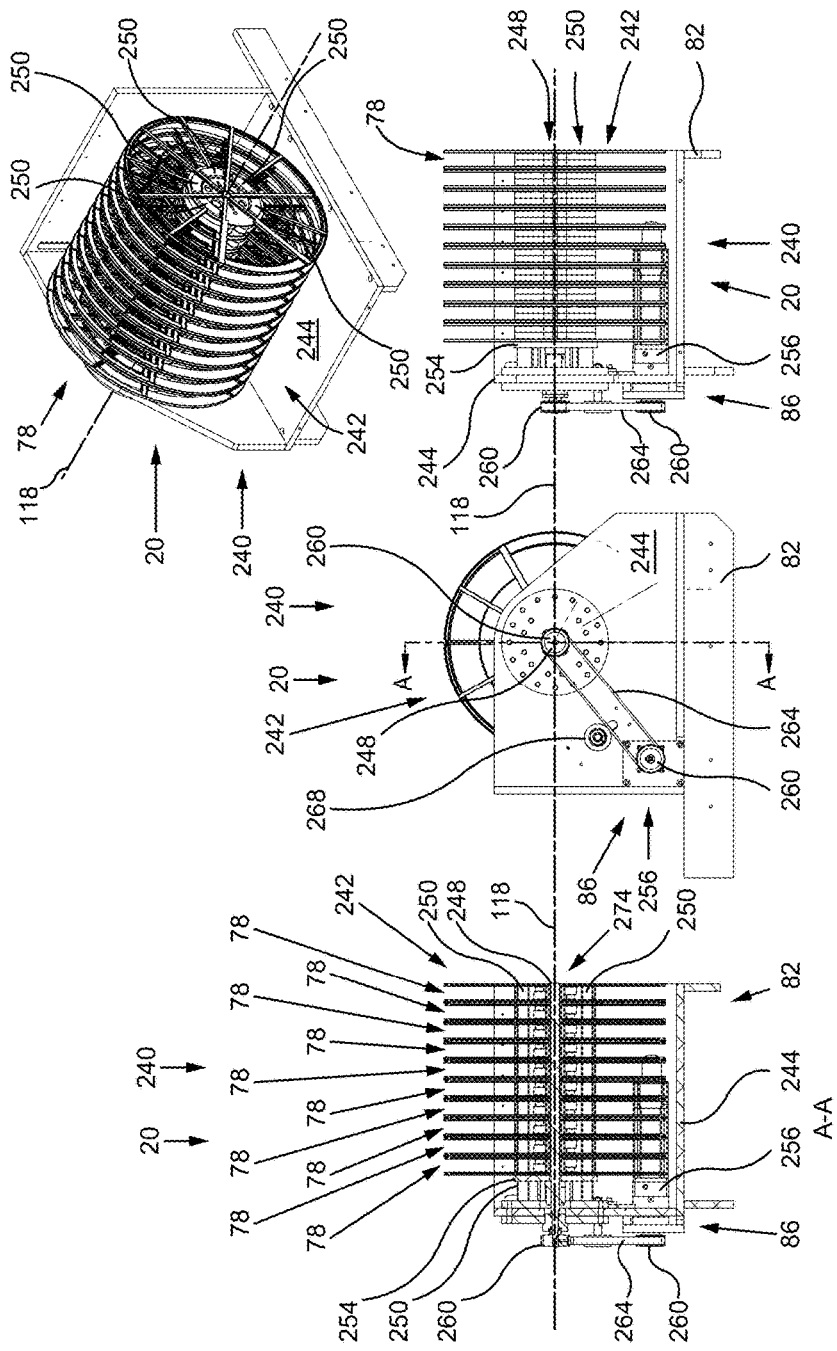

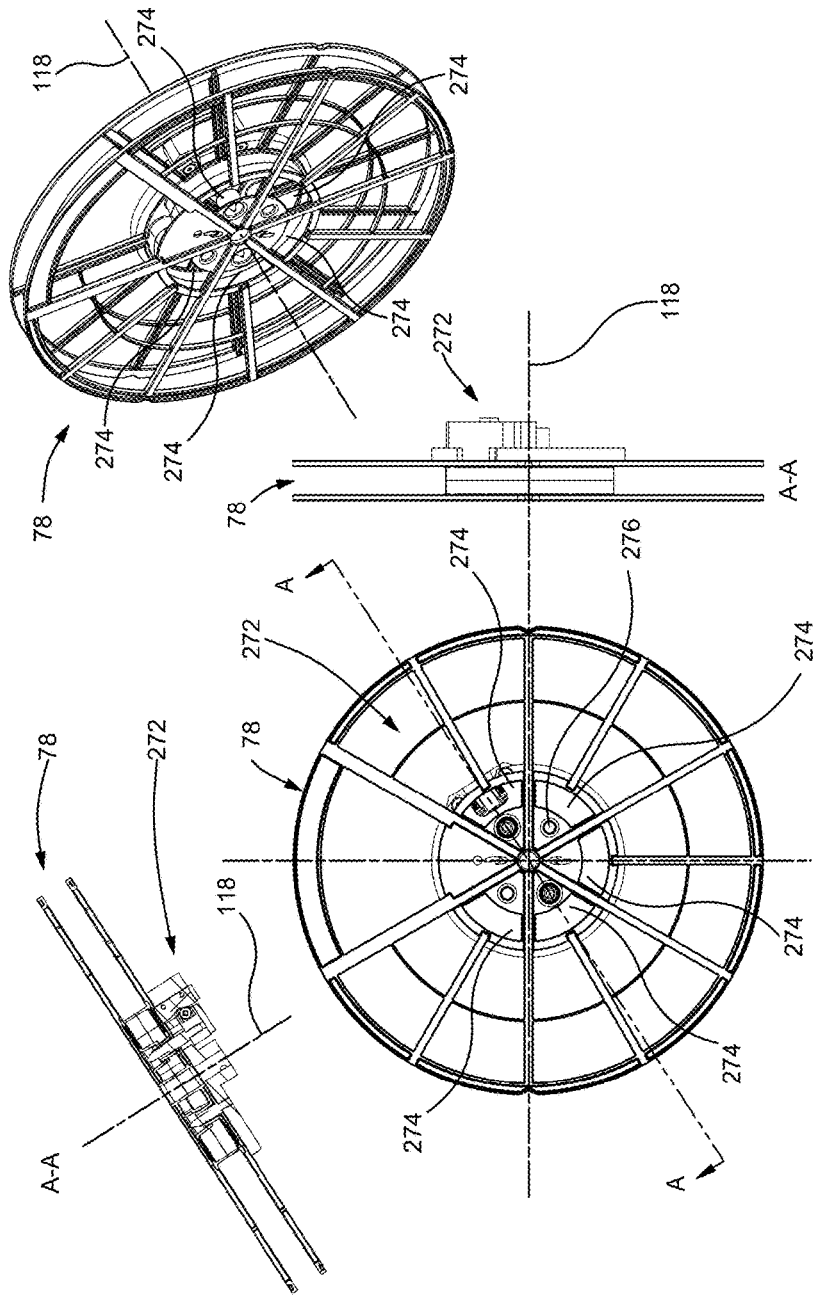

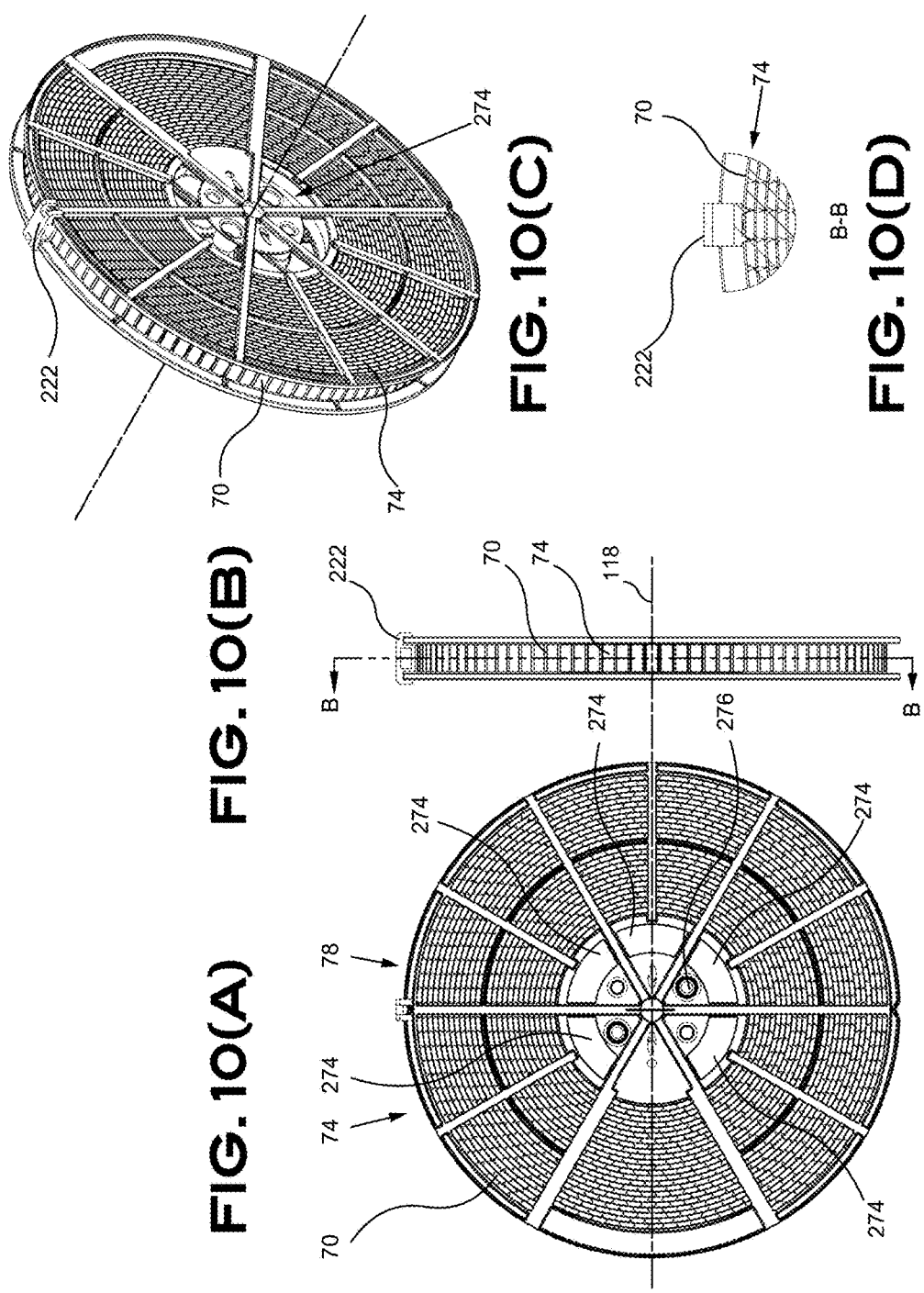

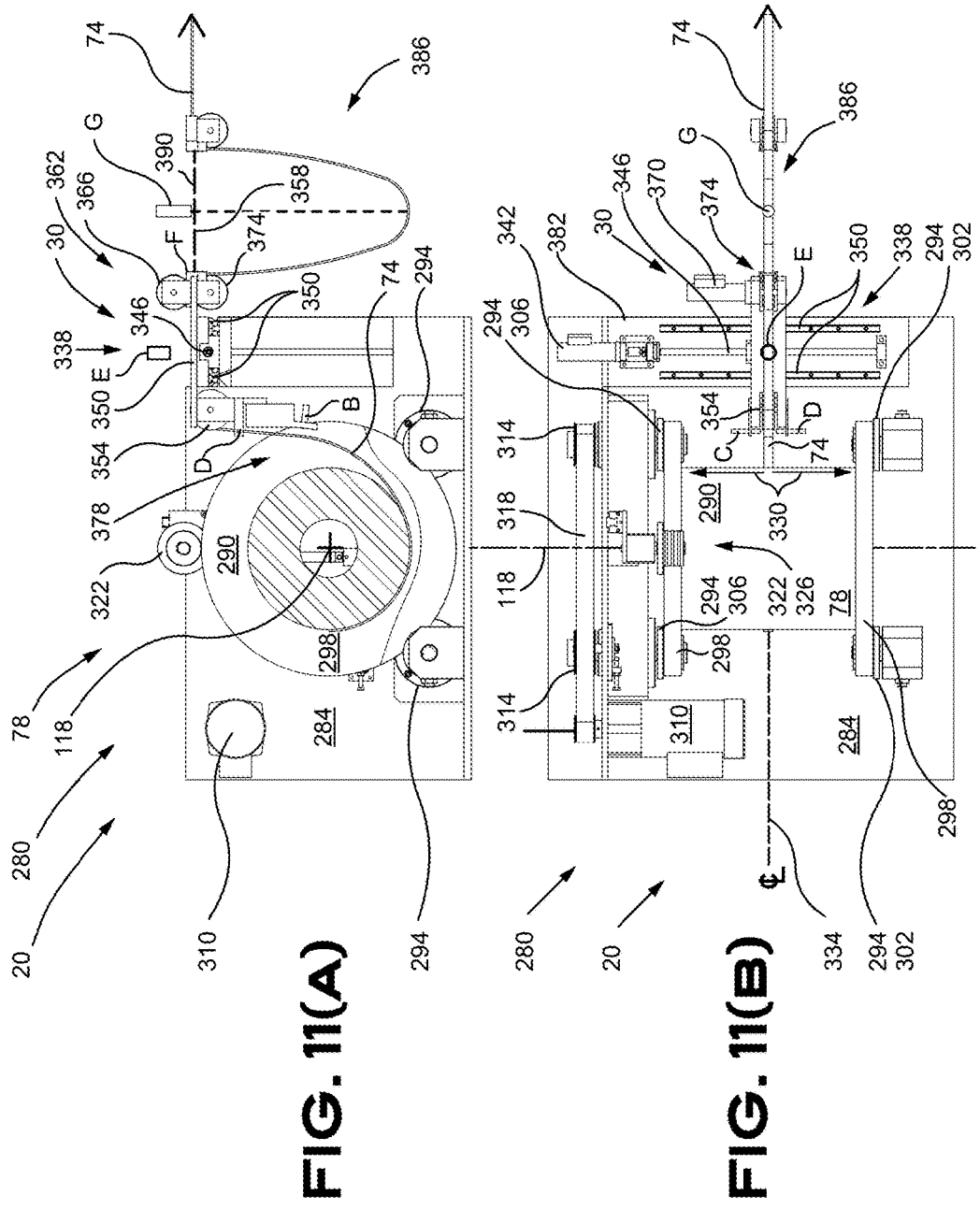

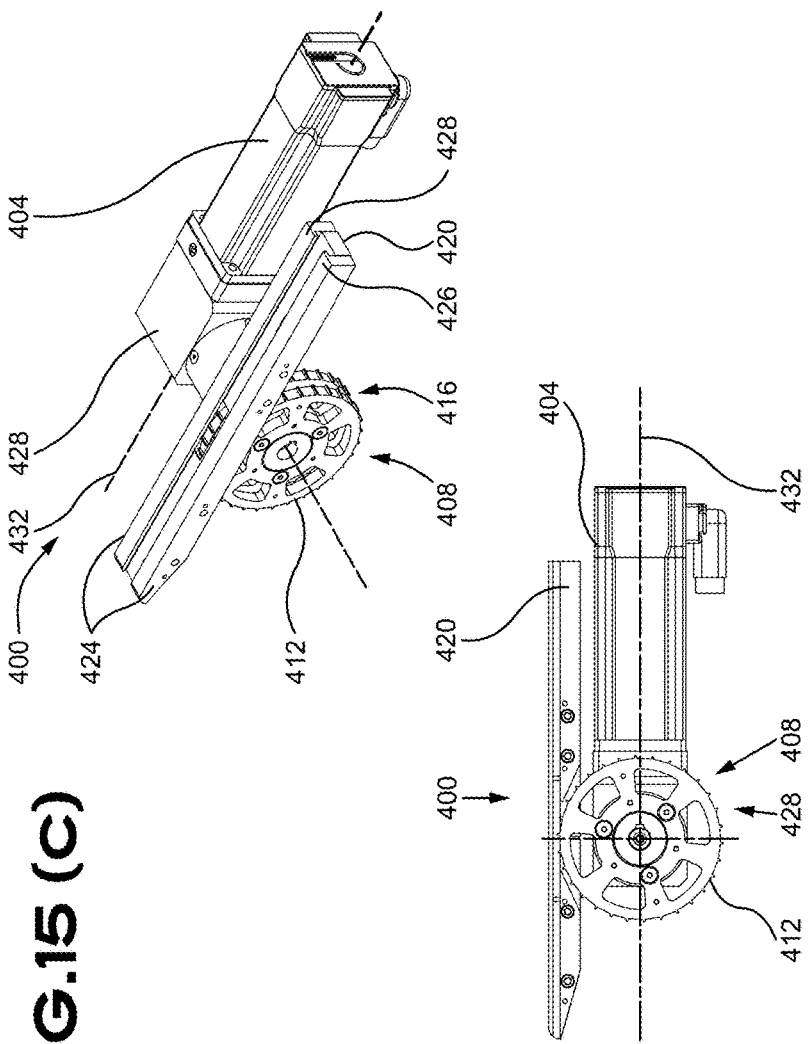
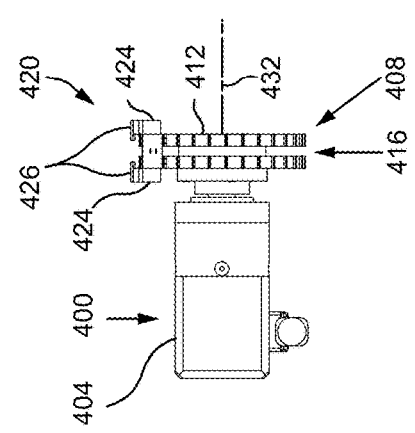
FIG. 15 (A)
FIG. 15 (B)
FIG. 15 (C)

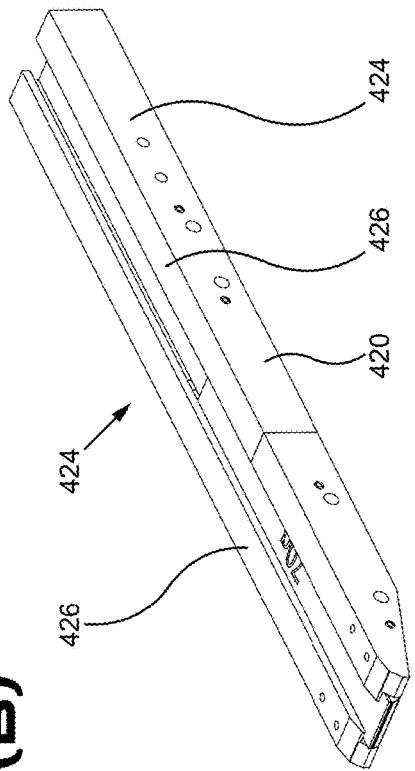
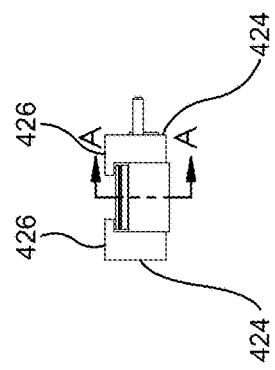
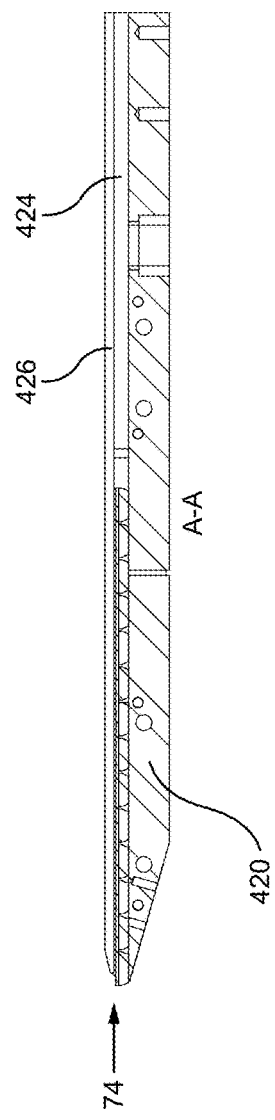
FIG. 16(A)
FIG. 16(B)
FIG. 16(C)

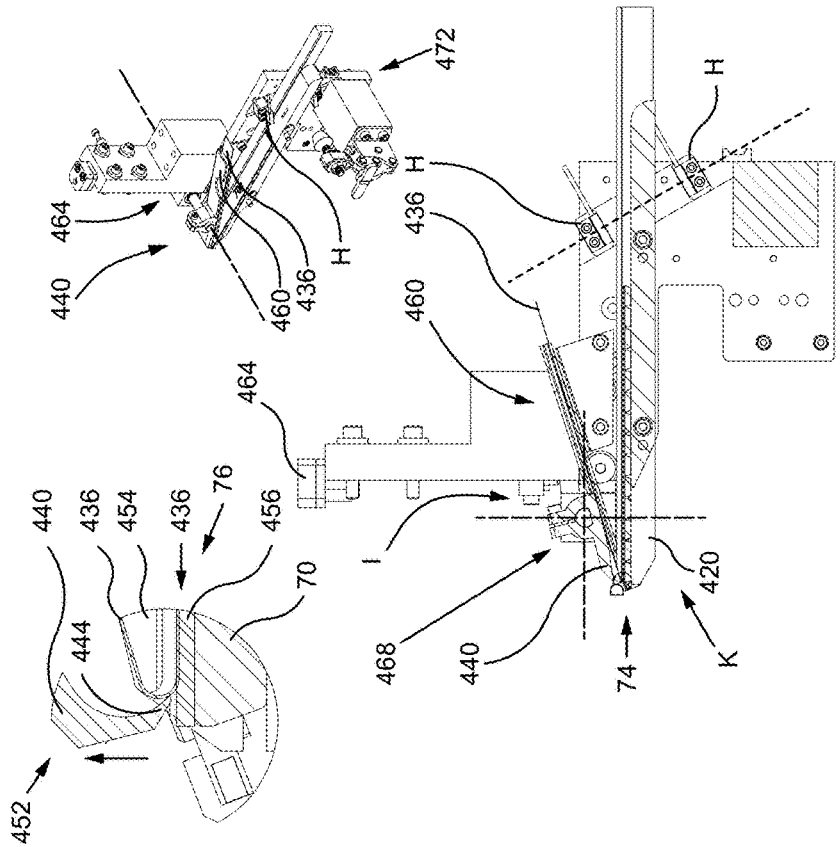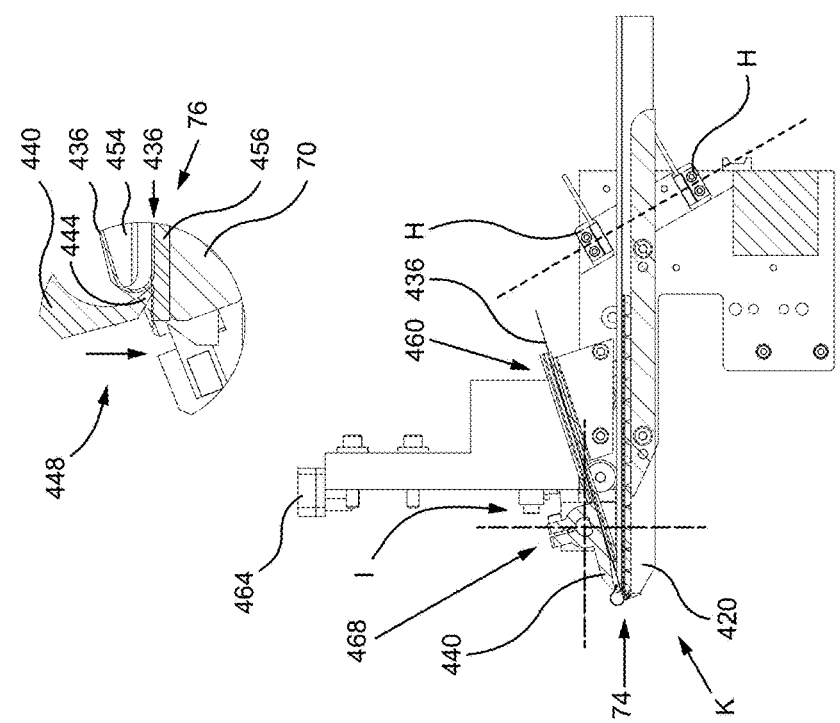

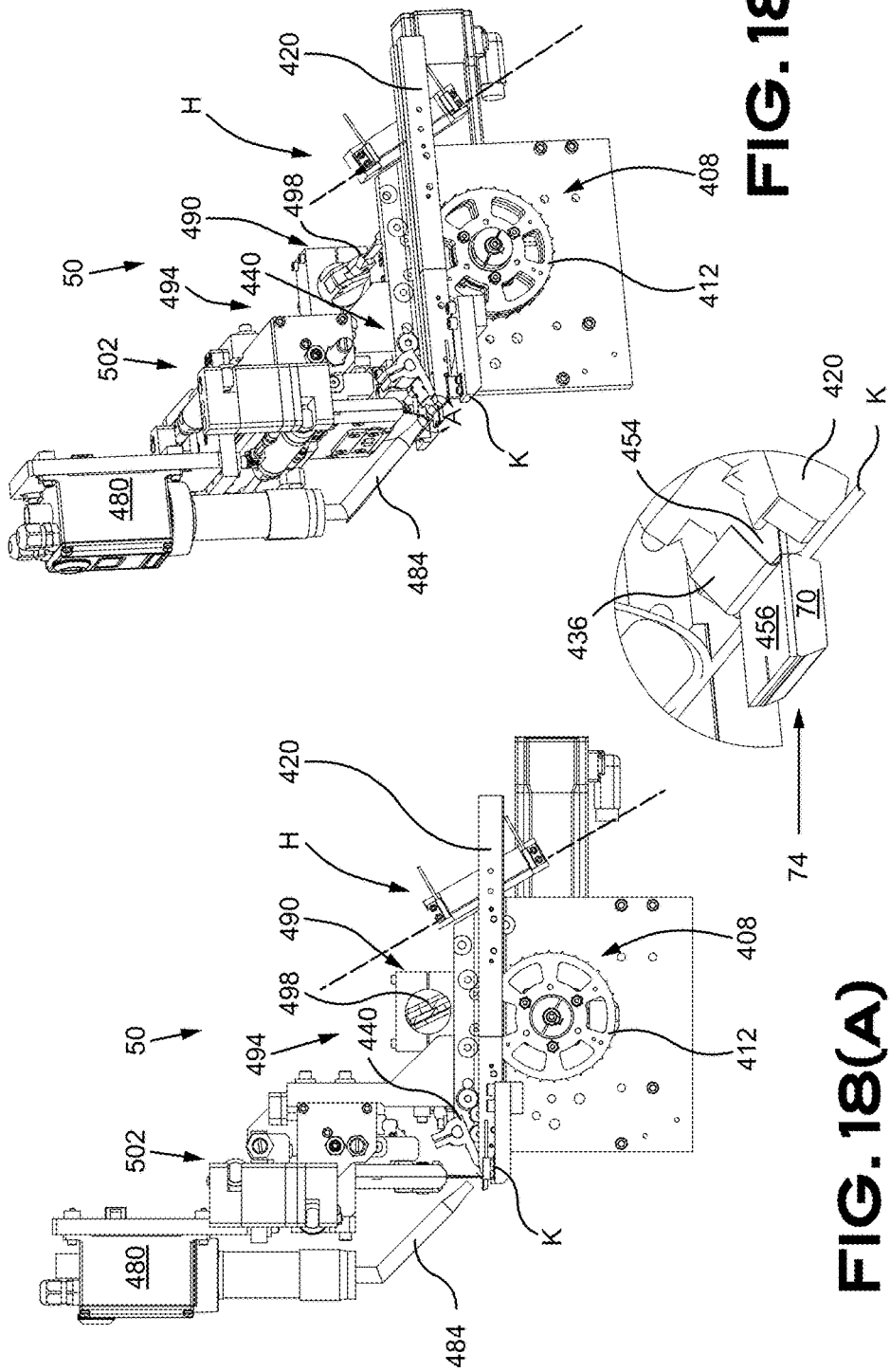

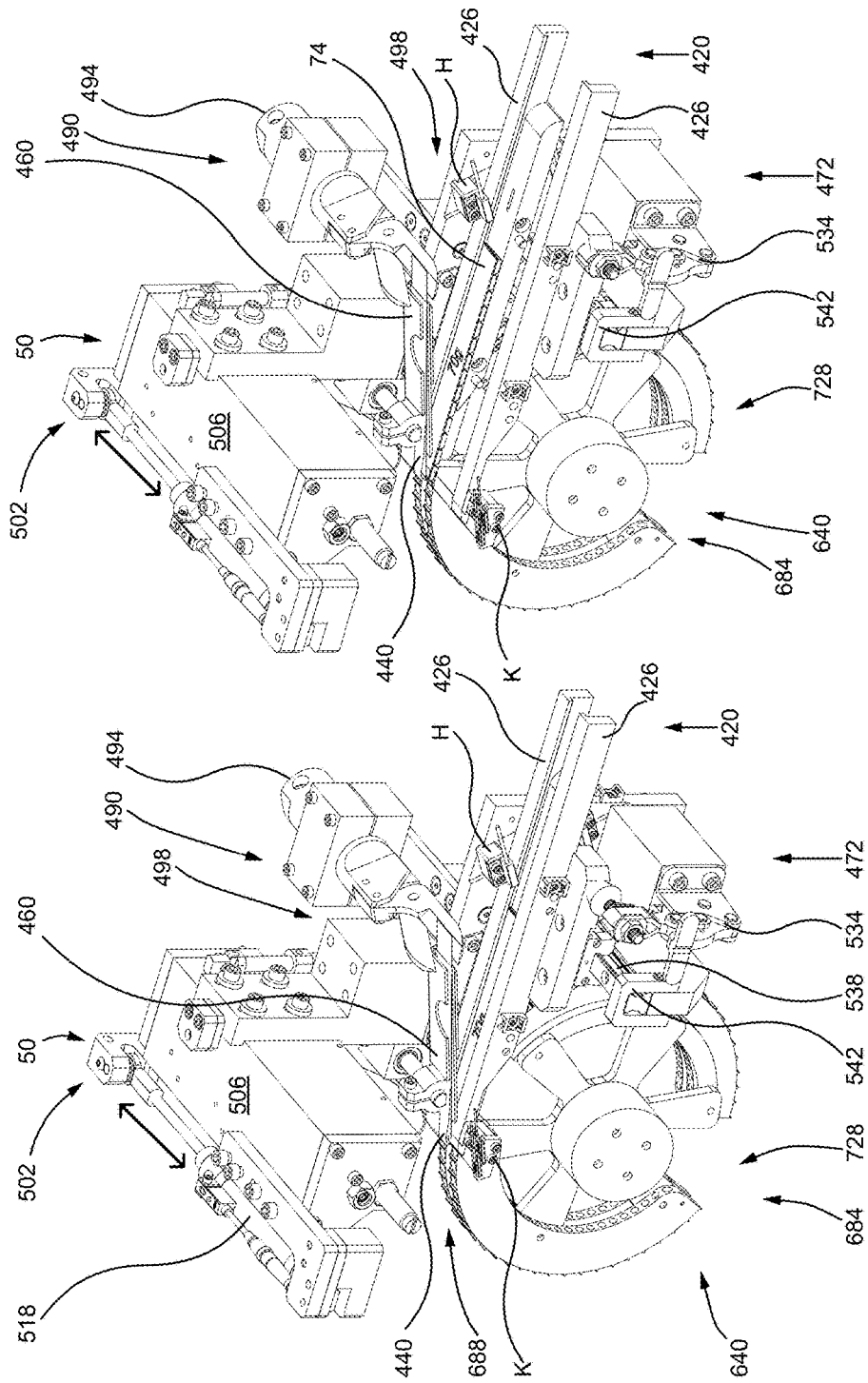

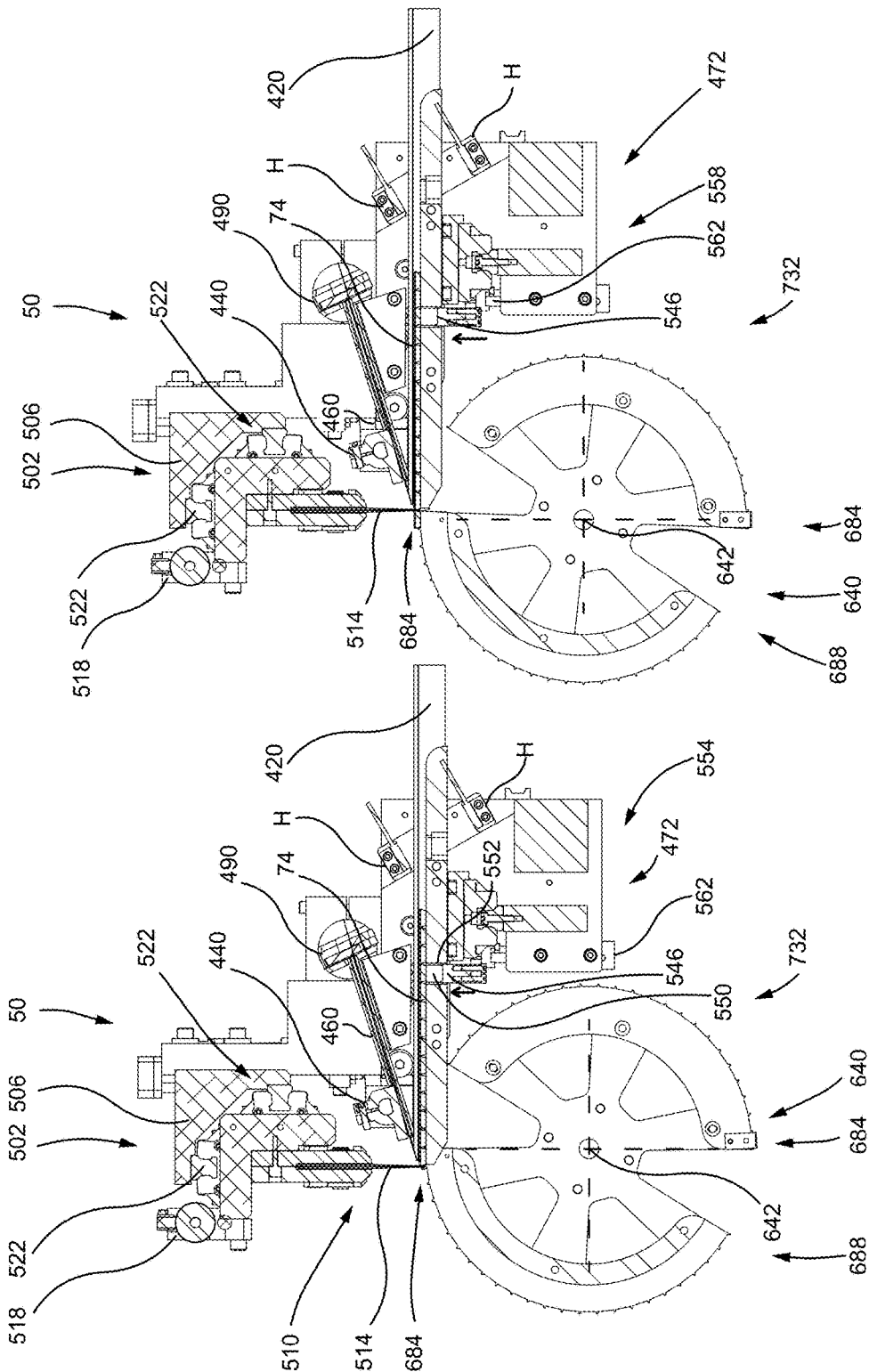

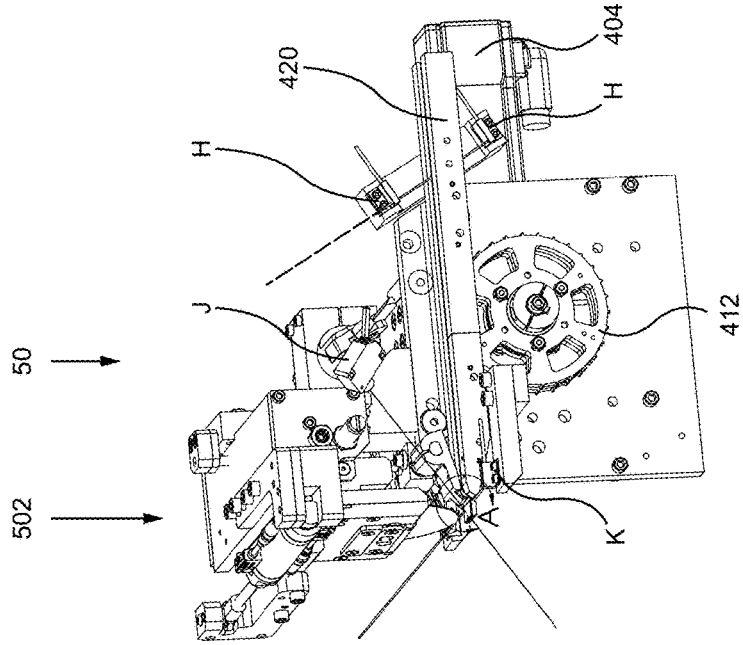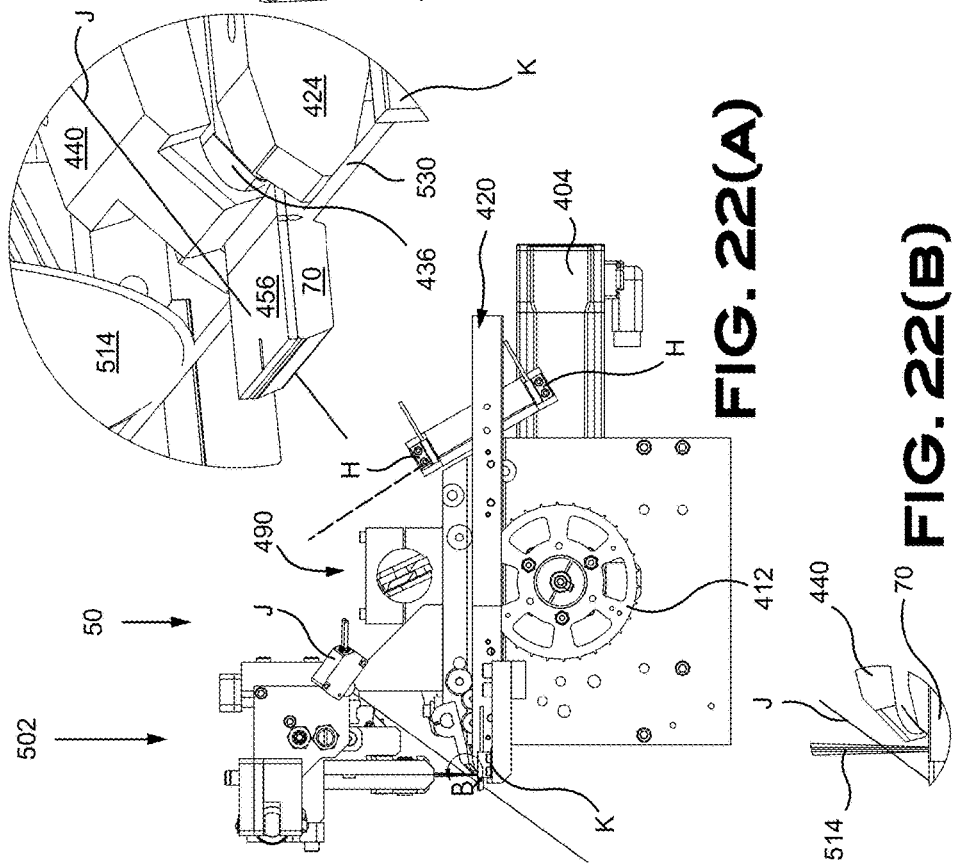

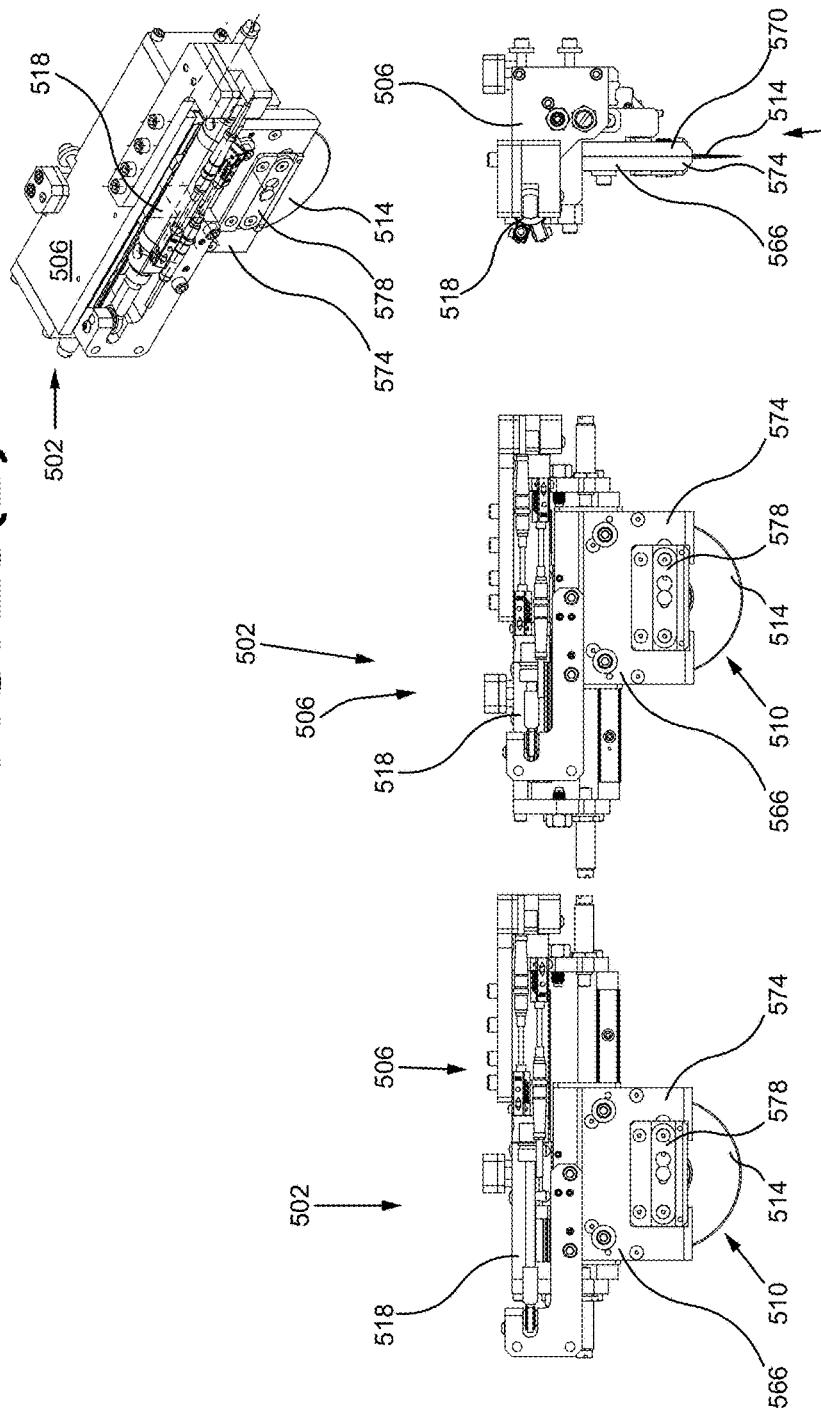

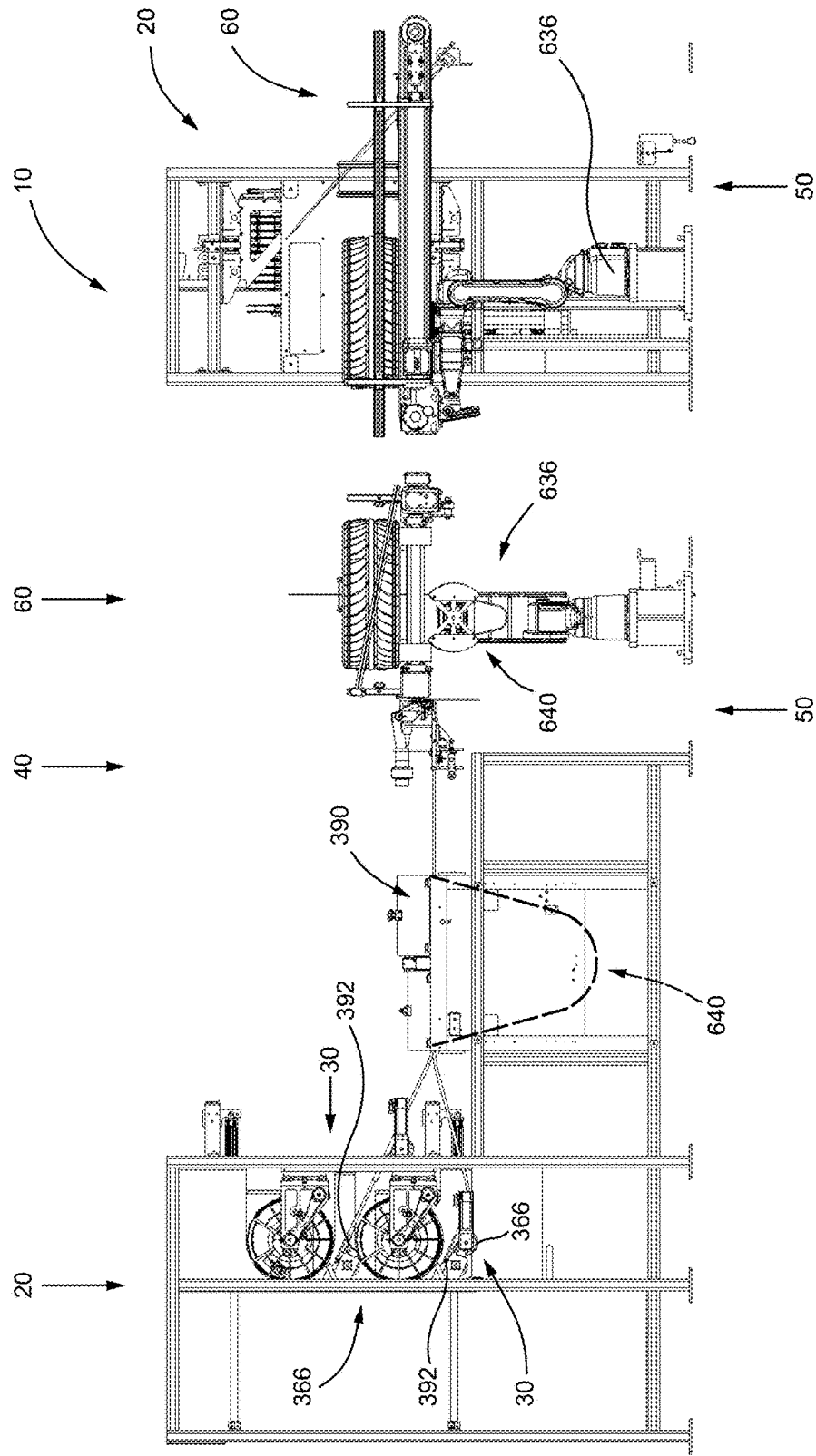

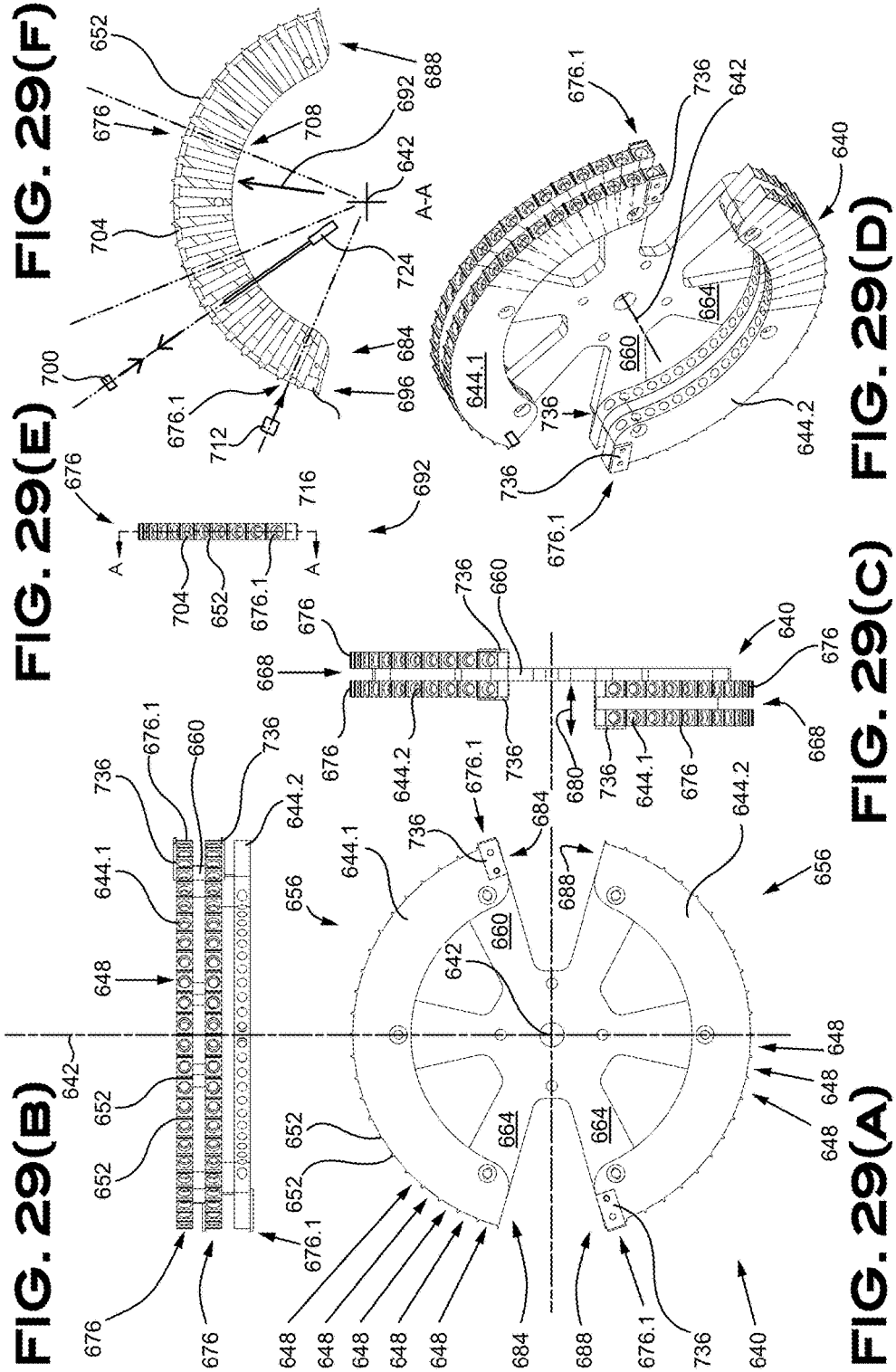

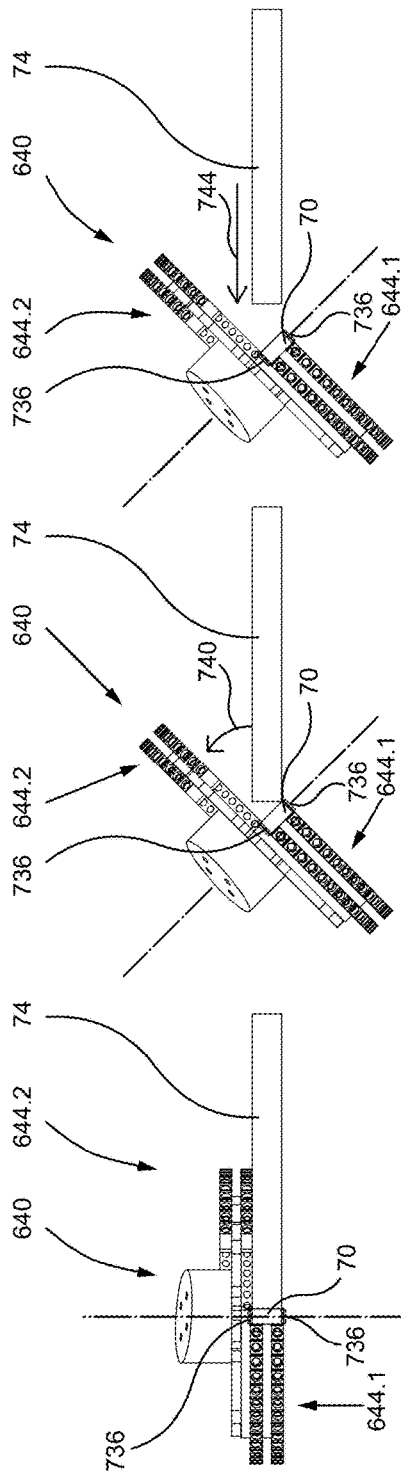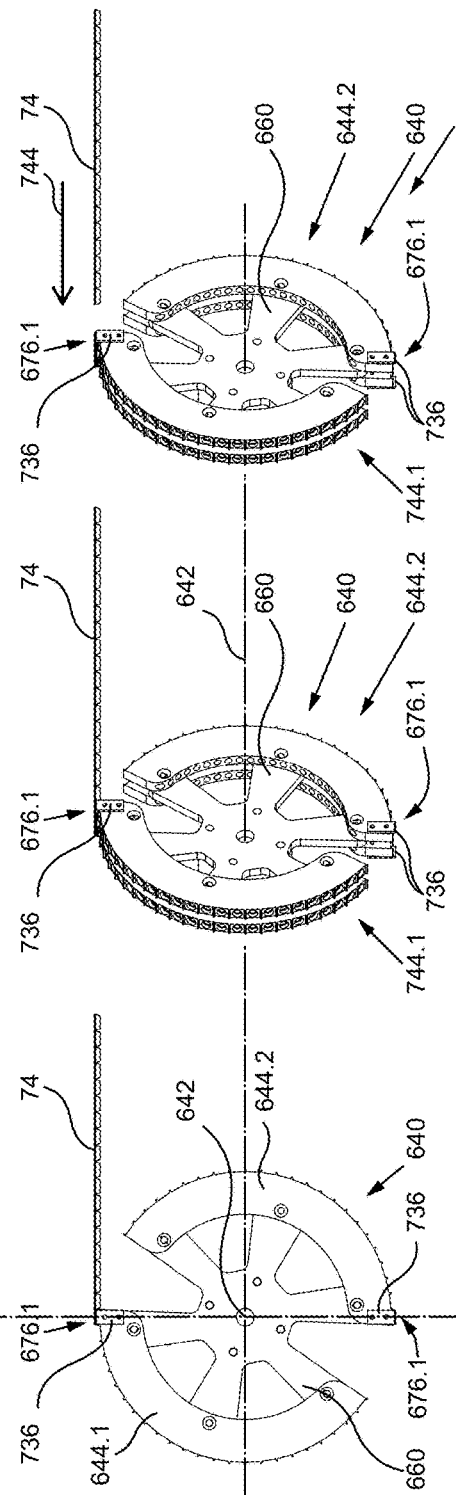

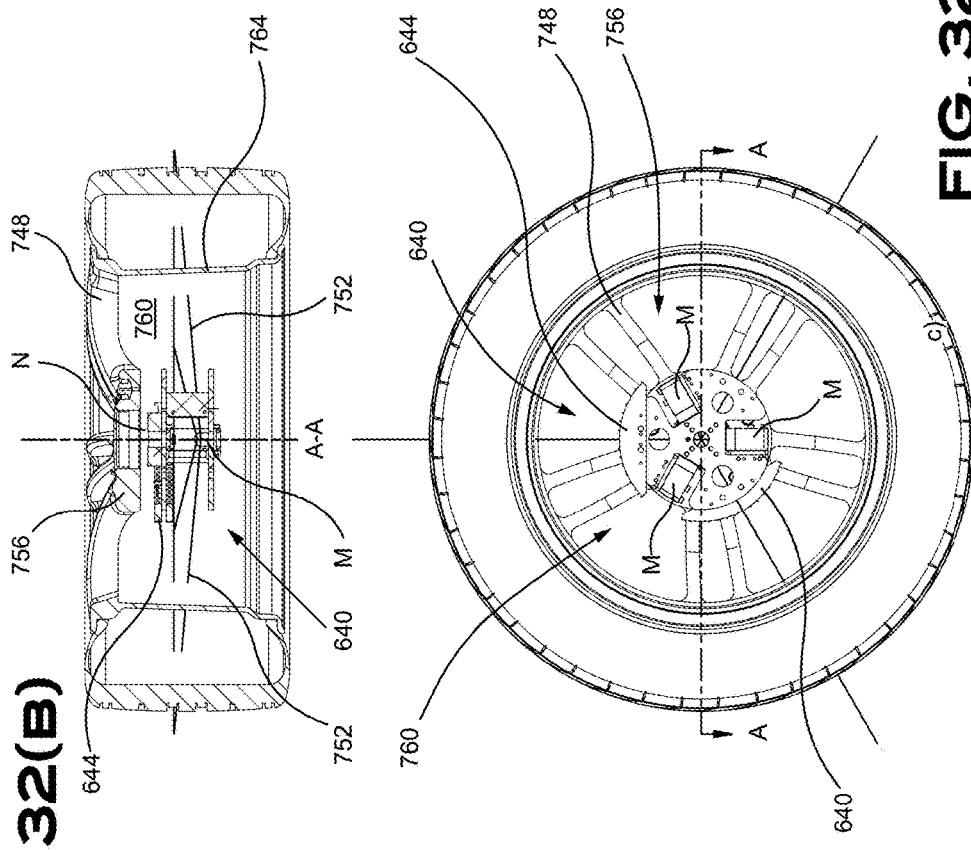
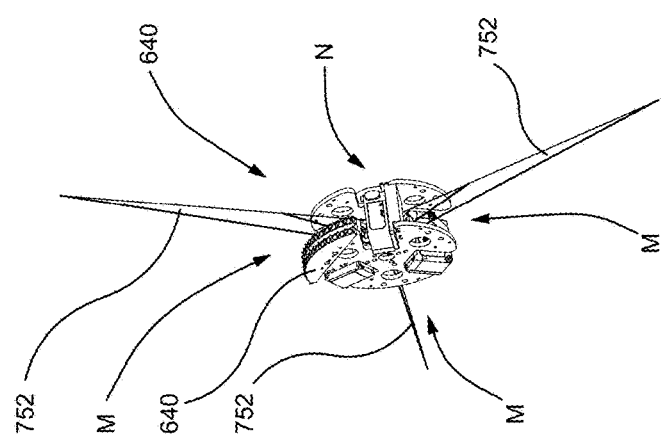
FIG. 32(A)
FIG. 32(B)
FIG. 32(C)

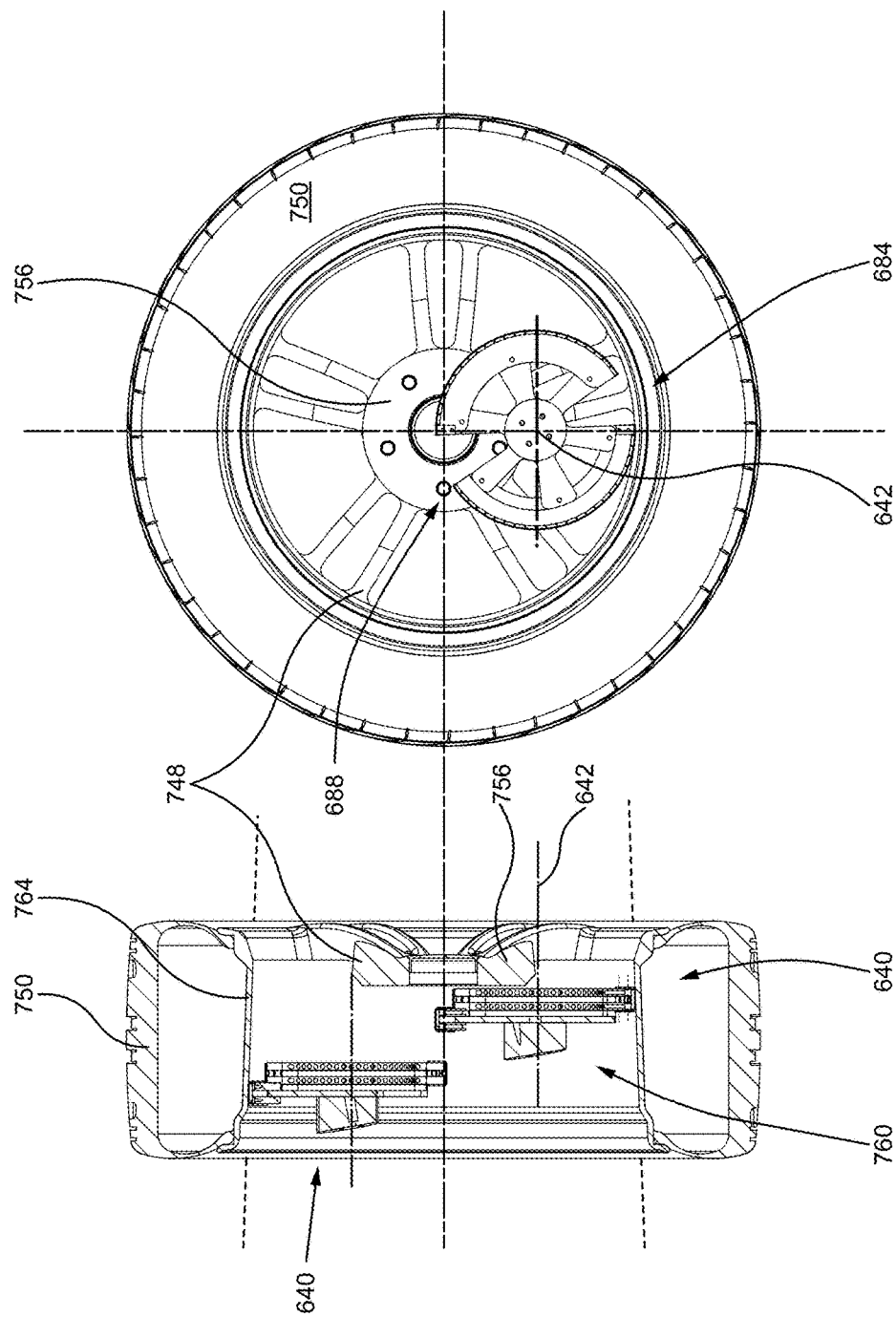

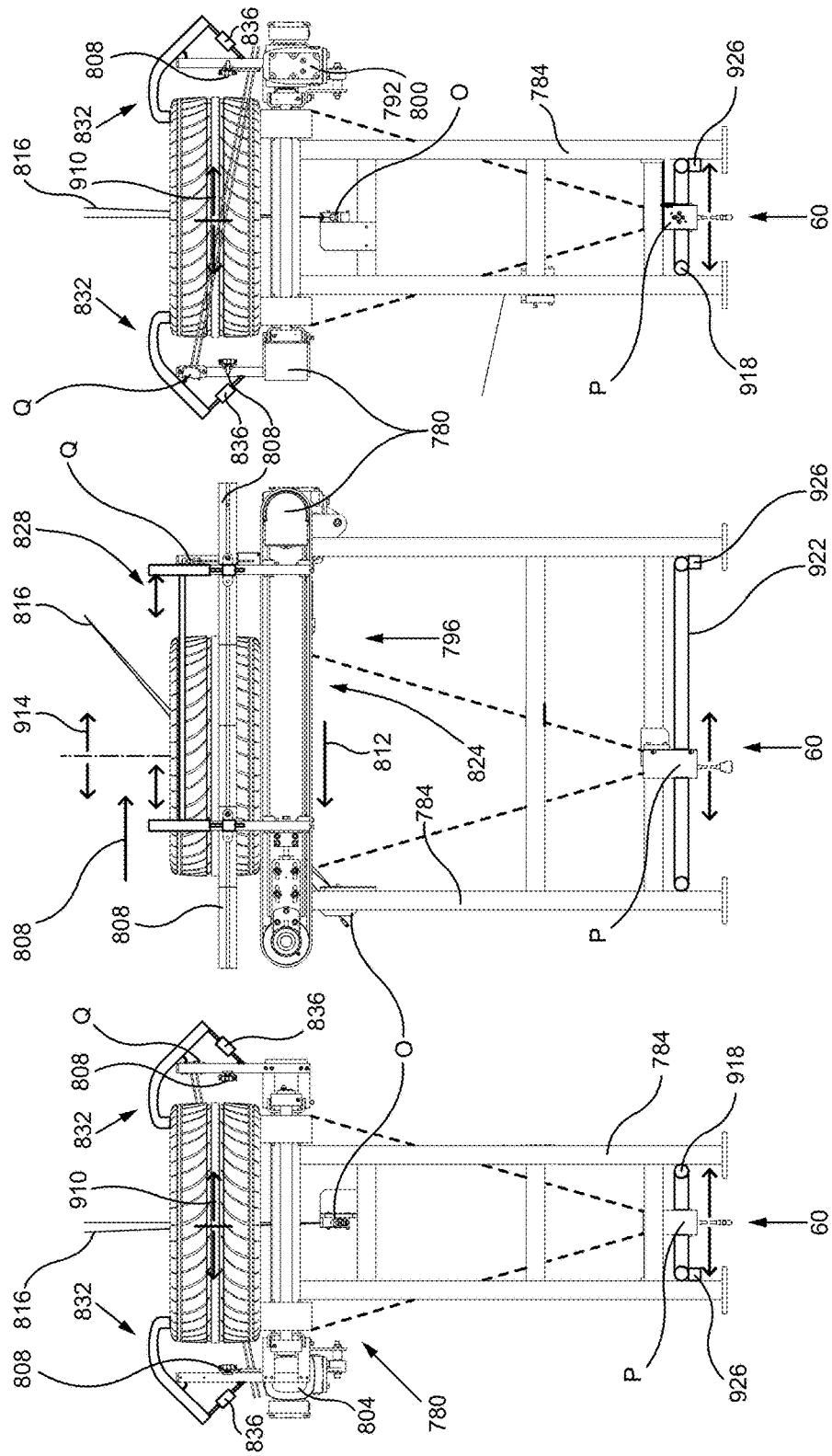

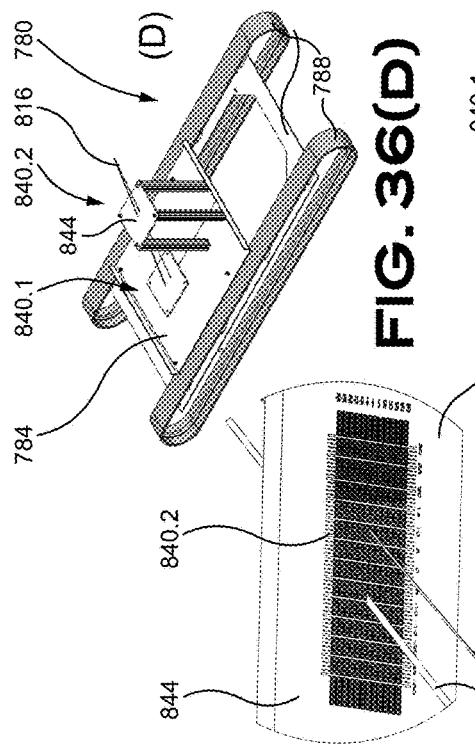
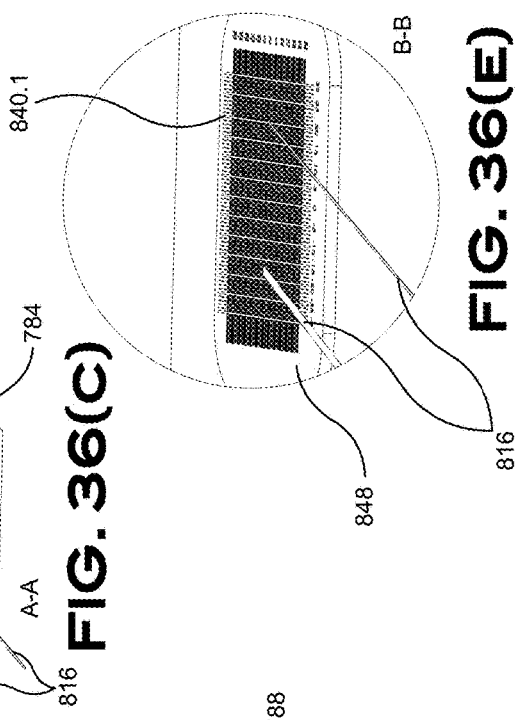
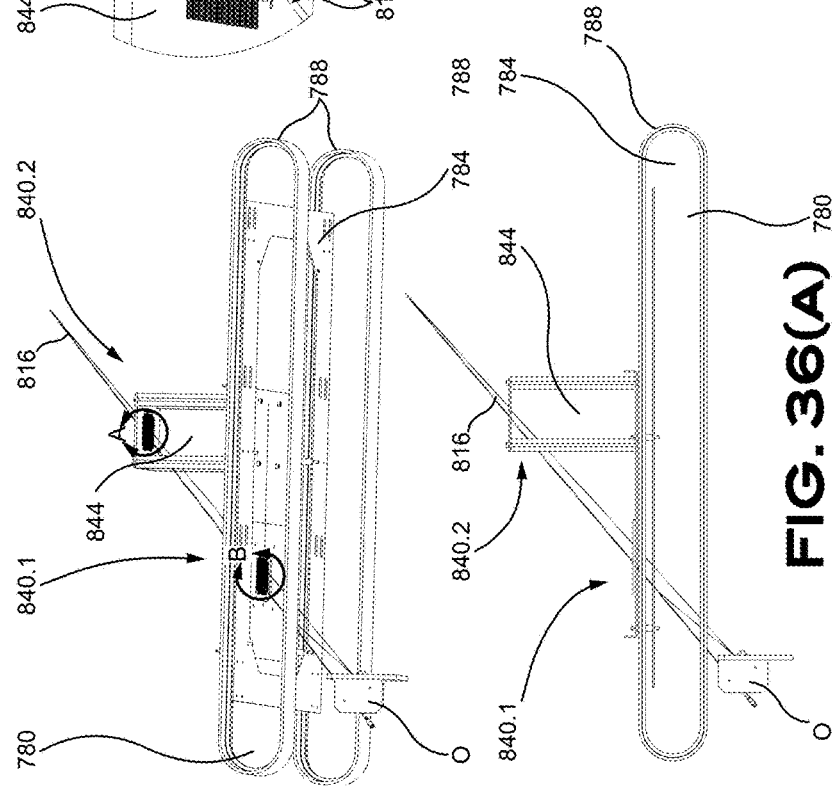

SPOOL MANAGEMENT SYSTEM AND METHOD OF USE THEREOF

CROSS-REFERENCE

The present application claims priority from and is a continuing application of U.S. patent application Ser. No. 15/056,445, filed Feb. 29, 2016, entitled BALANCING WEIGHT APPLICATION MACHINE AND METHOD OF USE THEREOF that is incorporated herein by reference in its entirety.

FIELD OF THE INVENTION

This invention relates to an apparatus for providing and installing wheel-balancing weights. More precisely, the present invention relates to an apparatus for managing spools of wheel-balancing weights.

BACKGROUND OF THE INVENTION

Wheel-balancing weights (or wheel weights, wheel balance weights . . . ) are commonly used on wheeled vehicles to improve the static and dynamic balancing of the wheel assembly. To balance the wheels, each wheel is rotated with a balancing weight application apparatus that analyses and detects uneven weight distribution thereof that could generate significant vibrations when the wheels rotate at various rotating speeds. This undesirable wheel vibration would be transmitted to the entire vehicle, if not corrected. Corrective wheel-balancing weights, when required, are secured on the circumference of the wheel on both the interior and the exterior sides of the wheel. The addition of required wheel-balancing weights corrects the polar weight distribution of the wheel assembly and balances the wheel that rotates without inducing undesirable vibrations.

The demand for wheels that are adapted to the design of vehicles is growing. Wheels aesthetic is therefore a growing concern for the vehicles manufacturers. Wheel-balancing weights that are not visible from the exterior of the vehicle are preferably used to improve the look of the wheels. This hidden type of wheel-balancing weights is glued on the interior surface of the wheels in contrast with visible wheel-balancing weights commonly secured with a clip to the exterior edges of the wheels.

Therefore, there exists a need in the art for an improved apparatus for detecting wheel and tire configurations, providing and installing wheel-balancing weights on the wheel. A system for analyzing wheel configurations, managing the required number of wheel-balancing weights and installing the wheel-balancing weights on wheels is also in demand. There is also a need in the art for an autonomous apparatus that would minimize human interventions for balancing wheels. And there is a need for an improved fit between a polymer-covered wheel-balancing weight and a method of manufacturing same over the existing art.

SUMMARY OF THE INVENTION

It is one aspect of the present invention to alleviate one or more of the drawbacks of the background art by addressing one or more of the existing needs in the art.

An aspect of the present invention provides, in accordance with at least one embodiments thereof, an integrated wheel-balancing weights application system.

An aspect of the present invention provides, in accordance with at least one embodiments thereof, a balancing weight application apparatus with automatic detection of wheel characteristics for properly installing balancing weights on a wheel.

An aspect of the present invention provides, in accordance with at least one embodiments thereof, a balancing weight application apparatus for installing balancing weights on a wheel without requiring a data base of wheels' configuration to apply weights to a pre-determined location on wheels.

An aspect of the present invention provides, in accordance with at least one embodiments thereof, a wheel-balancing weights application system designed to receive a strip of wheel-balancing weights and feed the strip to dispense a desired amount of weights for installation on a wheel.

An aspect of the present invention provides, in accordance with at least one embodiments thereof, a wheel-balancing weights application system adapted to provide weights on a basis of corrective wheel-balancing weights data provided by another system.

An aspect of the present invention provides, in accordance with at least one embodiments thereof, a modular wheel-balancing weights application system; the modules may include a supplying module, a feeding module, a dispensing module, an application module and a conveying module.

An aspect of the present invention provides, in accordance with at least one embodiments thereof, a wheel-balancing weights application system capable of balancing different types of wheels without reprograming the wheel-balancing weights application system.

An aspect of the present invention provides, in accordance with at least one embodiments thereof, a wheel-balancing weights application system that can manage different weight colors (e.g. grey, black . . . ), weight finishes (e.g. mate, egg shell) and/or weight plating (e.g. chrome, zinc . . . ) for wheels of different colors, finishes and plating.

An aspect of the present invention provides, in accordance with at least one embodiments thereof, a wheel-balancing weights application system with a plurality of dispensing module for recharging strips of weights without stopping the providing process.

An object of the present invention provides, in accordance with at least one embodiments thereof, an exchangeable spool-supporting pallet adapted to be operatively positioned for feeding the strip of weights to dispense a desired mass of weights for balancing a wheel.

An object of the present invention provides, in accordance with at least one embodiments thereof, a spool-receiver adapted to operatively interact with a plurality of weights-supporting spools for selectively unwind the spool.

An object of the present invention provides, in accordance with at least one embodiments thereof, a spool-receiver including a plurality of axially stackable strip-receiving spools; the spools being adapted to provide a plurality of different weight configurations.

An object of the present invention provides, in accordance with at least one embodiments thereof, a weights strip thickness configured to sense the remaining quantity of strip on a strip-receiving spool.

An object of the present invention provides, in accordance with at least one embodiments thereof, a balancing weight application apparatus including a strip-receiving spool identification mechanism; the spool identification mechanism may include RFID spool recognition, bar code recognition and identification number for compatibility with the apparatus and traceability of the weights.

An object of the present invention provides, in accordance with at least one embodiments thereof, a balancing weight application apparatus including a loop of strip of weights after the strip-receiving spool for damping strip-feeding speed fluctuations and absorbing lateral misalignment between the strip-receiving spool and the strip feeder.

An object of the present invention provides, in accordance with at least one embodiments thereof, a balancing weight application apparatus including an automatic transversal weights strip alignment mechanism.

An object of the present invention provides, in accordance with at least one embodiments thereof, a feeding mechanism using a toothed drive wheel including a shape engaging a profile of the weights.

An object of the present invention provides, in accordance with at least one embodiments thereof, a balancing weight application apparatus including a loop of strip of weights after the feeding module for damping strip-feeding speed fluctuations between the feeder module and the dispensing module.

An object of the present invention provides, in accordance with at least one embodiments thereof, a balancing weight application apparatus including automatic initialization, threading and feeding of new weights strips.

An object of the present invention provides, in accordance with at least one embodiments thereof, a balancing weight application apparatus including a robot for applying a desired quantity of weights to a wheel. Alternatively, a mechanical arm can be used for applying the desired quantity of weights to the wheel in order to avoid extensive acquisition cost of a robot.

An object of the present invention provides, in accordance with at least one embodiments thereof, a balancing weight application apparatus including a robot to pull and push on a strip of weights, the robot being configured to pull and push on the strip of weights of a predetermined length.

An object of the present invention provides, in accordance with at least one embodiments thereof, a balancing weight application apparatus including a robot to pull and push on a strip of weights to engage a protective tape liner to remove the protective tape liner prior to installation of the weights on a wheel.

An object of the present invention provides, in accordance with at least one embodiments thereof, a servomotor driving a weights-engaging toothed member to pull and push on a strip of weights and provide a predetermined length of strip for application to a wheel.

An object of the present invention provides, in accordance with at least one embodiments thereof, a balancing weight application apparatus including a servomotor to selectively pull or push a strip of weights to engage a protective tape liner with a liner peeler mechanism to remove the protective tape liner prior to installation of the weights on a wheel.

An object of the present invention provides, in accordance with at least one embodiments thereof, a supporting member supporting weights thereon and allowing a tool to take the weights thereon and move the weights to a wheel.

An object of the present invention provides, in accordance with at least one embodiments thereof, a dispensing module including guiding rails maintaining a strip of weights in a desired position when the strip of weights is cut in a desired length.

An object of the present invention provides, in accordance with at least one embodiments thereof, an automatic weights strip junction presence sensing capability.

An object of the present invention provides, in accordance with at least one embodiments thereof, a protection liner peeler mechanism.

An object of the present invention provides, in accordance with at least one embodiments thereof, a protection liner channeling and cutting tool.

An object of the present invention provides, in accordance with at least one embodiments thereof, a protection liner sensing mechanism configured to enable an action when a protection liner is sensed after the peeling mechanism.

An object of the present invention provides, in accordance with at least one embodiments thereof, a strip cutting tool including a ratchet action.

An object of the present invention provides, in accordance with at least one embodiments thereof, a robot with a tool including a plurality of weights holder; the weights holders being positioned in opposite directions and optionally offset in respect with each other.

An object of the present invention provides, in accordance with at least one embodiments thereof, a robot for securing weights on a wheel without touching the wheel.

An object of the present invention provides, in accordance with at least one embodiments thereof, a tool for moving weights to a wheel using magnetic force to temporarily secure the weights to the tool.

An object of the present invention provides, in accordance with at least one embodiments thereof, a tool for securing weights to a wheel using a trailing end thereof to begin a sequential sticking of a desired length of a strip of weights on a wheel.

An object of the present invention provides, in accordance with at least one embodiments thereof, a tool for securing weights receiving the weights on the trailing side of the tool.

An object of the present invention provides, in accordance with at least one embodiments thereof, a robot for securing weights on a wheel that is using triangulation sensing of the wheel to locate a tool of the robot on the wheel and determine weight application locations in accordance with the wheel profiling.

An object of the present invention provides, in accordance with at least one embodiments thereof, a robot with a weight-securing tool usable to cut a portion of the strip of weights with a pivotal motion in respect with a longitudinal direction of the strip.

An object of the present invention provides, in accordance with at least one embodiments thereof, a robot with a weight-securing tool capable of securing weights on both sides of the wheel.

An object of the present invention provides, in accordance with at least one embodiments thereof, a robot control using torque sensing (i.e. servo float) capability to use a predetermined force, pressure, when securing the weights on the wheel.

An object of the present invention provides, in accordance with at least one embodiments thereof, conveyor for moving a wheel in a weight-installation position.

An object of the present invention provides, in accordance with at least one embodiments thereof, a conveyor including a calibration reference.

An object of the present invention provides, in accordance with at least one embodiments thereof, a balancing weight application apparatus that is adapted to secure strips of weights on a wheel that does not need to be at a determined position on the conveyor.

An object of the present invention provides, in accordance with at least one embodiments thereof, a balancing weight application apparatus that is identifying a profile of a wheel by sensing with a sensor the characteristics of the wheel when the wheel is moving on the conveyor.

An object of the present invention provides, in accordance with at least one embodiments thereof, a balancing weight application apparatus that is identifying relevant characteristics of a wheel and tire assembly for each wheel to be balanced without recourse to a database of wheels' characteristics.

An object of the present invention provides, in accordance with at least one embodiments thereof, a balancing weight application apparatus that is automatically identifying a wheel size, a wheel center position, a wheel color and weight(s) localization mark(s) on a tire of the wheel, identification number, wheel model number, wheel diameter, wheel offset and other markings with a camera sensor.

An object of the present invention provides, in accordance with at least one embodiments thereof, a balancing weight application apparatus that is using a colored camera flash.

An object of the present invention provides, in accordance with at least one embodiment thereof, a sensor (e.g. laser sensor, 3D image capture, distance sensor, laser grid deformation sensing, line scanner) for acquiring a wheel profile.

An object of the present invention provides, in accordance with at least one embodiments thereof, a conveyor including a wheel presence sensor disposed at an angle to sense a wheel location on the conveyor without interfering with a tire's threads.

An object of the invention provides, in accordance with at least one embodiment thereof, a spool-supplying apparatus capable of supporting a plurality of spools thereon and a spool unwinder for collecting and managing the unwinding of one spool.

An object of the invention provides, in accordance with at least one embodiment thereof, a spool-supplying apparatus including a spool-angular locating member for preventing undesirable unwinding of the plurality of spools.

An object of the invention provides, in accordance with at least one embodiment thereof, a spool-supplying apparatus including a spool push member movable along a spool-supporting shaft to push at least one spool on the spool-supporting shaft toward an open end of the spool-supporting shaft.

An object of the invention provides, in accordance with at least one embodiment thereof, a spool-supplying apparatus comprising a spool support frame, a spool-supporting axle secured, at a first end thereof, to the spool support frame, the spool-supporting axle being configured to support a plurality of axially-supported spools thereon, the plurality of spools axially engaging the spool-supporting axle via a second end thereof; and a spool unwinder operatively associated with the spool-supplying apparatus for unwinding a spool, the spool unwinder being configured to rotatably engage a first spool from the second end of the spool-supporting axle.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure:

FIG. 2(A)(i) is a side elevation view of a supplying module in accordance with at least one embodiment of the invention;

FIG. 2(A)(ii) is front elevation view of a supplying module in accordance with at least one embodiment of the invention;

FIG. 2(A)(iii) is a side elevation view of a supplying module in accordance with at least one embodiment of the invention;

FIG. 2(B)(i) is a side elevation view of a supplying module in accordance with at least one embodiment of the invention;

FIG. 2(B)(ii) is a front elevation view of a supplying module in accordance with at least one embodiment of the invention;

FIG. 2(B)(iii) is a side elevation view of a supplying module in accordance with at least one embodiment of the invention;

FIG. 3(A) is a side elevation view of a supplying module in accordance with at least one embodiment of the invention;

FIG. 3(B) is an isometric view of a supplying module in accordance with at least one embodiment of the invention;

FIG. 3(C) is a side elevation view of a supplying module in accordance with at least one embodiment of the invention;

FIG. 3(D) is a front elevation view of a supplying module in accordance with at least one embodiment of the invention;

FIG. 4(A) is an isometric view of a spool in accordance with at least one embodiment of the invention;

FIG. 4(B) is an isometric view of a spool in accordance with at least one embodiment of the invention;

FIG. 6(A) is a front isometric view of a supplying module in accordance with at least one embodiment of the invention;

FIG. 6(B) is a side elevation view of a supplying module in accordance with at least one embodiment of the invention;

FIG. 6(C) is a front elevation view of a supplying module in accordance with at least one embodiment of the invention;

FIG. 6(D) is an isometric view of a supplying module in accordance with at least one embodiment of the invention;

FIG. 9(A) is a side elevation view of a spool in accordance with at least one embodiment of the invention;

FIG. 9(B) is a top plan view of a spool in accordance with at least one embodiment of the invention;

FIG. 9(C) is a front elevation view of a spool in accordance with at least one embodiment of the invention;

FIG. 9(D) is an isometric view of a spool in accordance with at least one embodiment of the invention;

FIG. 10(A) is a side elevation view of a spool in accordance with at least one embodiment of the invention;

FIG. 10(B) is a front elevation view of a spool in accordance with at least one embodiment of the invention;

FIG. 10(C) is an isometric view of a spool in accordance with at least one embodiment of the invention;

FIG. 10(D) is a partial side elevation view of a spool in accordance with at least one embodiment of the invention;

FIG. 11(A) is a side elevation section view of a feeding module and supplying module in accordance with at least one embodiment of the invention;

FIG. 11(B) is a top plan view of a feeding module and supplying module in accordance with at least one embodiment of the invention;

FIG. 15(A) is a front elevation view of a dispensing module in accordance with at least one embodiment of the invention;

FIG. 15(B) is a side elevation view of a dispensing module in accordance with at least one embodiment of the invention;

FIG. 15(C) is an isometric view of a dispensing module in accordance with at least one embodiment of the invention;

FIG. 16(A) is a side elevation section view of a portion of a dispensing module in accordance with at least one embodiment of the invention;

FIG. 16(B) is an isometric view of a portion of a dispensing module in accordance with at least one embodiment of the invention;

FIG. 16(C) is a front elevation view of a portion of a dispensing module in accordance with at least one embodiment of the invention;

FIG. 17(A) is a side elevation section view of a portion of a dispensing module in accordance with at least one embodiment of the invention;

FIG. 17(B) is a side elevation section view of a portion of a dispensing module in accordance with at least one embodiment of the invention;

FIG. 17(C) is an isometric view of a portion of a dispensing module in accordance with at least one embodiment of the invention;

FIG. 17(D) is a partial side elevation section view of a portion of a dispensing module in accordance with at least one embodiment of the invention;

FIG. 17(E) is a partial side elevation section view of a portion of a dispensing module in accordance with at least one embodiment of the invention;

FIG. 18(A) is a side elevation view of a dispensing module in accordance with at least one embodiment of the invention;

FIG. 18(B) is an isometric view of a dispensing module in accordance with at least one embodiment of the invention;

FIG. 18(C) is a partial isometric view of a dispensing module in accordance with at least one embodiment of the invention;

FIG. 19(A) is an isometric view of a dispensing module in accordance with at least one embodiment of the invention;

FIG. 19(B) is an isometric view of a dispensing module in accordance with at least one embodiment of the invention;

FIG. 21(A) is a side elevation section view of a dispensing module in accordance with at least one embodiment of the invention;

FIG. 21(B) is a side elevation section view of a dispensing module in accordance with at least one embodiment of the invention;

FIG. 22(A) is a side elevation view of a dispensing module in accordance with at least one embodiment of the invention;

FIG. 22(B) is a side elevation view of a portion of a dispensing module in accordance with at least one embodiment of the invention;

FIG. 22(C) is an isometric view of a dispensing module in accordance with at least one embodiment of the invention;

FIG. 22(D) is an isometric view of a portion of a dispensing module in accordance with at least one embodiment of the invention;

FIG. 23(A) is a front elevation view of a portion of a dispensing module, more precisely a cutting mechanism, in accordance with at least one embodiment of the invention;

FIG. 23(B) is a front elevation view of a portion of a dispensing module, more precisely a cutting mechanism, in accordance with at least one embodiment of the invention;

FIG. 23(C) is a side elevation view of a portion of a dispensing module, more precisely a cutting mechanism, in accordance with at least one embodiment of the invention;

FIG. 23(D) is an isometric view of a portion of a dispensing module, more precisely a cutting mechanism, in accordance with at least one embodiment of the invention;

FIG. 28(A) is a side elevation view of a portion of a balancing weight application apparatus in accordance with at least one embodiment of the invention;

FIG. 28(B) is a front elevation view of a portion of a balancing weight application apparatus in accordance with at least one embodiment of the invention;

FIG. 29(A) is an elevation view of a portion of an application module in accordance with at least one embodiment of the invention;

FIG. 29(B) is a top plan view of a portion of an application module in accordance with at least one embodiment of the invention;

FIG. 29(C) is front elevation view of a portion of an application module in accordance with at least one embodiment of the invention;

FIG. 29(D) is an isometric view of a portion of an application module in accordance with at least one embodiment of the invention;

FIG. 29(E) is front elevation view of a portion of an application module in accordance with at least one embodiment of the invention;

FIG. 29(F) is a side elevation section view of a portion of an application module in accordance with at least one embodiment of the invention;

FIG. 30(A)(i) is a top plan view illustrating a portion of an application module;

FIG. 30(A)(ii) is a side elevation view illustrating a portion of an application module;

FIG. 30(B)(i) is a top plan view illustrating a portion of an application module;

FIG. 30(B)(ii) is a side elevation view illustrating a portion of an application module;

FIG. 30(C)(i) is a top plan view illustrating a portion of an application module;

FIG. 30(C)(ii) is a side elevation view illustrating a portion of an application module;

FIG. 32(A) is an isometric view of a portion of an application module in accordance with at least one embodiment of the invention;

FIG. 32(B) is a side elevation section view of a portion of an application module in relation with a wheel in accordance with at least one embodiment of the invention;

FIG. 32(C) is a top plan view of a portion of an application module in relation with a wheel in accordance with at least one embodiment of the invention;

FIG. 33(A) is a side elevation section view of a portion of an application module in relation with a wheel in accordance with at least one embodiment of the invention;

FIG. 33(B) is a top plan view of a portion of an application module in relation with a wheel in accordance with at least one embodiment of the invention;

FIG. 34(A) is a front elevation view of a conveying module in accordance with at least one embodiment of the invention;

FIG. 34(B) is a side elevation view of a conveying module in accordance with at least one embodiment of the invention;

FIG. 34(C) is a front elevation view of a conveying module in accordance with at least one embodiment of the invention;

FIG. 36(A) is a schematic side elevation view of a portion of a conveying module in accordance with at least one embodiment of the invention;

FIG. 36(B) is an isometric view of a portion of a conveying module in accordance with at least one embodiment of the invention;

FIG. 36(C) is an isometric view of a portion of a conveying module in accordance with at least one embodiment of the invention;

FIG. 36(D) is an isometric view of a portion of a conveying module in accordance with at least one embodiment of the invention;

FIG. 36(E) is an isometric view of a portion of a conveying module in accordance with at least one embodiment of the invention;

DETAILED DESCRIPTION OF PREFERRED EMBODIMENTS

Figure 1:
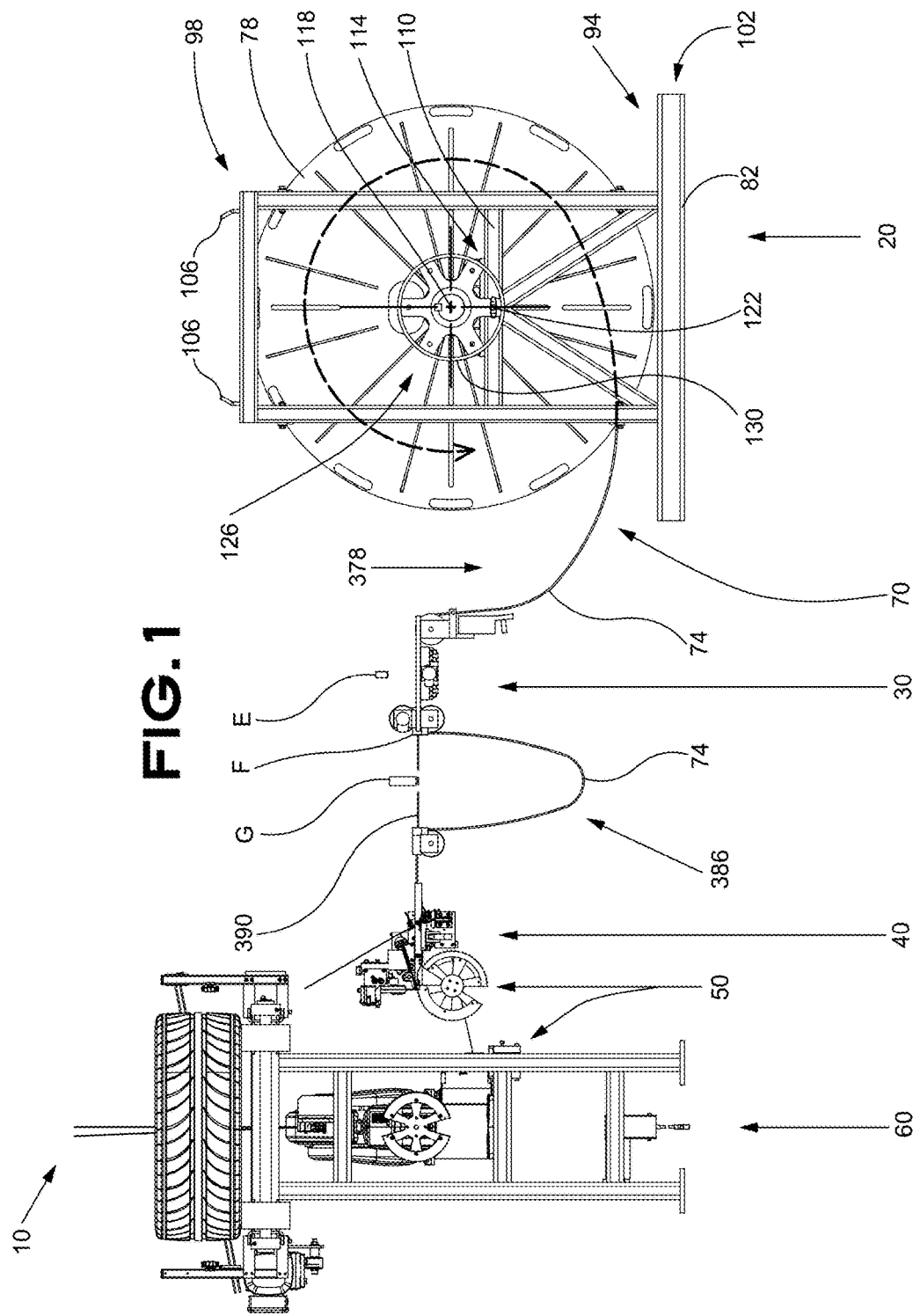
FIG. 1 is a side elevation view of a balancing weight application apparatus in accordance with at least one embodiment of the invention.

Embodiments of the present invention are described bellow with reference to the appended Figures. An exemplary balancing weight application apparatus 10 is illustrated in FIG. 1. The balancing weight application apparatus 10 is designed to manage the procurement of a specific mass of wheel-balancing weights 70 that come in strips 74 to be secured to a wheel and balance the wheel. The illustrated embodiment of the balancing weight application apparatus 10 is separated in a plurality of exemplary modules for ease of understanding. The first module is a supplying module 20 followed by a feeding module 30, a dispensing module 40, an application module 50 and a conveying/transport module 60.

The embodiments illustrated in the Figures and described in the specification are describing a balancing weight application apparatus 10 with a possible configuration of a supplying module 20 followed by a feeding module 30, a dispensing module 40 an application module 50 and a conveying module 60. However, a balancing weight application apparatus 10 can include a plurality of supplying modules 20, feeding modules 30 and dispensing modules 40 to provide redundancy and prevents stopping the wheel-balancing weights assembly line for maintenance or recharging purposes. Redundancy can also be used to provide weights 70 of different colors, shapes, finishes or of different masses without departing from the scope of the present application.

The supplying module 20 provides a continuous strip 74 of weights 70 to the balancing weight application apparatus 10. The strip 74 is generally a juxtaposed series of weights 70 secured to each other with a tape 76 to continuously supply a desired number of weights 70 to the balancing weight application apparatus 10. Each weight 70, generally made of a heavy material like steel, lead or tungsten, is generally distinct from the other adjacent weights 70 hence allowing some movement therebetween. The exemplified proportions, length, height and width of a weight 70 are standardized for ease of packaging and management predictability. However, the balancing weight application apparatus 10 can manage weights 70 of different proportions that can be better adapted for particular applications. The strip 74 allows long productivity cycles without having to refill the supplying module 20 with an additional strip 74 of weights 70. Other alternate weights-supplying configurations that could be used with the balancing weight application apparatus 10 and remain within the scope of the present application despite the illustrated embodiments are limited to some possible configurations for illustrative purposes.

The supplying module 20 generally uses a strip 74 of weights 70 that is winded on a spool 78 for compact shipment and easy manipulation. Each spool 78 of weights 70 can be operatively installed in the balancing weight application apparatus 10 in a manner suitable to provide weights 70 to the feeding module 30. The spool 78 of weights 70 can be secured in a spool support 82 to further facilitate shipment and manipulation thereof. The spool support 82 can support the spool 78 and allow controlled unwinding of the strip 74. In that configuration, the spool support 82 is equipped with bearing portions (illustrated in FIG. 4) to rotate the spool 78 and unwind the strip 74 to provide weights 70 to the balancing weight application apparatus 10. The spool support 82 can be sized and designed to be movable with a fork lift in an embodiment thereof.

A different embodiment of the spool support 82 is illustrated in FIG. 2. The spool support 82 can cooperate with a spool actuator 86 operatively connected to the spool support 82, or to the spool 78 housed in the spool support 82, to actuate and control the unwinding of the strip 74 stored in the spool 78 when feeding the balancing weight application apparatus 10. The spool actuator 86 is preferably disposed along the spool axle 118 to operatively connect the spool 78 in a compact arrangement. Under certain circumstances, the spool actuator 86 can reduce rotation speed or wind the spool 78 when, for example, too much slack is found in the strip 74 of weights 70. FIG. 2 a) illustrates a first configuration where a portion of the spool 78 is not operatively connected to the spool actuator 86. Conversely, FIG. 2 b) illustrate a second configuration where the spool support 82 is operatively connected to the spool actuator 86. More details about the engagement between the spool actuator 86 and the spool support 82 is going to be provided below.

The embodied spool support 82 includes a frame 90 with a lower portion 94 adapted to contact the floor and an upper portion 98 generally configured to secure and protect the spool 78 in addition to allow rotational movements of the spool 78. The lower portion 94 optionally includes a fork receiver 102 sized and designed to cooperate with a fork lift for efficient transportation. The upper portion 98 generally extends vertically on each lateral side of the spool 78 to maintain the spool 78 in a vertical position. Optional anchors 106 are provided on an upper portion 98 of the spool support 82 for further securing and lifting possibilities. The anchors 106 can also be configured to align spool supports 82 when staking them. As best seen in FIG. 1, spool support members 110 are located about a height corresponding to a radius of the spool 82 to locate bearing elements 114 rotatably supporting a spool axle 118 for rotating the spool 82 in respect with the spool support 82 about the spool axle 118. A locking mechanism 122 is provided to lock the rotation of the spool 78 in respect with the spool support 82 to prevent any unwinding of the spool 78. The locking mechanism 122 is embodies as a spring loaded stem for illustrative purposes.

A spool actuation portion 126 is connected to the spool 78 and is used in collaboration with the spool actuator 86 for rotating the spool 78. The spool actuation portion 126 is embodied in the Figures as a circular member 130 on a side of the spool support 82 that gets in contact with the spool actuator 86 when the spool support 82 is located in an operating position in respect with the spool actuator 86 as it is illustrated in FIG. 2 b). In the illustrated embodiment, the spool actuation portion 126 is laterally located in respect with the spool support 82 and axially aligned with the spool axle 118.

The spool actuator 86 is located in proper position in respect with the feeding module 30 such that the strip 74 be properly aligned with the feeding module 30 for operation. In the present embodiment, the spool actuator 86 is disposed on a lateral side of the spool support 82 and is preferably secured to the ground to remain at the desired location to properly engage with the spool actuation portion 126 of the spool support 82. Indeed, the spool actuator 86 includes a mechanism for rotatably actuating the spool 78 in the spool support 82. The spool actuator 86 could be used to actuate directly a spool 78 in an embodiment where the spool 78 can be directly actuated without a spool support 82. Another embodiment could directly feed the strip 74 of weights 70 to the balancing weight application apparatus 10 however this is less desirable given the reduced unwinding control of the strip 74.

The mechanism for actuating the spool 134 is embodied in the present situation as a pair of rollers 138 adapted to selectively engage the circular member 130 of the spool support 82. The pair of rollers 138 is made of a material sufficiently strong to sustain the mechanical load applied thereon and offer sufficient friction to rotate the spool 134. For example, a metallic wheel covered with rubber would be an acceptable choice. A drive portion 138 illustratively including a motor 142 (i.e. servo, AC, DC motor, variable frequency drive . . . ) operatively connected to a ratio-altering gearbox 146 and transmission elements 150 are used to rotatably drive the spool 78 to feed the strip 74 of weights 70 in the balancing weight application apparatus 10. A tensioner 154 applies pressure on a chain 158 (or a belt) between the gearbox 146 and the rollers 138. The motor 142, that can be electric, hydraulic or otherwise driven, is managed electronically to rotate the spool 78 and provide weights 70 at a desired rate.

A lifting mechanism 162 is used to change the height of the rollers 138 to selectively engage the spool actuation portion 126, in a lifted position 166 illustrated in FIG. 3 a), and to disengage the spool actuation portion 126, in a lowered position 170 illustrated in FIG. 3 b). Contact between the rollers 138 and the spool actuation portion 126 has to be sufficient to transmit rotational movement without slipping and does not necessarily require to lift the side of the spool 78. The present embodiment proposes a pivotal motion 174 of a main member 178 of a spool actuator frame 182 about a pivot 184 between the lifted position 166 and the lowered position 170. An actuator 188 is operatively secured between a distal end 186 of the main member 178 and a fixed portion 190 of the spool actuator frame 182. Sensor A detects the remaining quantity of strip 74 in a spool 78 with, for instance, detecting a presence of strip 74 through the axially proximal opening 214. Other configuration of parts could alternatively lead to such determination without departing from the scope of the description.

Different configurations of spools 78 are encompassed by the present application. A single spool 78 can be used in the supplying module 20. A plurality of spools 78 can alternatively be used in the supplying module 20. Some possible embodiments are discussed in greater details below without disclaimer of other non-illustrated embodiments. For example, spools 78 including a strip 74 of weights 70 of about 9 kg (about 20 pounds) can be used for easy replacement. Spools 78 including a strip 74 of weights 70 of about 90 kg (about 200 pounds) can be used for long continuous operation and spools 78 including a strip 74 of weights 70 of about 225 kg (about 500 pounds) can be used for extended operation. Alternatively, large spools 78 can accommodate a strip 74 of weights 70 of up to 900 kg (about 2000 pounds) can be used for extended operating periods. Referring now to FIG. 4, illustrating a plurality of adjacent spools 78, one can appreciate that thin spools 78 can be used in combination. A thin spool 78 has a width of a weight 70 and hence houses a strip 74 where weights 70 are superposed on top of each other with each turn of the spool 78. The embodiment shown in FIG. 4 has eight (8) adjacent spools 78 separated with a spool wall 194 therebetween. In other words, it could equally be described as a single spool 78 with a plurality of strip-receiving slots 198 separated by slot-separating walls 202. A plurality of adjacent spools 78 can provide weights 70 of different masses and/or different colors to match the color of the wheel to balance. For instance, black weights 70 can be use to correct the balance of black wheels and grey weights 70 can be use to correct the balance of grey wheels to reduce the visual impact of the weights 70 applied on the wheel 748.

Figures 5A, 5B:
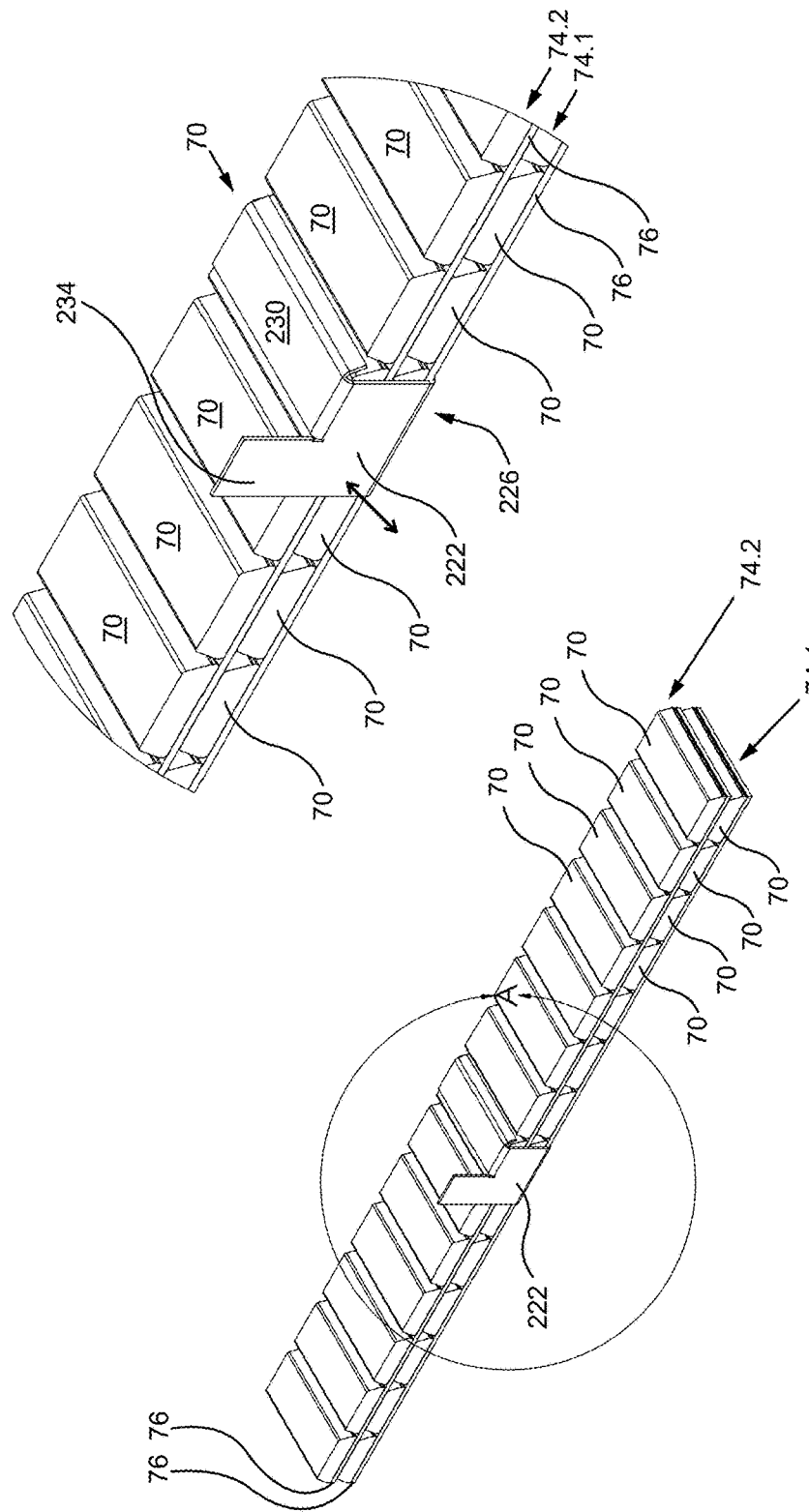
FIG. 5(A) is an isometric view of a portion of a balancing weights strip in accordance with at least one embodiment of the invention.
FIG. 5(B) is an isometric view of a portion of a balancing weights strip in accordance with at least one embodiment of the invention.

Lateral slot-separating walls 206 include reinforcing ribs 210. An axially proximal opening 214 is used to secure a first end of a strip 74 in the strip-receiving slot 198 to hold in place an end of the strip 74 and begin winding the strip 74 on the spool 78. Axially distal openings 218 are disposed on the periphery of the slot-separating walls 202 (or on the lateral walls of a single spool 78) to lock a second end of the strip 74 on the spool 78 to prevent undesired unwinding of the strip 74 when the spool 78 is full. A securing clip 222 illustrated in FIG. 5 can be used as an example of a workable locking mechanism that can be installed on the spool 78 via the axially distal openings 218 to prevent undesired unwinding of the strip 74. The securing clip 222 has a bottom portion 226 slipped under a previous layer of strip 74.1 joined with a top portion 230, that is optionally shaped with the profile of a weight 70, to hold the superposed layer of strip 74.2 to the previous layer of strip 74.1 hence preventing undesirable unwinding of the strip 74 from the spool 78. A handle 234 is provided on the clip 222 for easy removal of the securing clip 222.

Each spool 78 can be associated with a unique identification. Embedded RFID in each spool 78, bar code on the spool 78, unique identification number, or other identification means can be used for identifying each spool 78 and the products thereon. This allows of product acceptance and compliance with the apparatus 10 requirements. Compliance of spools 78 can be made automatically or require an associated key code to be received by the apparatus 10. The spool is uniquely identified and the number of weights 70 thereon is known thus allowing traceability of the weights 70. For example, spool #2016A200 includes 200 kilograms of weights 70, each weights 70 having 100 grams with known size, width, length and thickness. In the present illustrative example, it is known two thousand (2000) weights 70 are housed on the spool 70. Each wheel 748 is also uniquely identified on the installation line. For instance, weights #242 to #249 of spool #2016A200 are known to be installed on wheel #762898. Additionally, the application pressure used by the robot 636 to secure the weights 70 on the wheel 748 is also known and recorded for complete product traceability. The application pressure of specific weights 70 on a particular wheel 748 can be identified should the weights 70 later reveal not to be secured strongly enough to the wheel 748 and pressure adjustment can be made.

FIG. 6 illustrates an embodiment of a spools manager assembly 240. The exemplified spool manager assembly 240 includes a frame 244 forming a structure adapted to house one of a plurality of spools 78 in a spools receptacle 242. The exemplified spools manager assembly 240 is including a spool-supporting axle 248 adapted to receive thereon and support a plurality of individual spools 78. Each spool 78 in the illustrated configuration is containing, for example, a strip 74 of weights 70 of about 9 kg (about 20 pounds) each. As mentioned above, each individual spool 78 can accommodate weights 70 of different configurations, sizes, finishes, colors or masses to provide a plurality of different weights 70. The spools manager assembly 240 of the illustrated embodiment includes a spool-supporting shaft 248 secured to the frame 244, in cantilever in the illustrated embodiment, thus allowing axial insertion and removal of spools 78. The illustrated spools manager assembly 240 can accommodate ten (10) spools 78 although a different number of spools 78 could be used. The spools 78 stored in the spools receptacle 242 are rotatably restricted about the spool axle 118 by one or a plurality of spool angular locating members 250 axially projecting from the side holding the spool-supporting axle 248. The spool angular locating members 250 are engaging openings 274 in each spool 78 to prevent undesired rotation of the spools 78. Indeed, the spools 78 could have a tendency to unwind given the significant mass of the strip 74 of weights 70 enclosed therein. The openings 274 pattern is designed such that the spools 78 are all located in a single possible angular position to ensure the end of the strip 74 is going to be located at the same position for each of the spools 78. The spool angular locating members 250 have preferably an axial length similar to the length of the spool-supporting shaft 248 to axially push all the spools 78 on the spool-supporting shaft 248.

The spool manager assembly 240 further includes a push member 254 adapted to axially move to axially push the spools 78 out of the spool-supporting shaft 248. Axial movement of the push member 254 in the illustrated configuration is actuated by a servo motor 256 (other alternative means for knowing the angular and/or linear position of the push member 254 are contemplated in the present application) operatively connected to the push member 254 with a pair of pulleys 260 and a belt 264 tensed with an optional tensioner 268. The servo motor 256 can selectively move the push member 254 in both axial directions and is configured to move by increments of one or more spool 78 thickness. The embodied mechanism axially moves the push member 254 without rotating it about the spool-supporting shaft 248.

The spools receptacle 242 of the spools manager assembly 240 is used in cooperation with a spool unwinder 270. The spool unwinder 270 receives a spool 78 from the spools receptacle 242, as it can be appreciated in FIG. 7, when in the spool loading position 232. The spool unwinder 270 then moves to a feeding position 234 and moves to an unloading position 236 when the spool 78 is empty of strip 74 to unload the empty spool 78 can simply fall in an empty spool receptacle (not illustrated). The push member 254 is used in cooperation with the spool unwinder 270 to push a spool 78 toward the spool unwinder 270 that is axially securing the spool hence mounted thereon for feeding the strip 74 of weights 70 in the balancing weight application apparatus 10. The spool 78 to be unwind and fed to the balancing weight application apparatus 10 is axially located at the feeding position 234 and the spool unwinder 270 rotates to let fall the end of the strip 74 on a strip receiver 392, installed in a strip-reception position 394, to route the strip 74 toward their installation on wheels. One can appreciate the spool unwinder 270 is rotatably actuated by a servo motor 256 in both directions at a desired speed to engage the strip 74 of weights 70 in the apparatus 10.

Figure 7A:
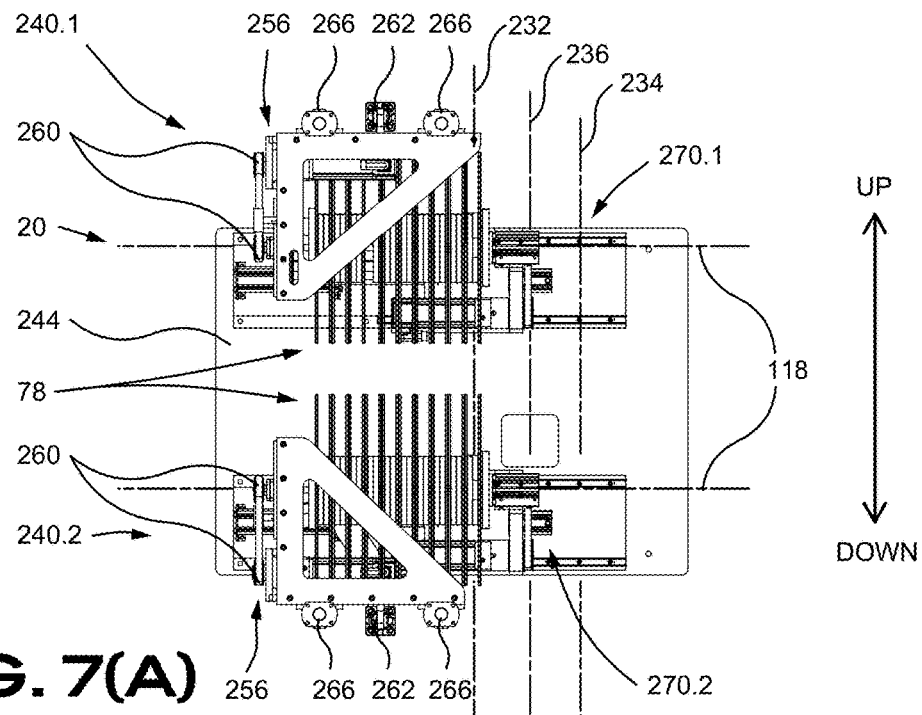
FIG. 7(A) is a top plan view of a double feeding module and supplying module in accordance with at least one embodiment of the invention.
Figure 7B:
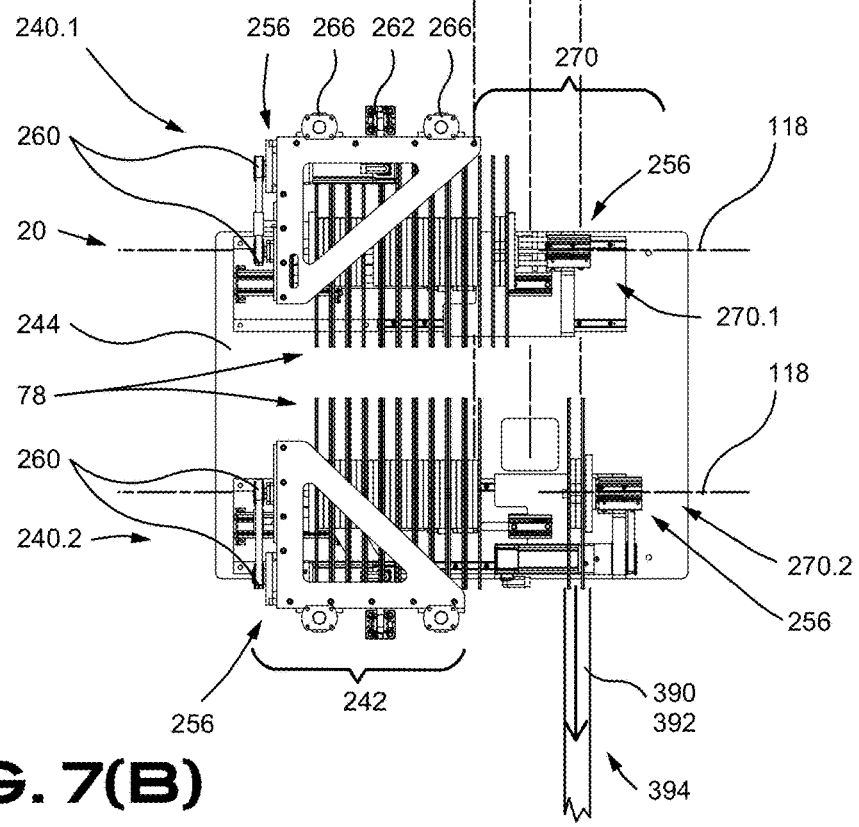
FIG. 7(B) is a top plan view of a double feeding module and supplying module in accordance with at least one embodiment of the invention.
Figure 8B:
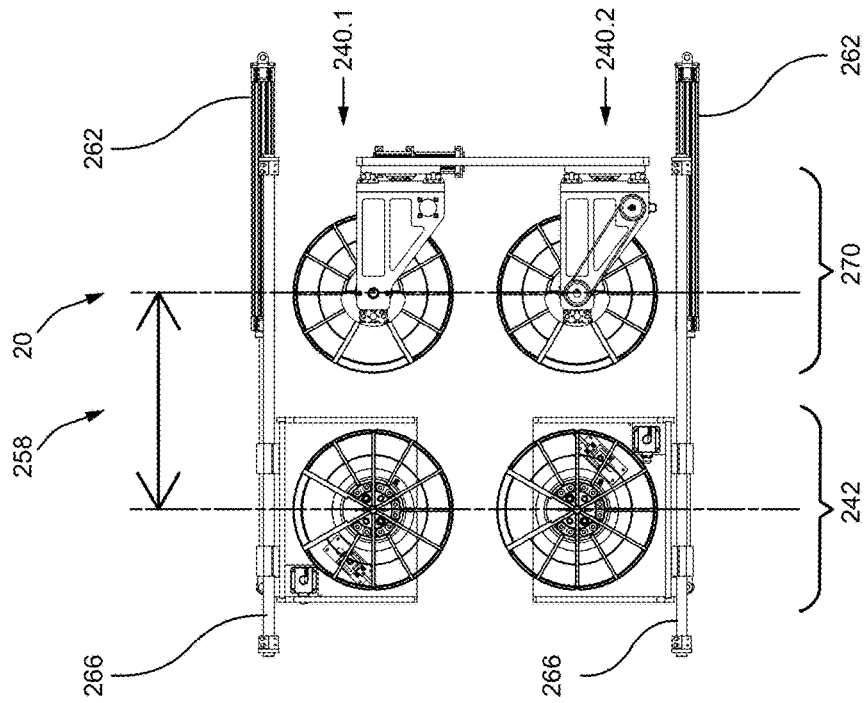
FIG. 8(B) is a side elevation view of a double feeding module and supplying module in accordance with at least one embodiment of the invention.
Figure 8A:
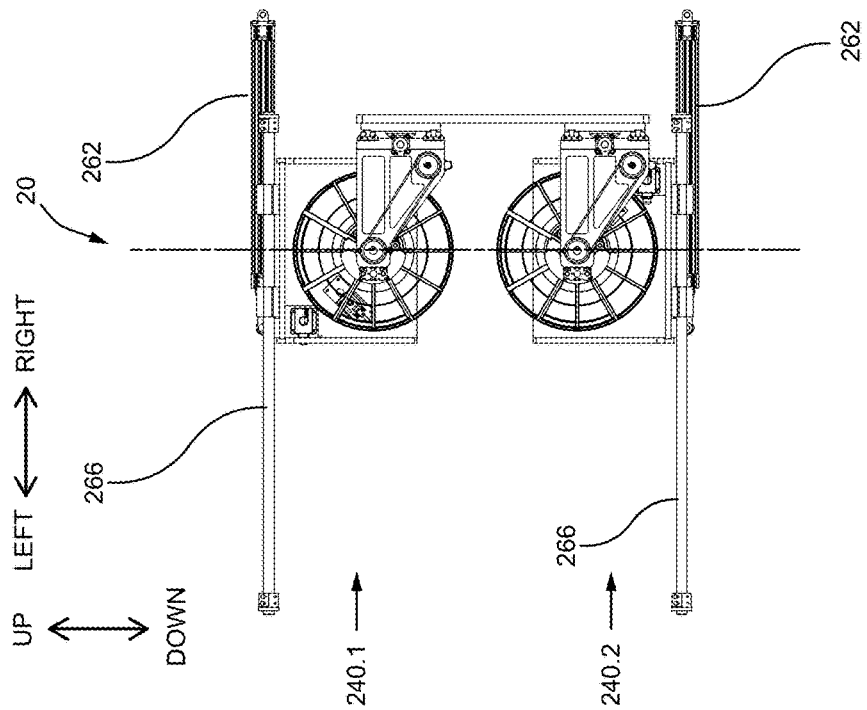
FIG. 8(A) is a side elevation view of a double feeding module and supplying module in accordance with at least one embodiment of the invention.

The supplying module 20 illustrated in FIG. 7 and FIG. 8 is embodied with a plurality of spools manager assemblies 240.1 and 240.2. This provides a choice of weights 70 having different characteristics to be fed in the apparatus 10. For instance, a first spools manager assembly 240.1 could provide grey colored weights 70 to match grey colored or greyish wheels 748 and alternatively provide with the second spools manager assembly 240.2 weights 70 having different characteristic, like black colored weights 70 to match black or dark wheels 748 as identified by the sensors listed below. Referring to FIG. 7, the spools manager assembly 240.1 and its counterpart spool unwinder 270.1 are in the loading position 232 where a spool 78 is mounted on the unwinder 270.1. As best seen in FIG. 7 b), the spool unwinder 270.1 is slightly moved away from the spools manager assembly 240.1 toward the feeding position illustrated with the position of the lower unwinder 270.2. Axial movements of the unwinders 270 are generated by a motor (not shown in the Figures) managed accordingly.

The spools manager assemblies 240 are independently slidably mounted on guide rails 266 and actuated by actuators 262 to be displaced in a spools-loading configuration 258 as depicted in FIG. 8 b). It is possible in the spools-loading configuration 258 to add new spools 78 containing strips of weights 70 in the spool manager assembly 240 because the spool manager assembly 240 is not axially covered by its corresponding unwinder 270. The installation of new spools 78 can be automated or be made manually by an operator. It is noted the rails 266 are illustrated without supporting structures for the benefit of the reader but are secured to a frame or walls to ensure proper mechanical strength in real life operation. The spool unwinder 270 can be used with or without the feeding module 30. The spool unwinder 270 would replace the feeding module 30 and unwinds the strip 74 of weights 70 at a desired rate and the strip would be pulled by an engaging toothed drive wheel 412 located downstream.

The spools 78 used in the previous embodiment are adapted to house a single strip 78 of weights 70 superposed at each turn on the spool 78. A mandrel 272, illustrated with an empty spool 78 in FIG. 9 and illustrated with a spool 78 full of strip 74 therein in FIG. 10, is used between the spool 78 and the spool-supporting shaft 248 to prevent free rotation of the spool 78 about the spool-supporting shaft 248. The mandrel 272 is installed on the spool-supporting shaft 248 with a mechanism preventing rotation of the mandrel 272 in respect with the spool-supporting shaft 248 with, for instance, a key lock in the spool-supporting shaft 248 or engaging the holes 276 of the spool 78.

Another possible embodiment of the supplying module 20 is illustrated in FIG. 11. A wide spool-management module 280 with an associated feeding module 30 is represented in FIG. 11. The wide spool-management module 280 includes a frame 284 forming a structure supporting a wide spool 290 adapted to receive thereon a single wide spool 290 containing, for example, a strip 74 of weights 70 of about 225 kg (about 500 pounds) for extended period of operation without having to recharge or replace the spool 290. The wide spool 290, in the exemplified embodiment, is directly supported by a set of supporting wheels 294 contacting the lateral edges 298 of the wide spool 290. Two of the supporting wheels 298 are free to rotate 302 and the other two supporting wheels 298 are actuated supporting wheels 306 actuated by a motor 310 that is operatively connected to the actuated supporting wheels 306 via a pair of pulleys 314 and a belt 318. The wide spool 284 is secured in place with a tensioner 322 that is also optionally an encoder 326 adapted to provide a signal representing the rotation of the wide spool 294.

The feeding module 30 can be separated or connected with the supplying module 20 without departing from the scope of the invention. The feeding module 30 is associated with the supplying module 20 in the present embodiment because, inter alia, the wide spool 290 has a long winded strip 74 thereon that is winded over the entire axial width of the wide spool 290. This causes a lateral offset 330 of the strip 74 about the center line 334 of the wide spool 290 when unwinding or winding the strip 74. The lateral offset of the strip 74 is causing a challenging twist in the juxtaposed suite of solid weights 70 that can cause weights 70 to disconnect from the strip 74 or break the strip 74. One way to reduce this effect is to manage a first loop 378 reducing the stress in the strip 74 and/or aligning the feeding module 30 with the axial position of the strip 74 on the spool 290. The feeding module 30 illustrated in FIGS. 11-14 includes a carriage 338 configured to be aligned with the axial position of the strip 74 on the wide spool 290. The feeding module 30 includes a lateral actuator 342 actuating a threaded rod 346 to move the carriage 338 on rails 350. The carriage 338 is equipped with an intake pulley 354 receiving the strip 74 of weights 70 from the wide spool 290. The strip 74 then moves over a supporting floor 358 to reach a pair of superposed pulleys 362. One of the superposed pulley 362 is an actuated pulley 366 driven by a servo motor 370, or any other mean for achieving the task, and can optionally be toothed to engage the weights 70 and prevent slipping along the strip 74. Accurate contact with the weights 70 is ensured by a contacting pulley 374 opposed to the actuated pulley 366.

A number of sensors are used to manage feeding of the strip 74 from the spool 290 with the feeding module 30. The sensors are going to be identified with capital letters in the description as listed below in Table 1. The list of sensors that can be used in the balancing weight application apparatus 10 follows.

TABLE 1

| | Sensors description | Location | Sensor type |
|---|---|---|---|
| A | Weights strip thickness on spool (remaining quantity) | Supplying module | Laser |
| B | Weights strip first loop accumulation (radial for tension in strip) | Feeding module | Proximity (photocell) |
| C | Weights strip first loop accumulation (right lateral for strip alignment) | Feeding module | Proximity (metal detection) |
| D | Weights strip first loop accumulation (left lateral for strip alignment) | Feeding module | Proximity (metal detection) |
| E | Weights strip presence before feeding module toothed wheel | Feeding module | Proximity (optic fiber) |
| F | Weights strip presence after feeding module toothed wheel | Feeding module | Proximity (optic fiber) |
| G | Weights strip second loop accumulation | Feeding module | Laser |
| H | Weights strip presence applicator module entry (before toothed wheel in embodiment 1 and before lifting floor in embodiment 2) | Dispensing module | Proximity (optic fiber) |
| I | Weights strip junction tape presence; strip joint identification (before toothed wheel in embodiment 1 and before lifting floor in embodiment 2; but just before peeler to lower peeler at joint) | Dispensing module | Contrast |
| J | Weights strip protection tape presence (protective tape removal confirmation after peeler) | Dispensing module | Contrast |
| K | Weights localization (in-between weights aligned with cutter) | Dispensing module | Proximity (optic fiber) |
| L | Weights localization in application module in position for hand | Dispensing module | Proximity (optic fiber) |
| M | Applicator hand location about wheel | Application module | Laser 3x |
| N | Axial sensor on tool | Application module | Proximity |
| O | Wheel profile | Conveying module | Laser |
| P | Wheel size, color and dot localization | Conveying module | Camera |
| Q | Wheel presence on conveyor module (end of line) | Conveying module | Proximity (photocell) |
| R | Weight presence sensor on tool | Application module | Laser |

Figure 12:
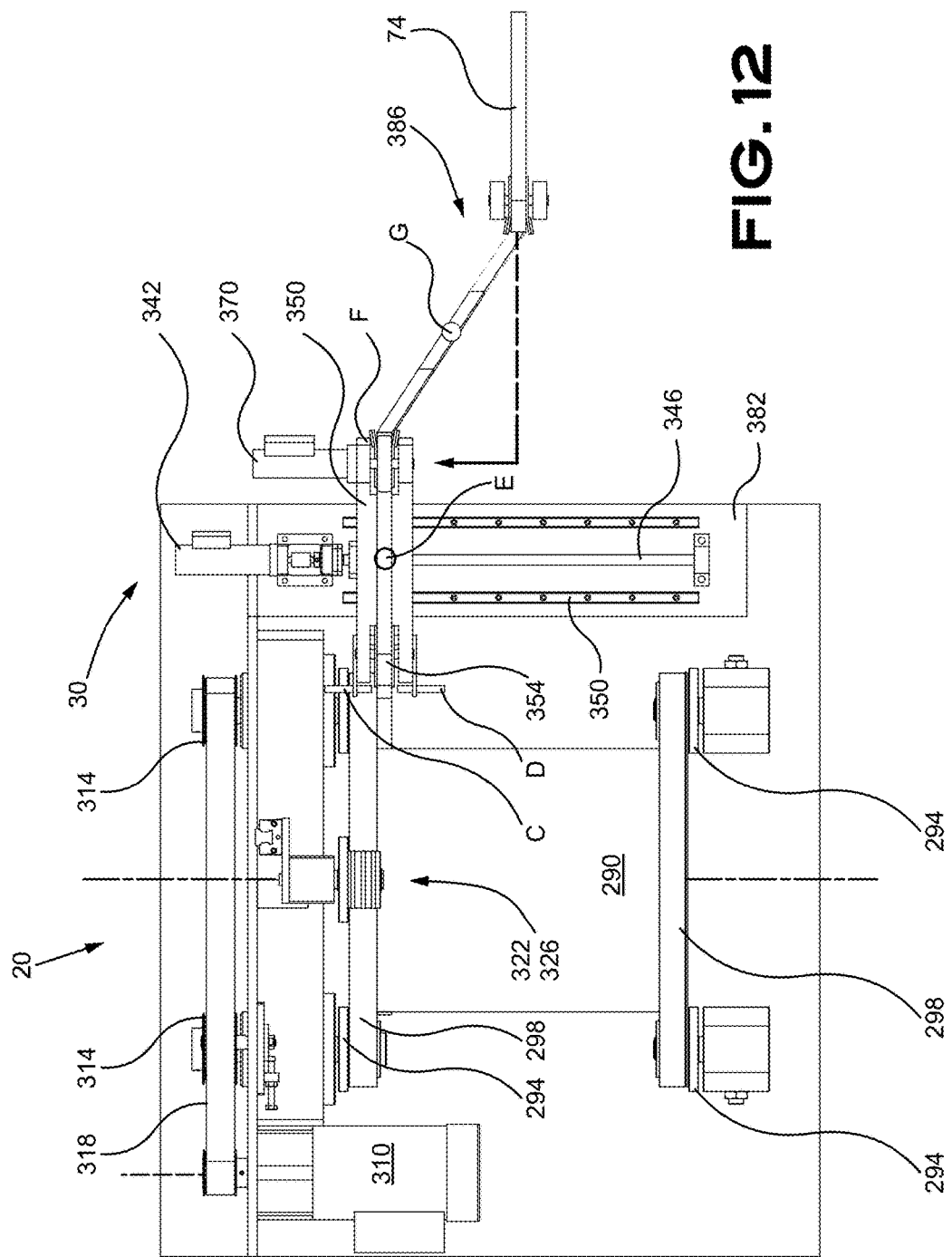
FIG. 12 is a top plan view of a feeding module and supplying module in accordance with at least one embodiment of the invention.
Figure 13:
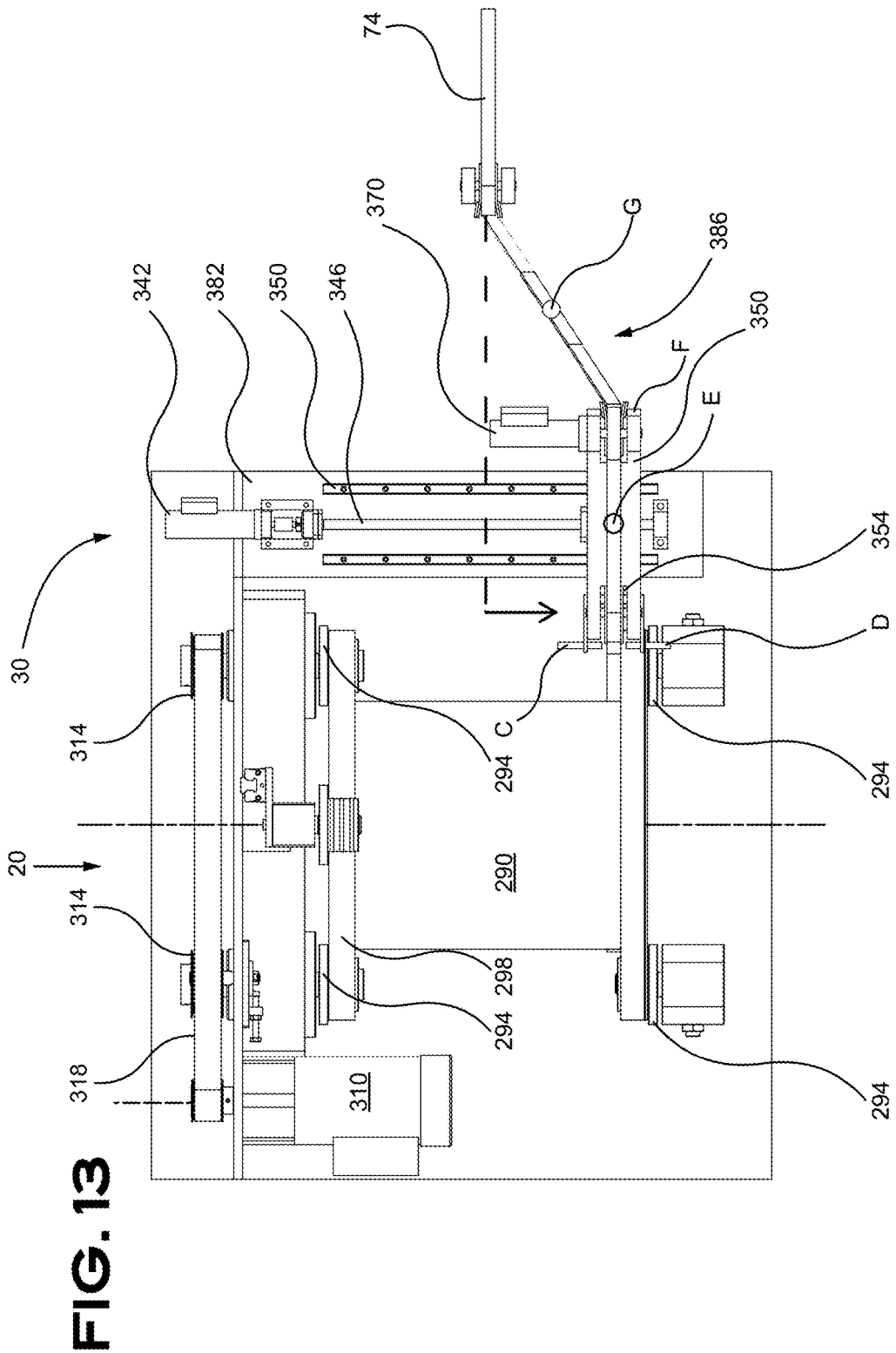
FIG. 13 is a top plan view of a feeding module and supplying module in accordance with at least one embodiment of the invention.
Figure 14:
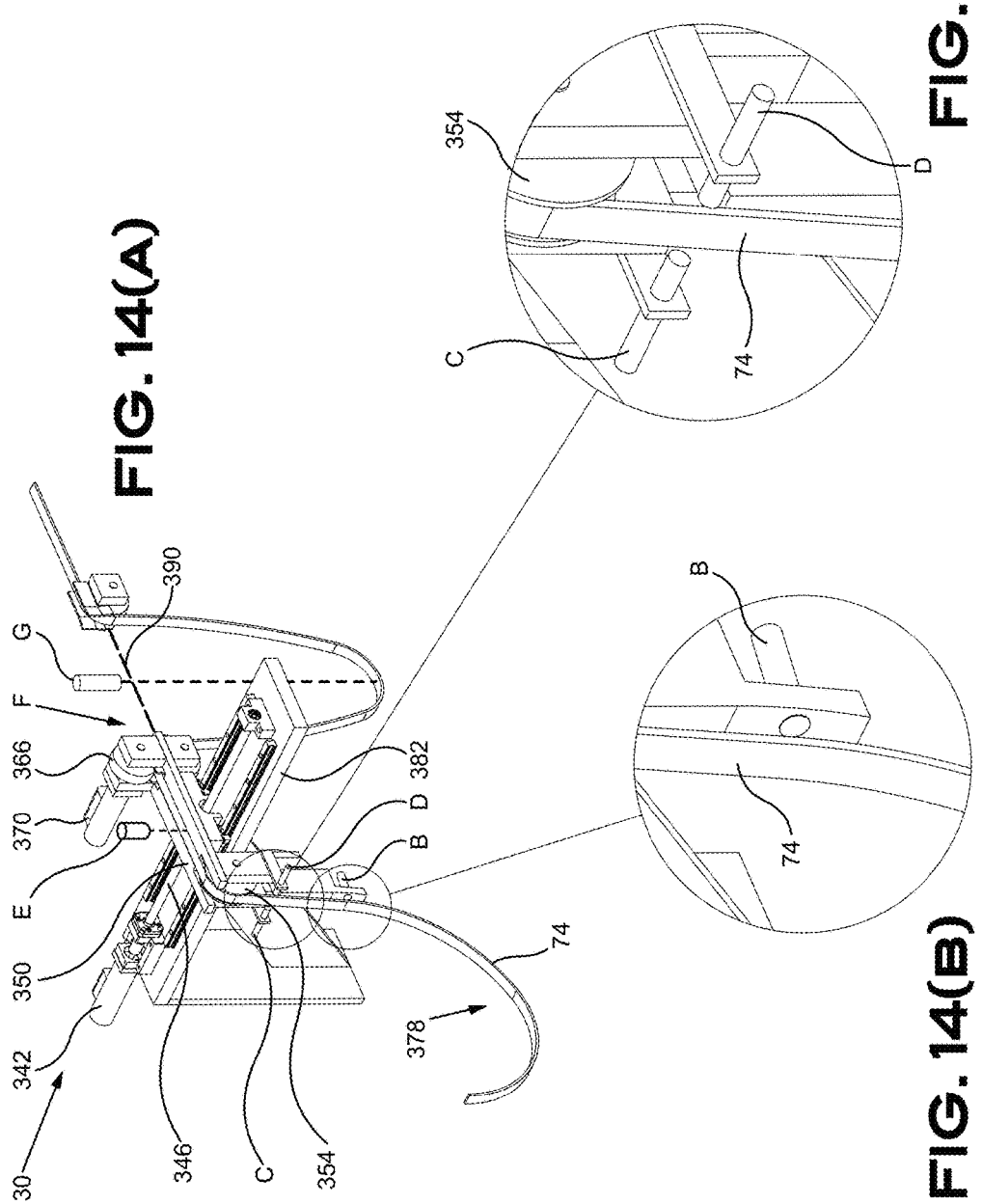
FIG. 14(A) is an isometric view of a feeding module in accordance with at least one embodiment of the invention.
FIG. 14(B) is a partial isometric view of a feeding module in accordance with at least one embodiment of the invention.
FIG. 14(C) is a partial isometric view of a feeding module in accordance with at least one embodiment of the invention.

So, proximity sensor B is used to detect the proximity of the strip 74 at the first loop 378, after the spool 290 and before the intake pulley 354 of the feeding module 30. The speed at which the spool 290 is actuated to unwind the strip 74 can me modified with the management of the motor 310 to keep the first loop 378 within a desired range. If the range of the first loop 378 is getting too small, the unwinding of the strip 74 is going to accelerate and, conversely, if the range of the first loop 378 is getting too large the unwinding of the strip 74 is going to decelerate. Two proximity sensors C, D are detecting the lateral proximity of the strip 74 thereof to manage and adjust the lateral location of the carriage 338 accordingly. If the strip 74 moves closer to lateral sensor C, the carriage is going to move in the direction of lateral sensor C to re-align the position of the strip 74 between the two lateral sensors C, D. In contrast, if the strip 74 moves closer to lateral sensor D, the carriage is going to move in the direction of lateral sensor D to re-align the position of the strip 74 between the two lateral sensors C, D. Another sensor E is detecting the strip 74 presence before the feeding module 30 superposed pulleys 362. Sensor F is detecting the strip 74 presence after the feeding module 30 superposed pulleys 362. Lateral movements of the carriage 338 in both lateral directions are illustrated in FIG. 12 and FIG. 13. One can appreciate from FIG. 14 an isometric view of isolated feeding module 30 supported by its frame 382.

Sensor G is detecting the proximity of the strip's 74 second loop 386 to adjust the range of the second loop 386 within a desired range. The loops 378, 386 are wanted to reduce the effect of possible supplying rate variation of the strip 74 to the rest of the balancing weight application apparatus 10. For example, if the supplying rate is too slow or too fast, the first loop 378 is going to damp the rate variation. Another example is during a spool 78 replacement. The additional strip 74 in the first loop 378 and the second loop 386 can be used when the new spool 78 is installed. The additional strip 74 in the first loop 378 and the second loop 386 can be adjusted to prevent the balancing weight application apparatus 10 to stop and maintain a continuous functioning when replacing empty spools 78 with new spools 78 full of weights 70. A removable bridge 390 can optionally be installed between the feeding module 30 and the dispensing module 40 to ease the connection between the end of a strip 74 and the beginning of a new strip 74.

An exemplary drive mechanism 400 for the dispensing module 40 is embodied in FIG. 15. The drive mechanism 400 is used in this embodiment to move the strip 74 of weights 70 toward the application module 50. The drive mechanism 400 is driven by, inter alia, a servo motor 404 operatively rotating circular drive portion 408. The circular drive portion 408 of the illustrated embodiment is a toothed drive wheel 412 where each tooth is sized to engage a weight 70. The toothed wheel 412 includes an array of radial protrusions 416 configured to engage intervening sides of the weights 70 to drive the strip 74 without slippage. The illustrated embodiment depicts a toothed drive wheel 412 including an optional radial void portion 416, that is a space made to fit a strip supporting member engaging in the radial void portion 416 to provide a continuous vertical support to the strip 74 along the strip 74 displacement and transfer to or from the wheel 748. The radial void portion 416 is allowing toothed drive wheel 412 lateral contacts with the weights 70 while being supported all along. The opposite configuration can also be used and the toothed drive wheel 412 can alternatively include a pair of radial void portions on axial each side thereof. The strip 74 is driven on a supporting rail 420 and is laterally guided by removable side rails 424. Optionally, the side rails 424 include upper rails 426 ensuring the strip 74 of weights 70 is not going to lift and disengage from the toothed drive wheel 412. The side rail 424 is removably secured with some fasteners 420. The toothed drive wheel 412 is generally located below the rail 424 and partially extends through the rail 424 to engage the weights 70. The motor 404 is a servo motor that can be selectively actuated to move the strip 74 of a desired length/mass to dispense a desire number of weights 70 to be applied on a wheel. The motor 404 is interconnected with a gearbox 428 that can modify the ratio of the motor 404, if desired. The gearbox 428 also change the direction of the drive axis 432 of the motor 404 of 90 degrees in accordance with the mechanical requirements of the illustrated embodiment.

In contrast, FIG. 17 illustrates a rail 420 of the dispensing module 40 that is not used in conjunction with a servo motor 404 and a drive wheel 412 in a motor-less embodiment of the invention. Instead, the embodiment depicted in FIG. 17 is using the robot tool 640 of the application module 50 to pull drive the strip 74 instead of a drive wheel 412 as previously described. In this configuration, the robot 636 of the application module 50 is going to pull and/or push the strip 74 of weights 70 along the rail 420 in consequence of the instructions to do so provided by the control module 1066.

The strip 74 of weights 70 includes a tape 76 covered with a protective liner 436 preventing a sticky portion 456 of the tape 76 to undesirably stick to other objects or get dirty and eventually not stick properly to the wheel. The protective liner 436 must be removed before securing the weights 70 to the wheel. A liner peeler 440 is part of an embodiment of the dispensing module 50 to remove the liner 436, as depicted in FIG. 17, showing the motor-less embodiment described above. The peeler 440 is operatively located near the end of the rail 420 to peel the liner 436 before the weight 70, or the series of weights 70, is taken by the application module 50 to be secured to the wheel. As illustrated in the embodiment, the peeler 440 has a hook-shaped configuration that includes a liner-contacting portion 444 moving between a low liner-engaging position 448 and a high liner-removing position 452. The liner-engaging position 448 locates liner-contacting portion 444 low on the tape 76 to rub the tape 76 and remove the liner 436 from the tape 76. The liner-contacting portion 444 of the peeler 440 can even interfere with the thickness of the tape 76, in the sticky portion 456 of the tape 76, lower than the thickness of the liner 436 of about between 0 mm and 1 mm as illustrated in FIG. 17 d), to engage the beginning of the liner 436. Once the liner 436 is engaged the liner-engaging portion 448 of the peeler 440 can be raised to the liner-removing position 452, as illustrated in FIG. 17 e), slightly above the tape 76 of about between 0 mm and 4 mm, to prevent touching the tape 76. A liner-guiding edge 454 disposed slightly above the tape 76 is used in cooperation with the peeler 436 to direct the liner 436 in a different direction than the weights 70. The removed liner 436 can optionally be ejected in a liner guide 460 to help prevent undesirable mix up of the tape 76 in the mechanism. Movement of the peeler 436 between the liner-engaging position 448 and the liner-removing position 452 is managed by a peeler actuator 464 to perform a fraction of a turn about a peeler axis 468 to reach the two positions 448, 452. The peeler actuator 464 can be embodied as a pneumatic cylinder with a limited stroke or another actuator adapted to perform the desired movement. An optional strip-locking mechanism 472 is depicted in FIG. 17 c). The strip-locking mechanism 472 selectively locks the strip 74 in the rail 420 when no movement of the strip 74 is desirable. Strip 74 presence sensor H is preceding the peeler 436 to detect the strip 74 presence. Weights strip junction tape presence sensor I is located just before the peeler 440 to actuate the peeler 440 when a liner 436 discontinuity is detected so that the peeler 440 can be lowered and be placed in the liner-engaging position 448.

An alternate embodiment for removing the liner 436 from the strip 74 is illustrated in FIG. 18. The tape 76 can be manufactures with some additional properties. For instance, the liner 436 protecting the tape 76 can react to heat and detach from the sticky portion 456 of the tape 76. A heat gun 480 blows hot air through a directing nozzle 484 to heat the tape 76 and detach the liner 436 to engage the tape 76 with the peeler 440. The hot air from the nozzle 484 is directed to the region of the peeler 440 to locally heat the tape 76 for a predetermined duration to avoid overheating the tape 76. The heat gun 480 can be selectively actuated when a new strip 74 of weights 70 is feed in the balancing weight application apparatus 10, when the strip junction tape presence sensor I senses a discontinuity in the tape 76, to put the peeler 440 in the liner-engaging position 448 to engage the forward end of the liner 436 with the peeler 440. The actuation mechanism managing the displacement of the strip 74 in the dispensing module can move back the strip 74 when a junction tape or a liner 436 is sensed by presence sensor I by moving back the strip 74 and attempt to re-engage the liner 436 with the peeler 440 with a following forward movement of the strip 74.

It is also possible to appreciate from FIG. 18 and FIG. 19 the dispensing module 50 is optionally equipped with a liner-cutting mechanism 490 including an actuator 494 actuating a scissor portion 498 following the liner guide 460 (not illustrated in FIG. 18). The liner 436 can hence be cut to a predetermined length in order to more easily manage the removed liner 436.

Figure 20B:
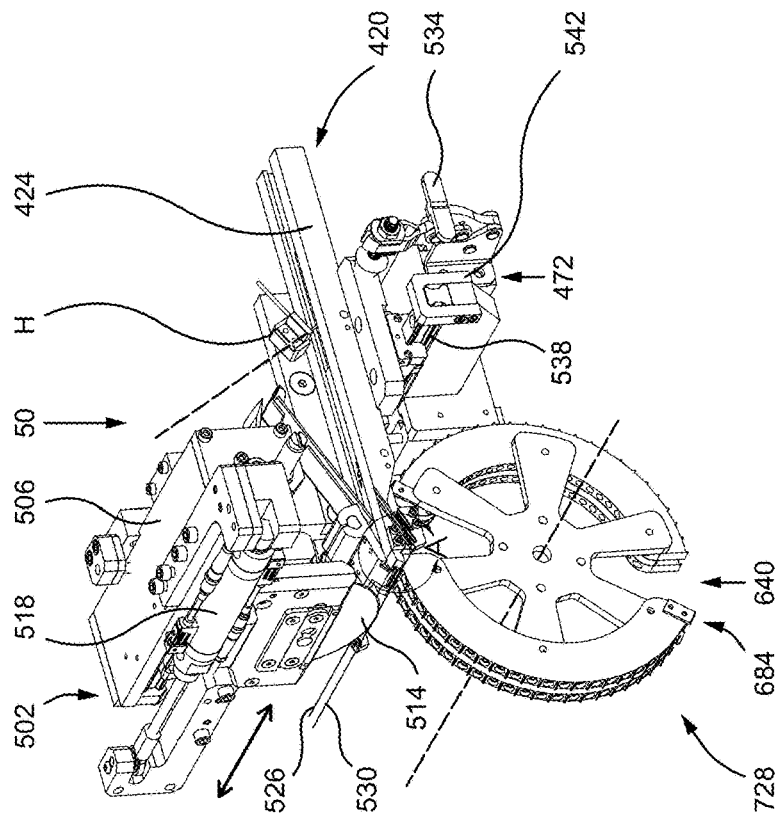
FIG. 20(B) is an isometric view of a dispensing module in accordance with at least one embodiment of the invention.
Figure 20A:
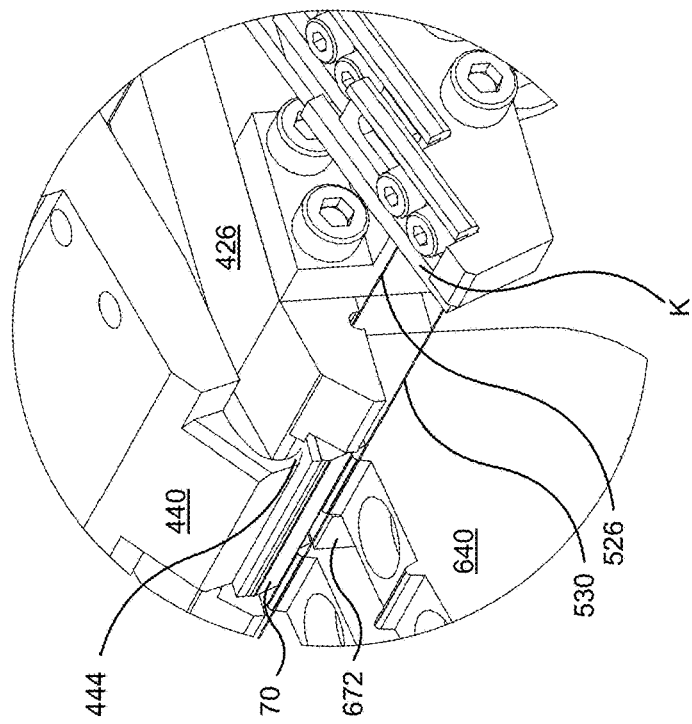
FIG. 20(A) is an isometric view of a portion of a dispensing module in accordance with at least one embodiment of the invention.
Figure 24:
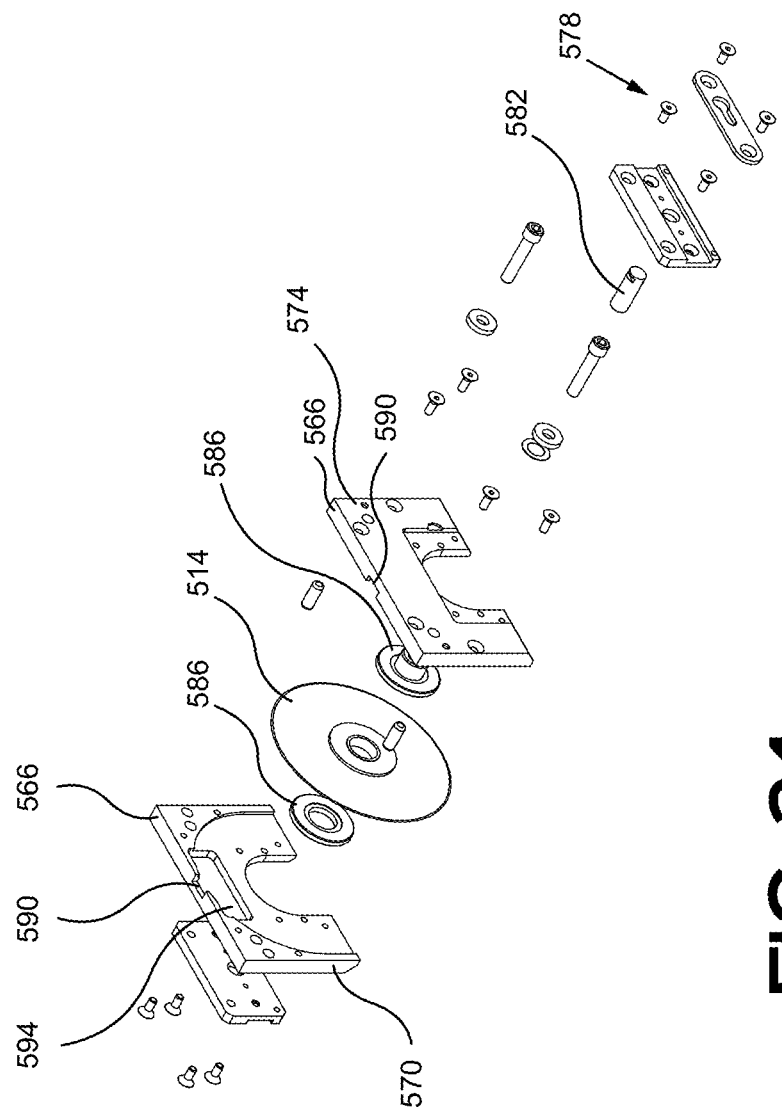
FIG. 24 is an exploded isometric view of a portion of a dispensing module, more precisely a cutting mechanism, in accordance with at least one embodiment of the invention.

Additionally, from FIG. 18 throughout FIG. 24, a strip-cutting mechanism 502 is shown. The strip-cutting mechanism 502 is used to cut portions of the strip 74 to provide a predetermined number of weights 70 equivalent to the required mass for balancing the wheel. The strip-cutting mechanism 502 is located near the end of the rail 420 of the dispensing module 50 to cut the strip 74 between two adjacent weights 70. It is undesirable the strip-cutting mechanism 502 tries to cut the strip 74 in the middle of a weight 70. Therefore, an additional sensor K located near the end of the rail 420 is use to detect the presence of a weight 70. Sensor K is preferably installed orthogonal with the strip 74 and is disposed at a location where it can detect a weight 70 or an empty space between two adjacent weights 70. When properly adjusted, sensor K must not detect a presence of a weight 70 along its first sensing line 526 aligned with the strip-cutting mechanism 502 to make sure there is no weights 70 along the line of cut for the strip-cutting mechanism 502 to be actuated. Sensor K has an optional second sensing line 530 located less than a length of a weight 70 further to detect a presence of a weight 70 when none is supposed to be present. It can be appreciated from FIG. 20 a) the side rails 426 includes an opening to let the first sensing line 526 pass through and gets to the strip 74 to identify the position of the weights 70. One of the side rail 424 is removably secured in its operating position with a rail clamp 534. The side rail 424 can be moved along a guiding rail 538 equipped with a stopper to ease manipulation of the strip 74 on the rail 420 when required.

The strip-cutting mechanism 502 includes a housing 506 supporting a cutting member 510 in a position perpendicular to the strip 74. The cutting member 510, embodied as a circular blade 514 is reciprocally moved by an actuator 518 along supporting rails 522 as best seen in FIG. 21. The construction of the strip-locking mechanism 472 is depicted in FIG. 21 with more internal details. As it can be appreciated, the strip-locking mechanism 472 includes a weight-engaging portion 546 with, preferably, a cooperating surface 550 matching the shape of a weight 70 with protruding portions 552 engaging between the weights 70 to lock the weight 70 in the rail 420. This prevents any longitudinal movement of the strip 74 along the rail when the strip-cutting mechanism 472 is actuated. The weight-engaging portion 546 is movable between a weight-engaging position 554, illustrated in FIG. 19 a), and a released position 558 illustrated in FIG. 21 b). A pneumatic cylinder 562 is included in the embodiment to actuate the weight-engaging portion 546 when the desired quantity of weights 70 is provided by the dispensing module 50.

Sensor J is illustrated in FIG. 22. The purpose of sensor J is to use the reflectivity, the color or the contrast of the strip 74 to control if the liner 436 has been removed from the strip 74 passed the blade 514. The liner 436 has a distinct reflectivity, color or contrast than the sticky portion 456 and sensor J is a way to verify the liner 436 is removed.

Moving now to FIG. 23 and FIG. 24 depicting in greater details the strip-cutting mechanism 502 as embodied for illustrating purposes. The cutting member 510 is exemplified as a circular blade 514 supported by a blade housing 566 manufactured with two housing housing halves 570, 574. Housing halve 570 is removably secured in place with a locking mechanism 578 giving access to the blade 514. The blade 514 of the illustrated embodiment is toothless, non-motorized and is rotating when contacting the strip 74 by the linear motion of the housing 566. The combined effect of the linear motion of the housing and the contact between the blade 514 and the strip 74 creates a rotation of the blade 514 that is sufficient to cut the tape 76 holding the weights 70 together. The blade 514 is supported by an arrangement of axle 582 and bearings 586. A one-way bearing is optionally used to make the blade 514 rotate always in a single direction instead of having a reciprocal movement thereof. The single direction rotation of the blade 514 makes the entire circumference of the blade 514 be used for cutting the strip 74 and also ensures the blade 514 wears out equally all around and prolong blade replacement cycles. The housing 566 also includes an opening 590 to a lubricant reservoir 594 interacting with the blade 514 to lubricate the blade 514 and ease cutting of the strip 74. The lubricant, oil or other proper lubricant, can be soaked in a sponge 598 material to prevent any leaking.

Figure 25:
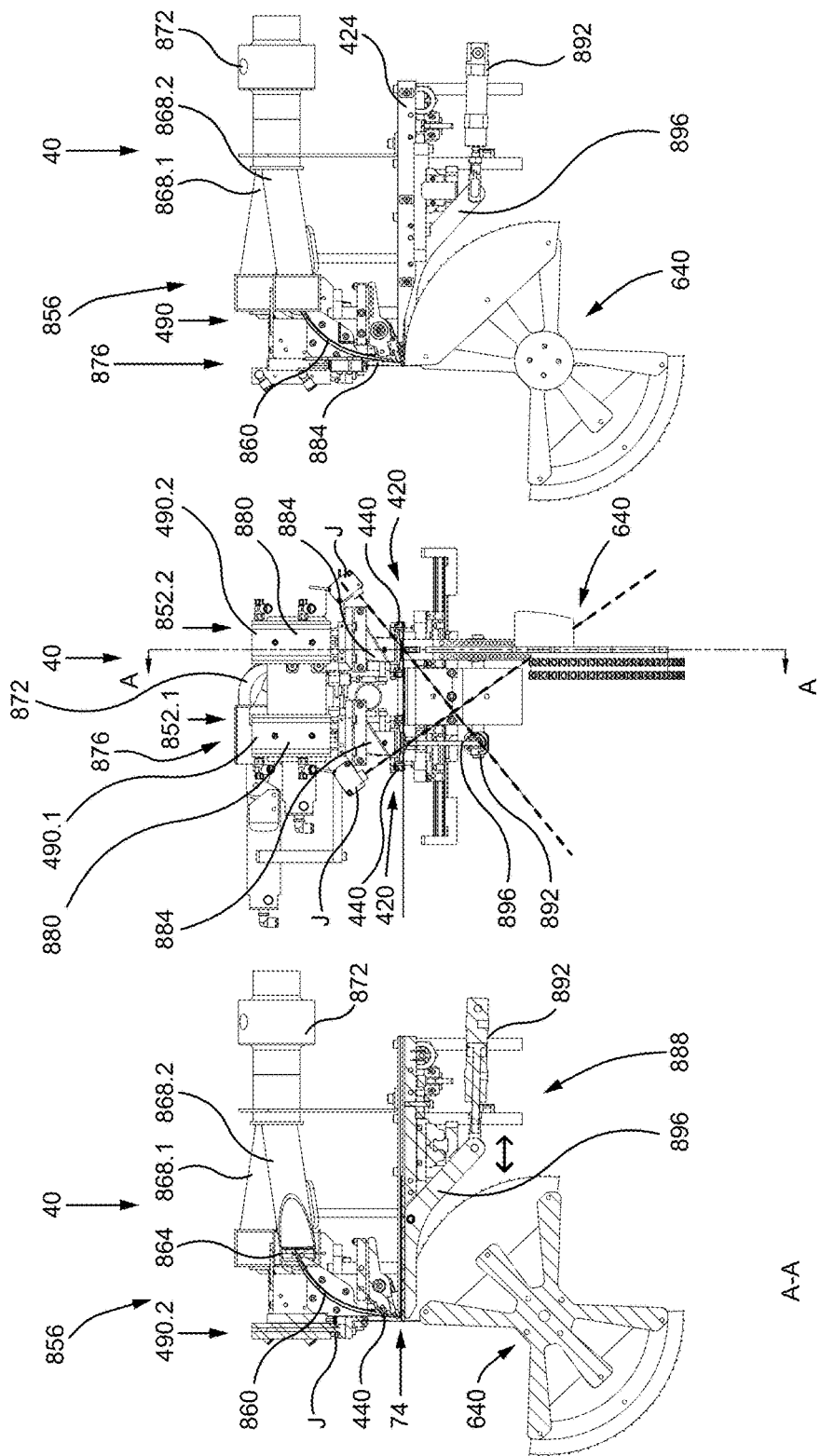
FIG. 25(A) is a side elevation section view of a portion of a dispensing module in accordance with at least one embodiment of the invention.
FIG. 25(B) is a front elevation view of a portion of a dispensing module in accordance with at least one embodiment of the invention.
FIG. 25(C) is a side elevation view of a portion of a dispensing module in accordance with at least one embodiment of the invention.

FIG. 25 illustrates an alternative embodiment of the dispensing module 40 using two dispensers 852.1 and 852.2, each provided with its own liner-removing mechanism 856. The peeler 440 remains pivotally connected as previously discussed in respect with FIG. 17. Once the liner 436 is removed from the strip 74 it is routed in an arcuate channel 860 to an automatic shredder 864 to be cut in small liner portions vacuumed through pipes 868 to a vacuum generator 872 and extracted from the process with the air flow thereof. The strip 74 is cut with a knife mechanism 876 actuating an angled straight or curved blade 884 that moves downward to cut the strip 74. Prior to cutting the strip 74, a strip stopper 888 using an actuator 892 and a break member 896 pivotally connected to the frame. The break member 896 is hence actuated between a relaxed position and a break position momentarily squeezing the strip 74 in the upper direction, between the rails 424 just a little before the angled blade 884 of the knife mechanism 876, when the strip 74 is cut. This allows for stopping a strip 74 of weights 70 when it remains only a few weights 70 in the strip 74 since the break member 896 engages the last weight 70 before the blade 884. The two dispensers 852.1 and 852.2 are disposed in parallel and are adapted to provide redundancy for maintenance purposes. The two dispensers 852.1 and 852.2 are also used to dispense weights 70 of different configurations to offer a choice decided in function of the wheel 748 to be balanced. For instance, black weights 70 can be dispensed with dispenser 852.1 and be used for balancing black and dark colored wheels 748. In contrast, dispensers 852.2 is providing gray weights 70 that are selected for aluminum or light colored wheels 748. Other uses of two or more dispensers 852 are contemplated in the present application and could be used for other benefits while remaining within the scope of the present application. It is also possible to appreciate each of the two dispensers 852.1 and 852.2 are provided with their own sensor J, respectively disposed to extend their sensing at an angle from vertical and in opposed directions, mostly for reasons of maximizing the sensors caption capability given the reflection properties of the liner and the other portions of the strip 74. Optimal sensing angle appears to be about between 30 degrees and 40 degrees.

Figure 26:
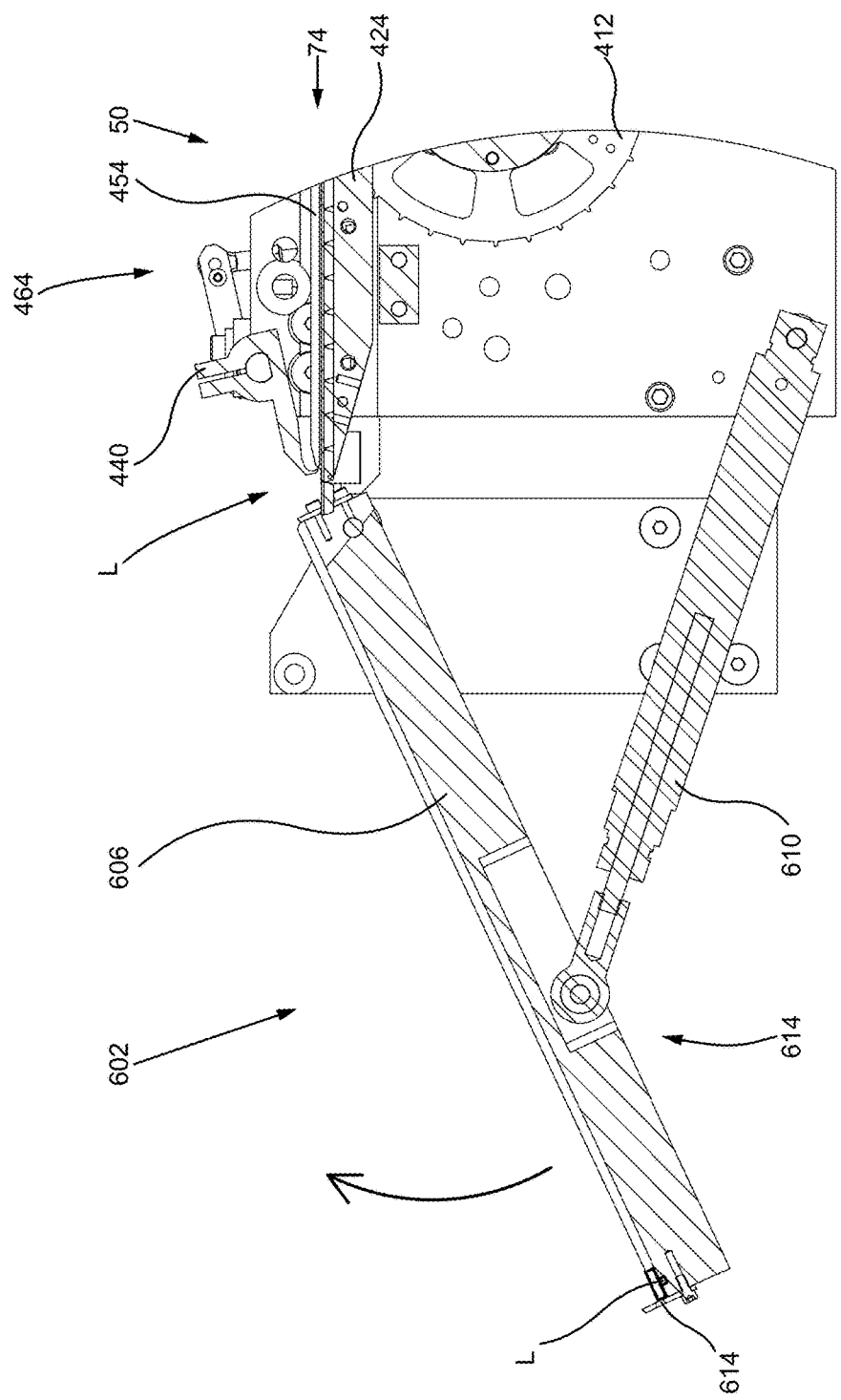
FIG. 26 is a side elevation section view of a portion of a dispensing module in accordance with at least one embodiment of the invention.
Figure 27:
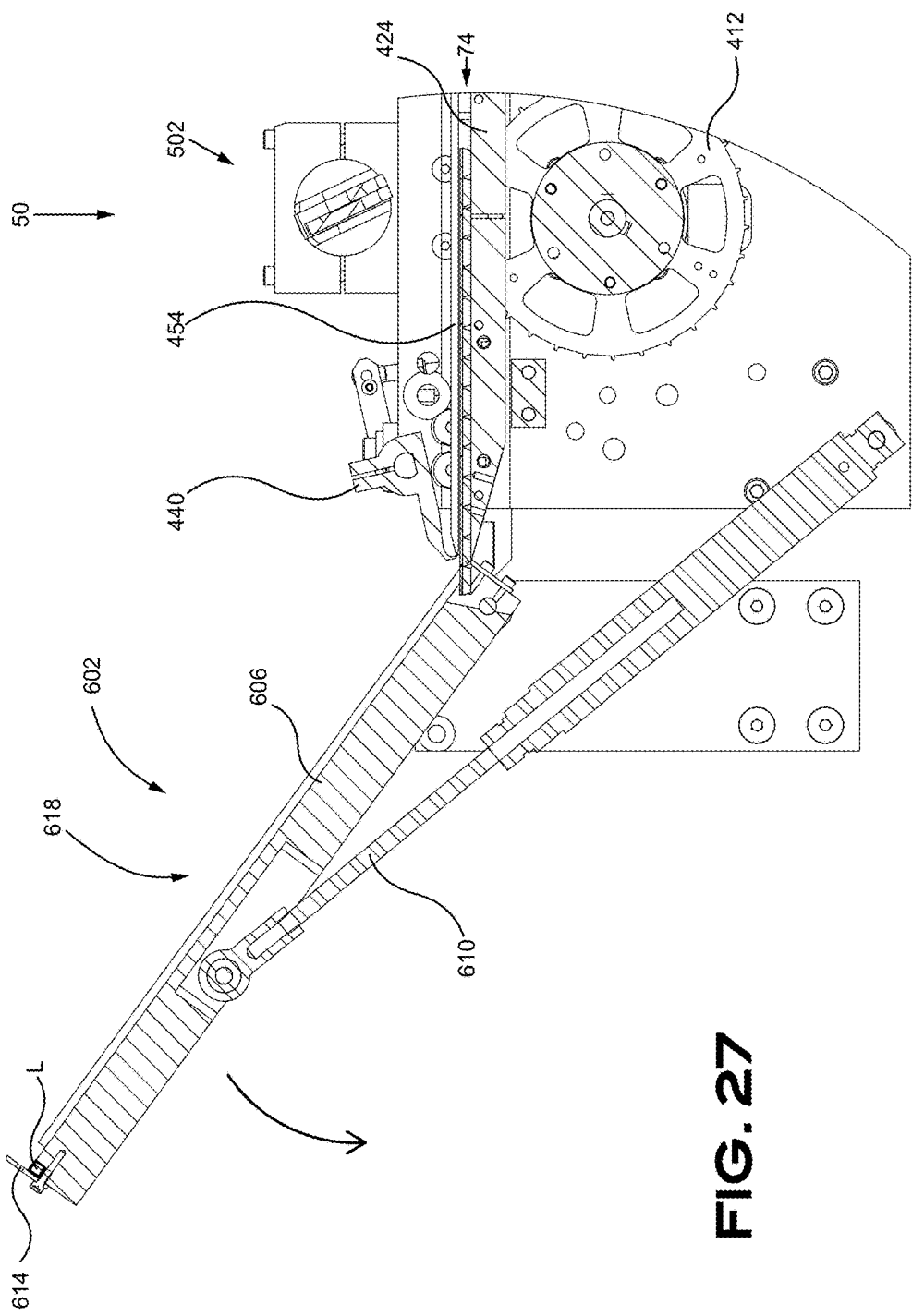
FIG. 27 is a side elevation section view of a portion of a dispensing module in accordance with at least one embodiment of the invention.
Figure 31A:
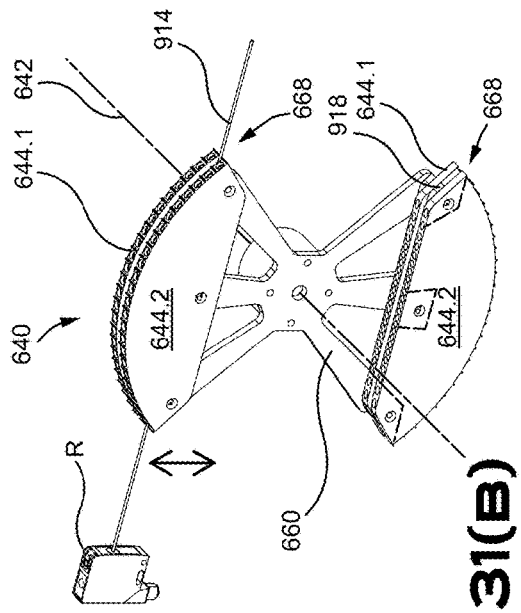
FIG. 31(A) is an isometric view of a portion of an application module in accordance with at least one embodiment of the invention.
Figure 31B:
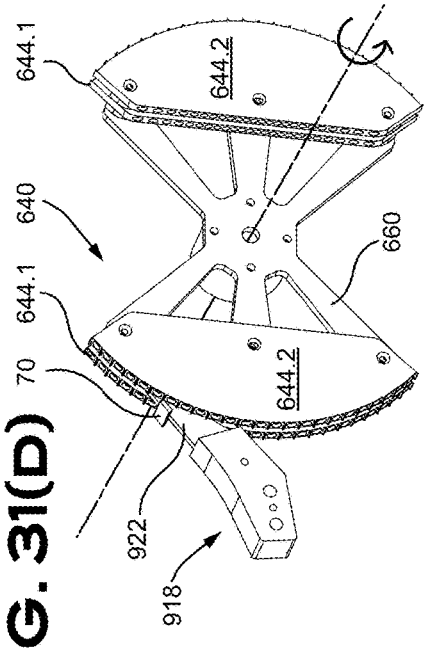
FIG. 31(B) is an isometric view of a portion of an application module in accordance with at least one embodiment of the invention.
Figure 31C:
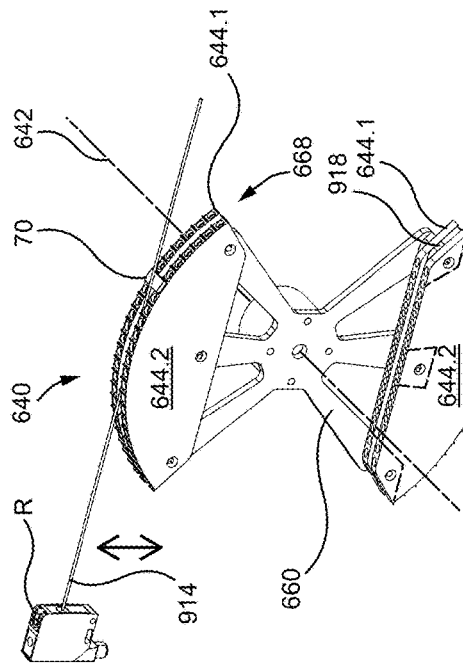
FIG. 31(C) is an isometric view of a portion of an application module in accordance with at least one embodiment of the invention.
Figure 31D:
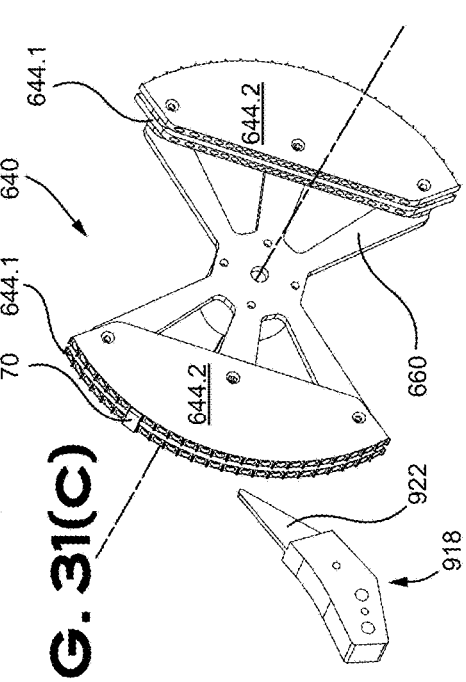
FIG. 31(D) is an isometric view of a portion of an application module in accordance with at least one embodiment of the invention.

Another embodiment is illustrated in FIG. 26 and FIG. 27. Actually, the dispensing module 50 can be utilized without the application module 60 (seen in FIG. 1) when embodied differently. In that respect, the dispensing module 50 can be alternatively equipped with a weights-receiver 602 collecting the cut portions of strips 74 for their manual installation by a worker. The worker is hence able to take the cut portions of strips 74 by hand on a weight-receiver ramp 606. The height and the angle of the weight-receiver ramp 606 is adjustable with an adjustment mechanism 610 to offer a plurality of ergonomic positions between a low position 614 illustrated in FIG. 26 and a high position 618 illustrated in FIG. 27. The weight-receiver ramp 606 ends with a stopper 614 to prevent weights 70 to fall off the weight-receiver ramp 606. Sensor L can be located after the peeler 440 and the blade 884 to acknowledge if a weight 70 is ready to be collected by the tool 640 of the robot 636 (not illustrated). Alternatively, sensor L can be located on the weight-receiver ramp 606 for confirming manual pickup of the weight(s) 70.

The application module 60 is automated with an industrial robot 636 well seen in the embodiment illustrated in FIG. 28. The robot 636 is equipped with a weights application tool 640 designed to move one or a series of weights 70 to from the dispensing module 40 to the wheel to balance. A possible embodiment of the tool 640 is illustrated with additional details in FIG. 29. The tool 640 includes at least one weights-holder 644 including a series of juxtaposed weights-receivers 648. Each weights-receiver 648 is preferably bordered with ridges 652 for individually locating each weight 70 on the weights-holder 644. The weights-holder 644 has a semi-circular shape 656 sized and designed to fit inside the wheel and secure the weights 70 to the surface of the wheel. Preferably, for ease of moving and applying weights 70 inside the wheel, the outside diameter of the tool 640 and weights-holder 644 assembly should be smaller than the internal diameter of the wheel. The weights-holder 644 can be manufactured as a single part with the tool hub portion 660 or be manufactured in separate parts. The tool hub portion 660 is embodied with a series of radially extending portions 664. The weights-holder 644 may include a central recessed portion 668 designed to cooperate with a weights support 672 (best seen in FIG. 20 a). when the tool 640 receives the weights 70 from the dispensing module 50.

Once the dispensing module 50 has cut the desired strip 74 length, the cut portion of the strip 74 of weights 70 remains supported by their central region by the weights support 672 while the weights-holder 644 moves under the weights support 672 and lift toward the weights 70 to engage and move the weights 70. The central recessed portion 668 of the weights-holder 644 is using the thickness of the tool hub portion 660 that secures two distinct weights-holder portions 676 in the illustrated embodiment.

The tool hub portion 660 is also configured to secure thereon a first weights-holder 644.1 and a second weights-holder 644.2. The second weights-holder 644.2 can be desirable to reduce the moving time of the robot 636 between the dispensing module 50 and the wheel. Indeed, the second weights-holder 644.2 can be charged with a second set of weights 70 and allow the weights application tool 640 to secure two sets of weights 70 to the wheel with a single movement between the dispensing module 40 and the wheel. For example, a dynamic balancing of the wheel generally locating weights 70 at different axial distances in the wheel can be achieved with a single movement of the tool 640 between the dispensing module 50 and the wheel. In an embodiment, the weights-holders 644 can be axially offset 680 in respect with the tool hub portion 660. The offset weights-holders 644 allows for a more precise location of the weights 70, reduction of the robot 636 travel distance and allows securing weights 70 axially closer to the center hub of the wheel. For example, the second weights-holder 644.2 is completely offset on one side of the tool hub portion 660 while the first weights-holder 644.1 is centered with the tool hub portion 660. Other configurations, the use of spacers, different angular positions of the weights-holders 644 and other adjustments thereof remain within the scope of the present application.

As best seen in FIG. 21, FIG. 29 and FIG. 30, each weights-holder 644 has a trailing side 684 and a leading side 688. The robot 636 can use the tool 640 in each rotatable direction in reference with the leading side 688 and the trailing side 684 of the weights-holder 644 to collect the weights 70 thereon. A first configuration uses the leading side 688 portion of the weights-holder 644 to receive the weights 70 thereon. The required magnets-receiving portions 704 on the leading side 688 are hence filled with weights 70. This configuration is illustrated in FIG. 19. Conversely, a second configuration uses the trailing side 684 of the weights-holder 644 to receive the weights 70 thereon. This configuration is illustrated in FIG. 21. Using the trailing edge of the weights-holder 644 to receive the weights 70 promotes an additional use of the weights-holder 644.

In the second configuration, the trailing side 684 is the edge that is moved next to the dispensing module 50 when the weights-holder 644 is receiving the weights 70 from the dispensing module 50. The leading side 688 is the edge that is located further from the dispensing module 50 when the weights-holder 644 is receiving the weights 70 from the dispensing module 50. Put differently, the tool 640 is configured to fill the weights-receivers 648 starting toward the leading side 688, in consideration of the number of weights 70 to be secured on the tool, progressively toward the trailing side 684 to fill the last weights-holder 644 toward the trailing side 684. All the last weights-receivers 648 are hence filled with weights 70.

A magnified illustration of a weights-holder portion 676 is shown in FIG. 29. The weights-holder portion 676 has a semi-circular shape about a radius 692 with its exterior circumference 696 ideally smaller than the diameter of the interior of a wheel to fit into the wheel and secure the portion of strip 74 to the proximal surface of the wheel. The weights-holder portion 676 are preferably made of non-ferromagnetic material, like aluminum, plastic or stainless steel, to allow magnetic means to hold the weights 70 thereon. The weights-holder portion 676 uses a series of magnets 700 housed in magnet-receiving portions 704 disposed in the weights-holder portion 676 along its exterior circumference 696. The magnets 700 are press-fitted or glued in their respective magnet-receiving portions 704. A radial opening 708 is giving access behind each magnet 700 to insert a pin tool 724 to push on the magnet 700 through the radial opening 708 and push on the magnet 700 to remove the magnet 700 from its magnet-receiving portion 704. One can appreciate that the trailing side 684 includes a larger and stronger magnet 712 housed in a larger magnet-receiving portion 716. The larger magnet 712 is helpful to sufficiently secure a single weight 70 to the weights-holder portion 676 when a single weight 70 is required. The larger magnet 712 is also material in cutting the strip 74 by tearing the strip 74 between adjacent weights 70 as illustrated in FIG. 30.

It can be more clearly appreciated from the embodiments illustrated in FIG. 29 that the weights-holders 644 are equipped with a pair of optional 70 lateral weight holders 736. The pair of weight 70 lateral holders 736 are disposed on each side of the weights-holders 644 bordering the last weight-holder portion 676.1 to further retain the weight 70 located in the last weight-holder portion 676.1. This is desirable to ensure the weight 70 in the last weight-holder portion 676.1 is firmly maintained in place and is not going to twist in or unsecure from the weights-holder 644. This is particularly useful when a single weight 70 is held by the weights-holder 644 and is not helped by adjacent weight 70 to remain in place in respective weight-holder portions 676. The risk of twisting or unsecuring a weight 70 in the last weight-holder portion 676.1 is increased when the tool 640 is used to detach a weight 70 or a series of weights 70 from the strip 74 of weights 70. The use of the tool 640 to split the tape 76 holding the weights 70 in strip 74 is an alternate embodiment illustrated in FIG. 30. A pivotal motion of the tool 640 is illustrated in FIG. 30 to cut the tape 76. FIG. 30 *a*) depicts the tool 640 with the weights-holder 644 securing a single weight 70 thereon on the last weight-holder portion 676.1 with the weights-holder 644 longitudinally aligned with the strip 74. FIG. 30 *b*) illustrate a pivotal motion 740 of the weights-holder 644 to increase tension in one lateral side of the tape 76 and breakup the tape 76 to separate the weight 70 secured in the weights-holder 644. The lateral holders 736 are further maintaining the weight 70 in place when the weights-holder 644 enable the pivotal motion 740 to prevent the weight 70 to pivot and remain properly in place on the weights-holder 644. A translational motion 744 of the tool 640 is illustrated in FIG. 30 *c*) to further separate the weight 70 secured in the weights-holder 644 from the strip 74. This embodiment can be used without the strip-cutting mechanism 502 or in conjunction with the strip-cutting mechanism 502 without departing from the scope of the present invention.

FIG. 31 shows another embodiment where sensor R is detecting the presence of one or more weights 70 present on the tool 640. The tool 640 of the illustrated embodiment is equipped with a pair of weights-holders 644.1, 644.2 spaced apart with a recessed portion 668 to allow the projection of sensor R to sense the entire region of the weights-receivers 648 to detect the undesired presence of one or more weights 70 on the tool 640. The recessed portion 668 can be spaced apart with spacers 918 or with the thickness of the hub portion 660 or the tool 640. The sensor R can be fixedly maintained and the tool 640, once the central recess portion 668 is aligned with the projection 914 of sensor R, is translated to move the projection of sensor R through the central recessed portion 668 and detect the undesirable presence of possibly remaining weights 70 on the tool 640. For instance, FIG. 31 *a*) illustrates a remaining weight 70 on the tool 640 that is sensed by sensor R. In contrast, FIG. 31 *a*) illustrate the projection 914 of sensor R. The tool 640 is moved next to a weights-remover 918 when an undesired weight 70 is sensed by sensor R to engage the central recess portion 668 of the tool 640 with a weights remover member 922 sized and designed to fit in the central recessed portion 668. A translation and a rotation of the tool 640 allows the weights remover member 922 to remove the weights 70 that is going to disconnect from the tool 640 and be ready for receiving new weights 70 thereon.

The tool 640 is equipped with three proximity sensors M disposed at about 120 degrees from each other in respect with the axis 642 of the tool 640, as exemplified in FIG. 32 illustrating an embodiment thereof. The proximity sensors M can be embodied as laser sensors and are collectively sensing the location of the tool 640 inside the wheel 748, illustrated with a tire 750 installed thereon, using, for instance, triangulation methods. The projecting lines 752 of the laser sensors M are illustrated in FIG. 32. The robot 636 moves the tool 640 inside the center portion of the wheel 748 and the sensors M are acquiring measurements of the wheel's shape, interior profile 764 and dimensions when the tool 640 moves toward the center hub 756 of the wheel 748. This is a contactless interaction of the tool 640 with the wheel 748 resulting in an automatic detection of the characteristics of the wheel 748. With the acquired measurements of the wheel's characteristics it is possible to locate in space the tool 640 of the robot 636 precisely at a desired location without referring to a wheels' characteristics database. This process for acquiring measurements of the wheel's characteristics is done in real time for each wheel 748 coming on the wheel-conveying module 60 hence allowing for weights 70 installation on wheels 748 of various shapes and dimensions. In other words, wheels 748 of different characteristics can easily be balanced one after the other without requiring a precise order or be grouped in set of four similar wheels, for instance. The axial position of the tool 640 can be identified by an axial sensor N disposed on the tool 640 in an embodiment. The tool 640 can alternatively use the robot's 636 sensing capability, if available, and move the tool 640 axially in the wheel 748 until a contact occurs between the tool 640 and the center hub 756 of the wheel 748 to axially locate the tool 640 in respect with the center hub 756 of the wheel 748. In embodiments thereof, the robot 636 can record the pressure applied on the weights 70 when securing the weights 70 to the wheel 748. The pressure used for securing each weight 70 to its associated wheel 748 is hence recorded for product traceability.

The tool 640 of the robot 636 can be managed in relation with a wheel and tire assembly on a basis of the data provided by sensor M with projection 752 that detect the wheel geometry. In contrast, the tool 640 of the robot 636 can be managed on a basis of an image of the wheel and tire assembly provided by camera sensor P and sensor O. The two methods of obtaining the data is good and the latter prevents requiring sensor M.

The wheel 748 and tire 750 assembly is brought for balancing weights 70 application on a conveyor 780 in the embodiment illustrated in FIG. 34. The embodiment is directed to a conveyor 780 for transporting the wheel 748 and tire 750 assembly however other means for transporting the wheel 748 and tire 750 assembly like an industrial robot 636, a suspension mechanism, a rail on which the wheel 748 and tire 750 assembly rolls to the next station remains within the scope of the present invention. The aforementioned description is going to focus on a conveyor mechanism to facilitate the reading of the specification without disclaimer or other suitable substitute systems. The wheel 748 and tire 750 assembly is presented supported horizontally on the conveyor 780 although the wheel 748 and tire 750 assembly could be brought vertically or in other suitable positions, including suspended to an appropriate mechanism, without departing from the scope of the present application. The conveyor 780 is supported by a frame 784 and is at a height sufficient to allow weights 70 installation from underneath. Installation of the weights 70 from above is another non-illustrated embodiment encompassed by the present description. The conveyor 780 of the illustrated embodiment is equipped with a pair of wheel-supporting belts 788 selectively actuated by a motor 792. The conveyor 780 can be actuated in forward 808 and in reverse 812 directions to position the wheel 748 and tire 750 assembly as desired on the conveyor 780. The pair of wheel-supporting belts 788 are supporting two sides of the wheel 748 and tire 750 assembly hence allowing miscellaneous sensing, with sensors O and P, therebetween in addition to provide room for the robot 636 tool 640 to reach the wheel 748 and secure the weights 70 to the wheel 748. The motor 792 can be a servo motor, a step motor, hydraulically or pneumatically actuated to precisely carry the wheel 748 and tire 750 assembly in a weights-application position 796. The illustrated embodiment includes a servo motor 800 optionally interconnected with a gearbox 804 to drive the conveyor 780. A pair of lateral rails 808 secured at proper height to the frame 784 is optionally illustrated to provide an additional feature to keep the wheel 748 and tire 750 assembly on the conveyor 780.

The balancing weight application apparatus is hence adapted for automatically identifying characteristics of a wheel and securing wheel-balancing weights thereon, the apparatus comprising moving a wheel toward a wheel-balancing weights securing position, sensing a wheel characteristics, sensing a wheel reference location, providing a first predetermined quantity of wheel-balancing weights and securing the first predetermined quantity of wheel-balancing weights to a first position on the wheel. The balancing weight application apparatus can sense the wheel characteristics with a camera and/or a laser sensor, wherein sensing of the wheel characteristics is performed while the wheel and tire assembly is moving toward the wheel-balancing weights application position, wherein the wheel characteristics are not collected from a wheel and tire assembly characteristics database, further comprising identifying a second position on a basis of the first position for securing a second predetermined quantity of wheel-balancing weights to the wheel on a basis of the second position.

The conveyor 780 is functioning in cooperation with sensor O capable of capturing the profile of the interior portion of the wheel 748. Sensor O is embodied in FIG. 34 and FIG. 35 as a laser proximity sensor secured to the frame 784 and directed at an angle toward the conveyor 780. The projection beam 816 is projected angularly to get a plurality of readings when the wheel 748 and tire 750 assembly is moving on the conveyor 780. Sensing the profile of the wheel 748 when the wheel 748 is moving is efficient because the wheel 748 and tire 750 assembly does not need to stay still for analyzing the shape of the wheel 748. The speed of the conveyor 780 is known and used in conjunction with a belt encoder and/or repetitive timely distance sensing between the wheel 748 and sensor O to generate a profile 820 of the interior portion of the wheel 748. A common time stamp is on way to put all the data together. All data from the sensors are associated with the common time stamp. The data associated with the same common time stamp is put together to obtain all information required for operating the tool 640 of the robot 636 or any other relevant equivalent system. The profile of the interior portion of the wheel 748 is used by the system's logic to manage the movements of the robot 636 and position the tool 640 at desired locations to precisely secure the weights 70 on the interior portion of the wheel 748 in accordance with the required assembly for balancing the wheel 748 and tire 750 assembly.

Another sensor P, embodied as a camera, is operatively located about the conveyor 780 of acquire an axial image of the wheel 748 and tire 750 assembly. Sensor P is illustrated under the conveyor 780 although it could be located at other locations appropriate to get the desired image without departing from the scope of the application. The image of the wheel 748 and tire 750 assembly is acquired by sensor P either with the wheel 748 and tire 750 assembly in movement or still on the conveyor 780. The image obtained from sensor P can be used for a variety of purposes. Among possible purposes, the image can be used to identify the radius of the wheel 748, the color of the wheel 748, the part number of the wheel, the location on the tire 750 of the indicator 824, generally a colored dot, of the orientation of the heaviest/lightest portion of the tire 750 that is also used to angularly locate the weights 70 required to balance the wheel 748 and tire 750 assembly. The angular location of the weights 70 is based in reference of this indicator 824 by the wheel-balancing analyzer apparatus (not illustrated) and the data usable to secure the weights 70 are their intended locations is at least partially based thereon by the system. A plurality of weights 70 must be installed on a wheel for dynamically balancing a wheel. A first set of weights 70 can be located and secured on the wheel on a basis of the dot on the wheel. The dot, or any other identification on the wheel/tire for locating the weights thereon is used as a primary reference and the other set(s) of weights 70 can be located and secured using a relative position in respect with the location of the first set of weights.

Figure 35:
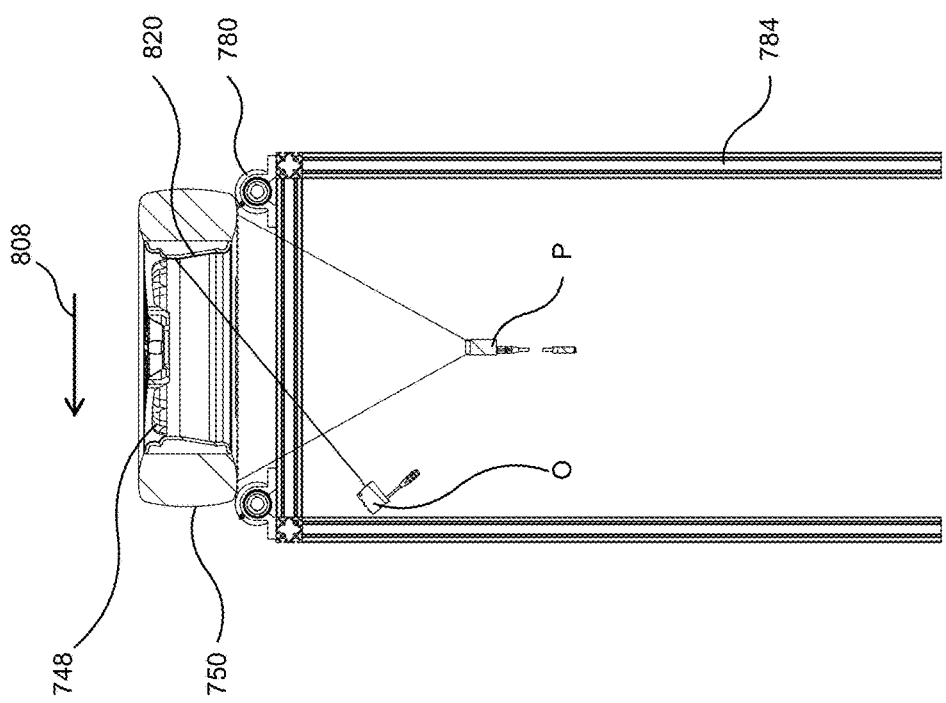
FIG. 35 is a side elevation view of a conveying module in accordance with at least one embodiment of the invention.

Another sensor is located on the wheel-conveying module 60 to validate a weights-installation position 828 of the wheel 748 and tire 750 assembly when the wheel 748 and tire 750 assembly are reaching the location on the conveyor 780 where the robot 636 is going to be accurately moving in respect with the weights-installation position 828 of the wheel 748 and tire 750 assembly. There is a possibility the wheel 748 and tire 750 assembly slips on the conveyor 780 or that the wheel 748 and tire 750 assembly unintentionally moves on the conveyor 780 generating a discrepancy between a calculated weights-installation position 828 of the wheel 748 and tire 750 assembly and the physical weights-installation position 828 of the wheel 748 and tire 750 assembly. Sensor Q, illustrated in FIG. 34 and FIG. 35, is located on a side of the conveyor 780 in a transverse projection orientation to sense the tire 750 when the wheel 748 and tire 750 assembly are reaching the weights-installation position 828. Thus, the physical location of the wheel 748 and tire 750 assembly is known when sensor P is sensing the edge of the tire 750 on the conveyor 780. This information can be used to stop the movement of the conveyor 780 and calculate the possible discrepancy between the calculated weights-installation position 828 of the wheel 748 and tire 750 assembly and the physical weights-installation position 828 of the wheel 748 and tire 750 assembly. The reference position used by the robot 636 is going to be adjusted consequently to ensure the robot 636 is not going to interfere with the wheel 748 and tire 750 assembly and the required weights 70 are going to be secured on the wheel 748 at the correct positions. One can appreciate sensor Q is illustrated projecting its sensing beam at an angle in reference with the horizontal. This is intended to help prevent obtaining a reading from sensor Q that is undesirably obtained with a reading of a lower portion of a threads of the tire 750. A reading from the bottom of a thread could create a misreading of the real location of the tire 750 and cause a loss of accuracy for installing the weights 70. Other configurations could be possible to reach the same results however it is unlikely that a straight thread be precisely aligned with the angle of sensor's Q projection.

Sensor O can be calibrated to ensure proper reading of the distance and the angle of the projection beam 816. FIG. 36 illustrates a possible calibration embodiment using two calibration rulers 840.1 and 840.2. The first calibration ruler 840.1 is located on a horizontal surface of the conveyor frame 784. The second calibration ruler 840.2 is secured to a removable frame support 844. The distance and the angle between both calibration ruler 840.1, 840.2 is known and the reading of the sensor's projection beam 816 on both calibration ruler 840.1, 840.2 can be used to precisely identify the location, distance and projection angle of sensor O in respect with the conveyor 780. The calibration ruler 840.1 is embodied on a transparent support plate 848 through which the projection beam 816 of the sensor O can pass and reach the second calibration ruler 840.2. The second calibration ruler 840.2 is located on a temporary and removable support 844 at a height over the conveyor 780 to accommodate the projection beam 816 angle required to reach the interior diameter of the wheel 748.

Figure 37:
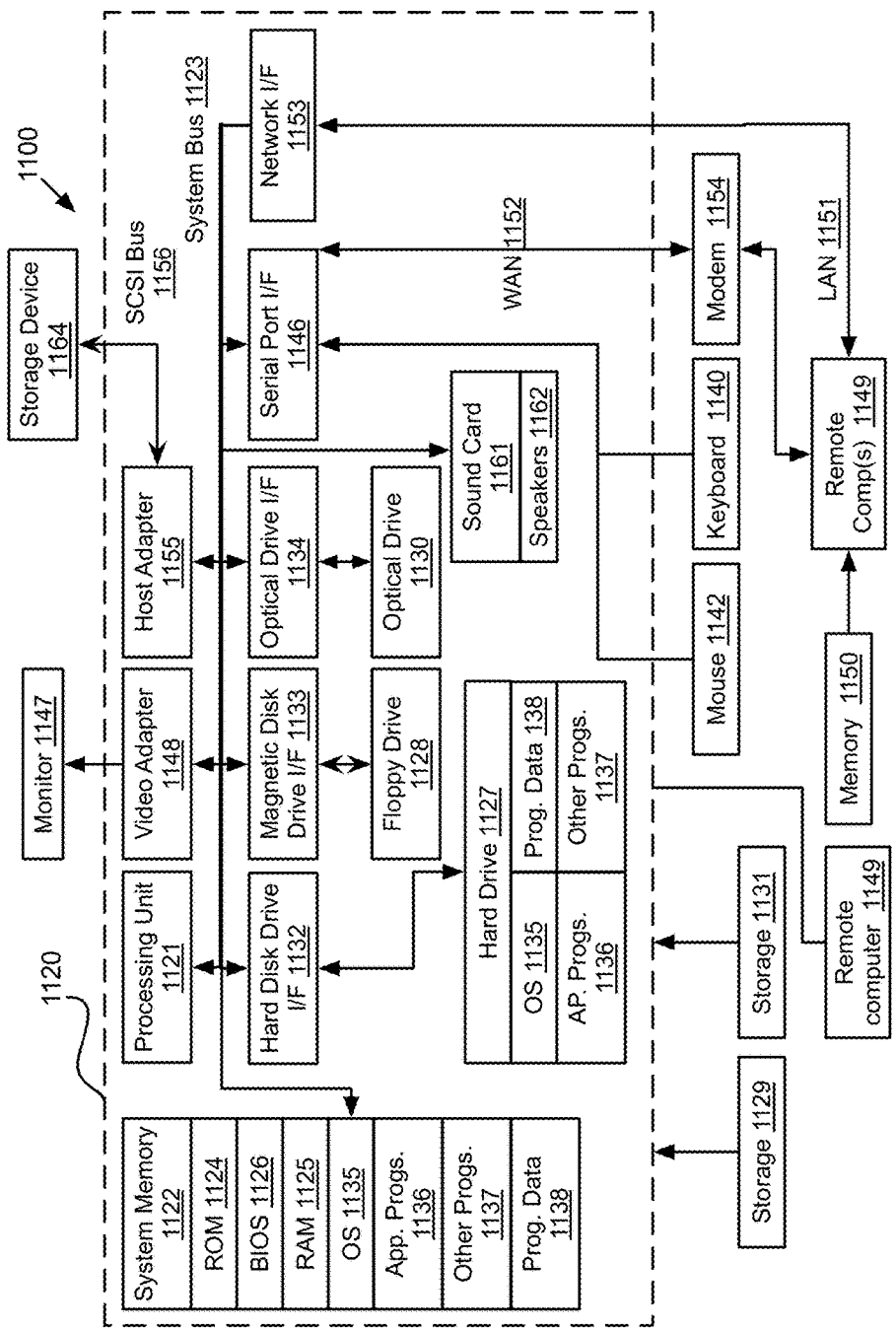
FIG. 37 is a bloc diagram of a computer apparatus in accordance with at least one embodiment of the invention.

FIG. 37 and the following discussion provide a brief, general description of an exemplary computer apparatus with which at least some aspects of the present invention may rely upon to be implemented. Some aspects of the present invention will be described in the general context of computer-executable instructions being executed by a computer apparatus interacting with a robot 636. However, the methods of the present invention may be effected by other apparatus. Program modules may include routines, programs, objects, sequences, components, data structures and other networked centered applications, etc. that perform a task(s) or implement particular functions when confirmed by the sensors described above. Moreover, those skilled in the art will appreciate that at least some aspects of the present invention may be practiced with other configurations, including Programmable Logic Controller, industrial handheld devices, multiprocessor systems, microprocessor-based or programmable consumer electronics, network computers, minicomputers, set top boxes, mainframe computers and the like. At least some aspects of the present invention may also be practiced in distributed computing environments where tasks are performed by remote processing devices linked through a communications network. In a distributed computing environment, program modules may be located in local and/or remote memory storage devices 1164.

With reference to FIG. 37, an exemplary apparatus 1100 for implementing at least some aspects of the present invention includes a general purpose computing device in the form of a conventional computer 1120. The computer 1120 may include a processing unit 1121, a system memory 1122, and a system bus 1123 that couples various system components, including the system memory 1122, to the processing unit 1121. The system bus 1123 may be any of several types of bus structures including a memory bus or memory controller, a peripheral bus, and a local bus using any of a variety of bus architectures. The system memory may include read only memory (ROM) 1124 and/or random access memory (RAM) 1125. A basic input/output system 1126 (BIOS), containing basic routines that help to transfer information between elements within the computer 1120, such as during start-up, may be stored in ROM 1124. The computer 1120 may also include a hard disk drive 1127 for reading from and writing to a hard disk, (not shown), a magnetic disk drive 1128 for reading from or writing to a (e.g., removable) magnetic disk 1129, and an optical disk drive 1130 for reading from or writing to a removable (magneto) optical disk 1131 such as a compact disk or other (magneto) optical media. The hard disk drive 1127, magnetic disk drive 1128, and (magneto) optical disk drive 1130 may be coupled with the system bus 1123 by a hard disk drive interface 1132, a magnetic disk drive interface 1133, and a (magneto) optical drive interface 1134, respectively. The drives and their associated storage media provide nonvolatile (or persistent) storage of machine readable instructions, data structures, program modules and other data for the computer 1120. Although the exemplary environment described herein employs a hard disk, a removable magnetic disk 1129 and a removable optical disk 1131, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices 1164 introduced above.

A number of program modules may be stored on the hard disk 1127, magnetic disk 1129, (magneto) optical disk 1131, ROM 1124 or RAM 1125, such as an operating system 1135 (for example, Windows® NT® 4.0, sold by Microsoft® Corporation of Redmond, Wash.), one or more application programs 1136, other program modules 1137 (such as "Alice", which is a research system developed by the User Interface Group at Carnegie Mellon University available at www.Alice.org, OpenGL from Silicon Graphics Inc. of Mountain View Calif., or Direct 3D from Microsoft Corp. of Bellevue Wash.), and/or program data 1138 for example.

A user may enter commands and information into the computer 1120 through input devices, such as a keyboard 1140, a camera 1141 and pointing device 1142 for example. Other input devices (not shown) such as a microphone, joystick, game pad, satellite dish, scanner, a touch sensitive screen, accelerometers adapted to sense movements of the user or movements of a device, or the like may also be included. These and other input devices are often connected to the processing unit 1121 through a serial port interface 1146 coupled to the system bus. However, input devices may be connected by other interfaces, such as a parallel port, a game port, blue tooth connection or a universal serial bus (USB). For example, since the bandwidth of the camera 1141 may be too great for the serial port, the video camera 1141 may be coupled with the system bus 1123 via a video capture card (not shown). The video monitor 1147 or other type of display device may also be connected to the system bus 1123 via an interface, such as a video adapter 1148 for example. The video adapter 1148 may include a graphics accelerator. One or more speaker 162 may be connected to the system bus 1123 via a sound card 1161 (e.g., a wave table synthesizer such as product number AWE64 Gold Card from Creative® Labs of Milpitas, Calif.). In addition to the monitor 1147 and speaker(s) 1162, the computer 1120 may include other peripheral output devices (not shown), such as a printer for example. As an alternative or an addition to the video monitor 1147, a stereo video output device, such as a head mounted display or LCD shutter glasses for example, could be used.

The computer 1120 may operate in a networked environment which defines logical connections to one or more remote computers, such as a remote computer 1149. The remote computer 1149 may be another personal computer, a server, a router, a network PC, a peer device or other common network node, and may include many or all of the elements described above relative to the personal computer 1120, although only a memory storage device 1164 has been illustrated in FIG. 37.

When used in a LAN, the computer 1120 may be connected to the LAN 1151 through a network interface adapter (or "NIC") 1153. When used in a WAN, such as the Internet, the computer 1120 may include a modem 1154 or other means for establishing communications over the wide area network 1152 (e.g. Wi-Fi, WinMax). The modem 1154, which may be internal or external, may be connected to the system bus 1123 via the serial port interface 1146. In a networked environment, at least some of the program modules depicted relative to the computer 1120 may be store d in the remote memory storage device. The network connections shown are exemplary and other means of establishing a communications link between the computers may be used.

Figure 38:
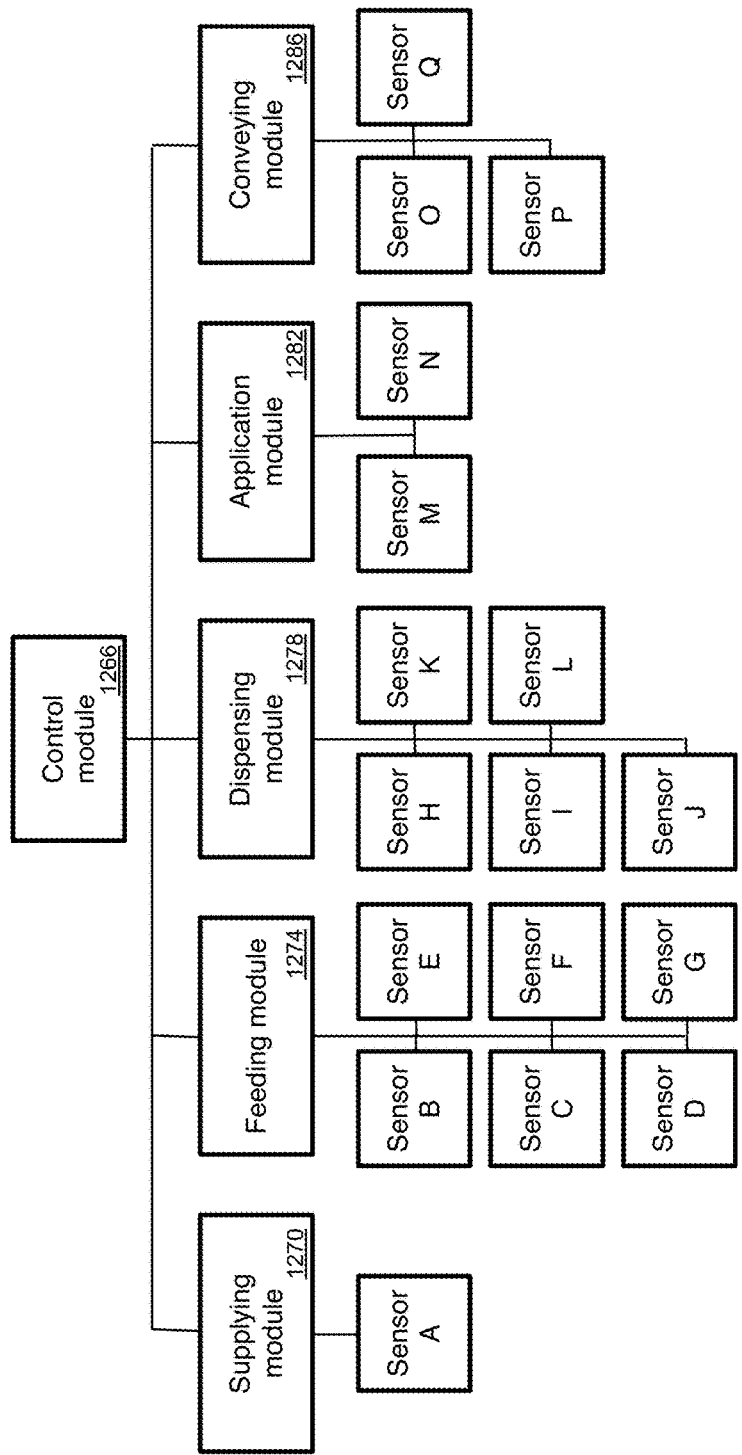
FIG. 38 is a bloc diagram of a computerized system with modules and sensors in accordance with at least one embodiment of the invention.

Moving now to FIG. 38 depicting an exemplary control module 1066 used to manage the balancing weight application apparatus 10. The control module 1266 is in communication with a plurality of modules like the supplying module 1270, feeding module 1274, the dispensing module 1278, the application module 1282 and the conveying module 1086. Each module is operatively connected to the control module 1266. The sensors indicated in FIG. 38 are listed in Table 1 above with additional details.

Figure 39:
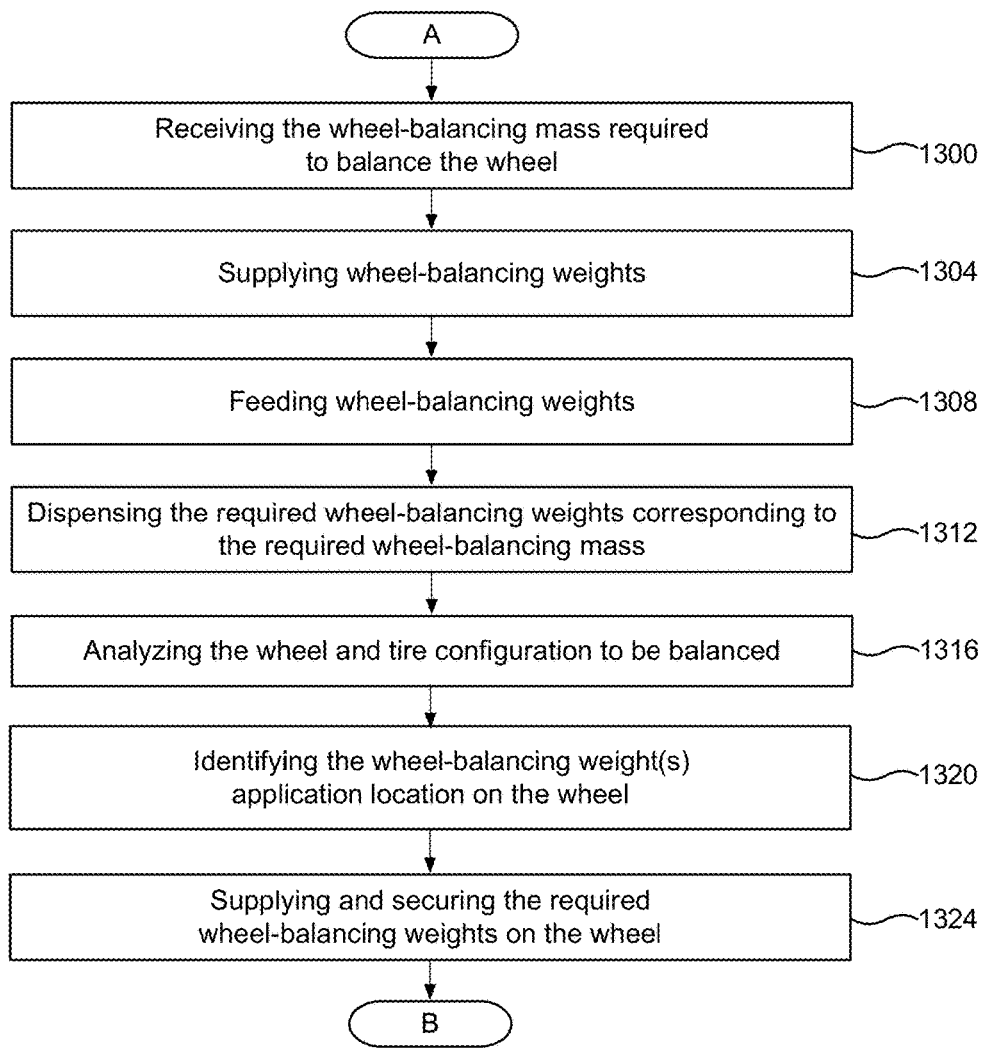
FIG. 39 is a flow chart of steps of a process in accordance with at least one embodiment of the invention.

A general flow chart of the balancing weight application apparatus 10 is illustrated in FIG. 39. The process begins in this case with the reception of the mass required to balance a wheel 1300. The mass required to balance a wheel is provided by another system that rotates the wheel and tire assembly and identify the locations and the masses required to balance the wheel and tire assembly. The balancing weight application apparatus 10 is not disclosing details about this stage that could be part of the present application. Then, wheel-balancing weights 70 are supplied 1304. The weights 70 are fed 1308 in the balancing weight application apparatus 10. The weights 70 are then dispensed in quantity equivalent to the required balancing mass 1312. The wheel and tire configuration is analyzed 1316 and the application location(s) of the wheel balancing weights 70 are identified 1320. Finally, the weights 70 are supplied and secured with the tool 640 to the wheel 748.

Figure 40:
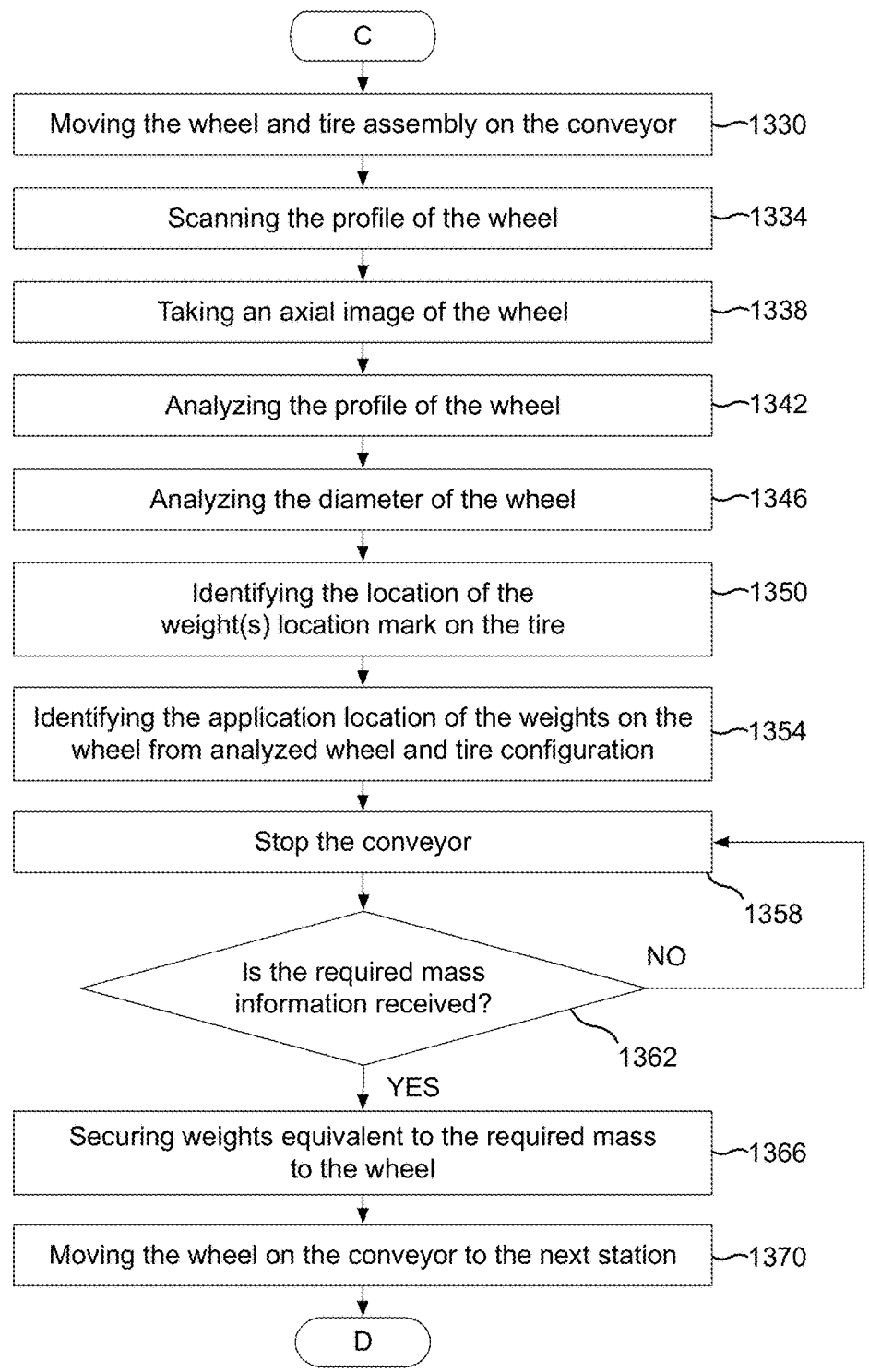
FIG. 40 is a flow chart of steps of a process in accordance with at least one embodiment of the invention.

FIG. 40 illustrates a flow chart of an embodiment of the invention. The embodiment is using a sensor-less tool 640 that is using the data provided by steps 1334, 1338, 1342 and 1346 for identifying trajectories and locations of the weights 70 to be secured on the wheel 748. A "wait" step can be added between step 1362 and step 1358 when the condition "NO" of step 1362 is satisfied.

Figure 41:
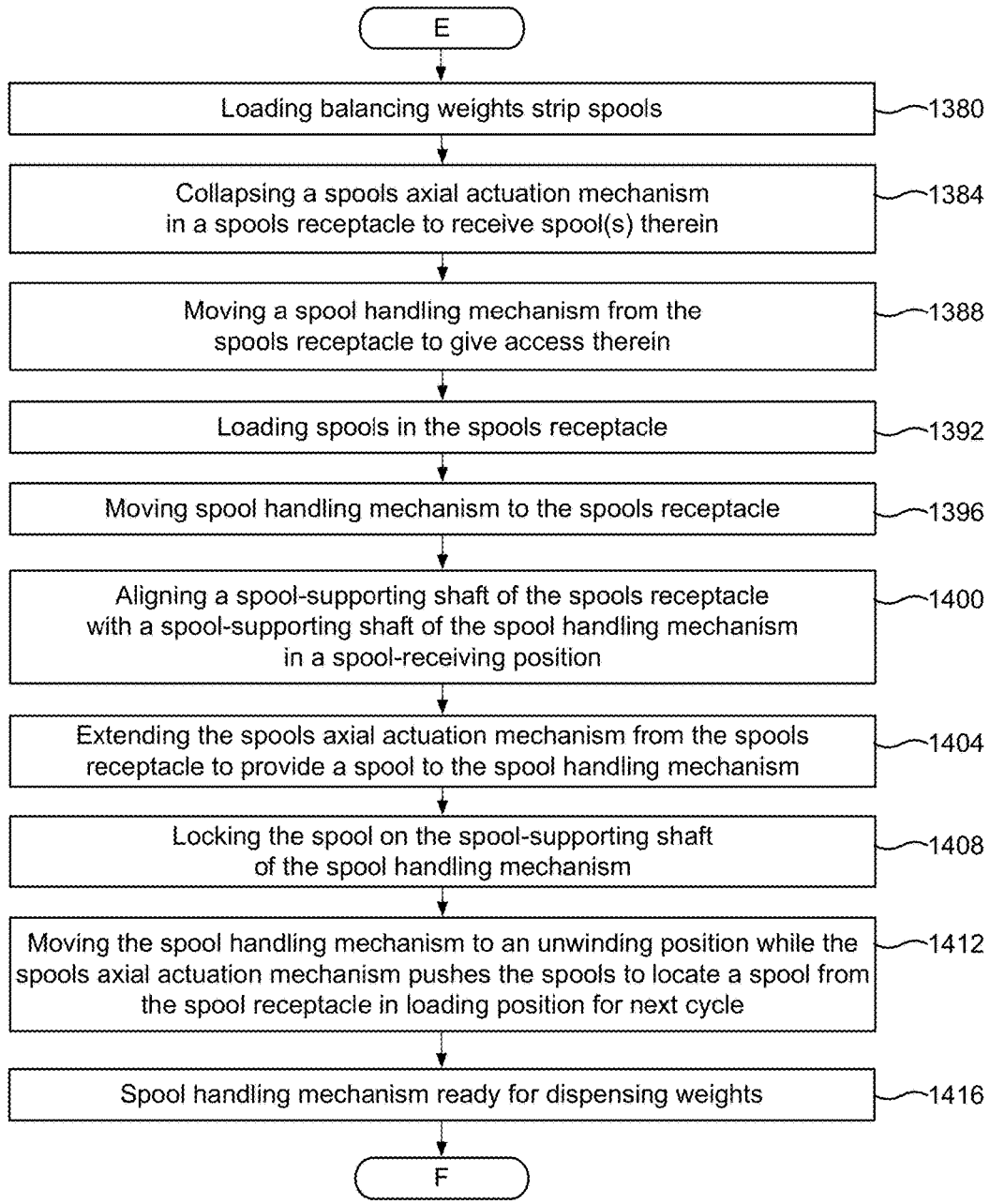
FIG. 41 is a flow chart of steps of a process in accordance with at least one embodiment of the invention.

A flow chart in FIG. 41 illustrating an embodiment related to the spools management generally illustrated in FIG. 6 throughout FIG. 10. The actions of the spools axial actuation mechanism to receive and provide spools from the spools receptacle are identified in an exemplary series of steps 1380 to 1416.

Figure 42:
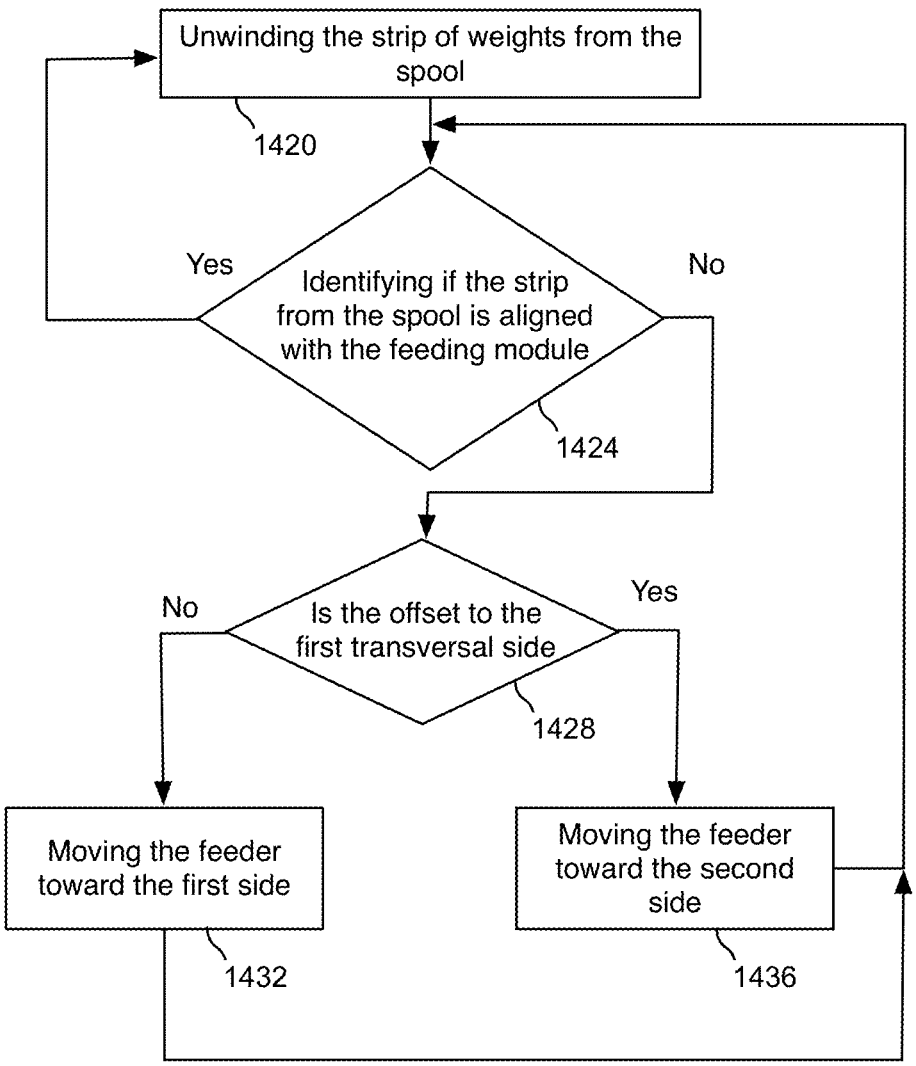
FIG. 42 is a flow chart of steps of a process in accordance with at least one embodiment of the invention.

Steps 1420 to 1436 of FIG. 42 are exemplifying an embodiment of the invention directed to the transversal adjustment of the feeding module 30 when the strip 74 moves laterally when unwinding from a wide spool.

Figure 43:
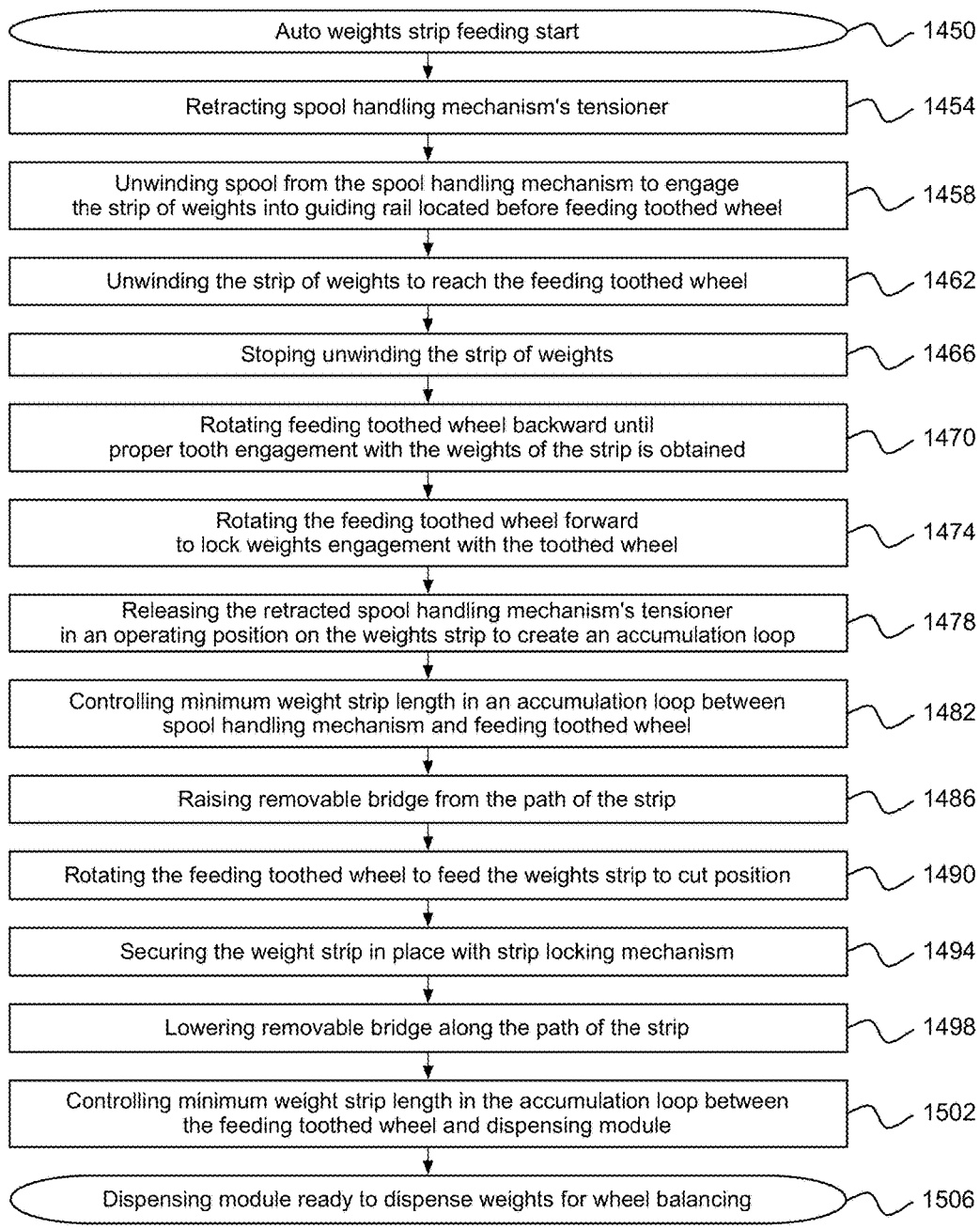
FIG. 43 is a flow chart of steps of a process in accordance with at least one embodiment of the invention.

A flow chart in FIG. 43 illustrating an embodiment related to the strip 74 alignment is exemplified. If the strip 74 laterally moves further than a predetermined threshold, sensed by sensors D, as best seen in FIG. 11, the strip feeding module 30 is laterally actuated to correct the situation. Exemplary steps are identified between first step 1450 to the last step 1506.

Figure 44:
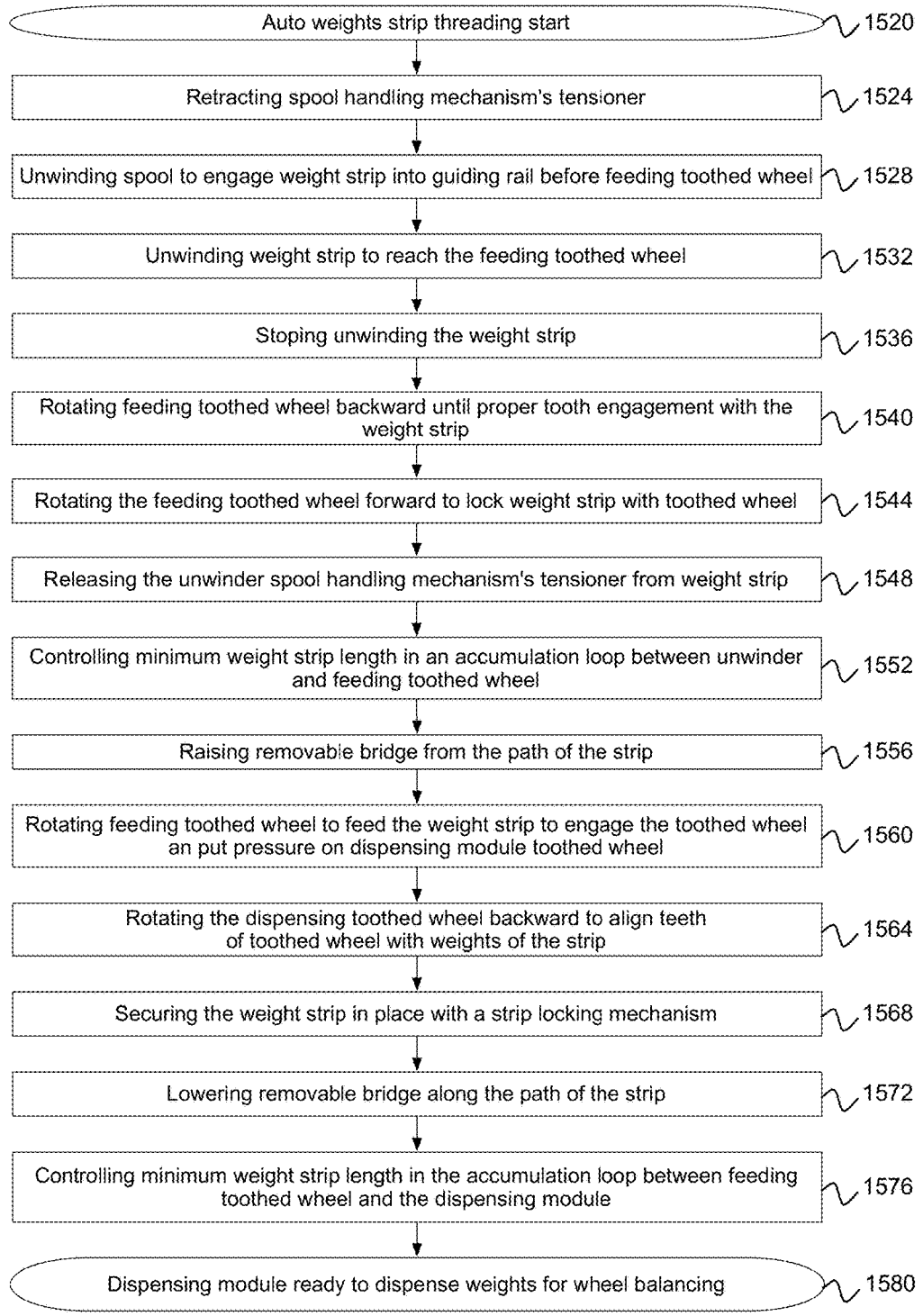
FIG. 44 is a flow chart of steps of a process in accordance with at least one embodiment of the invention.

The flow chart illustrated in FIG. 44 includes a series of steps 1520 to 1580 exemplifying a feeding of a new strip 74 in the feeding module 30 of the balancing weight application apparatus 10. A back and forth movement of the feeding toothed wheel 412 to properly engage the weights 70 is described.

Figure 45:
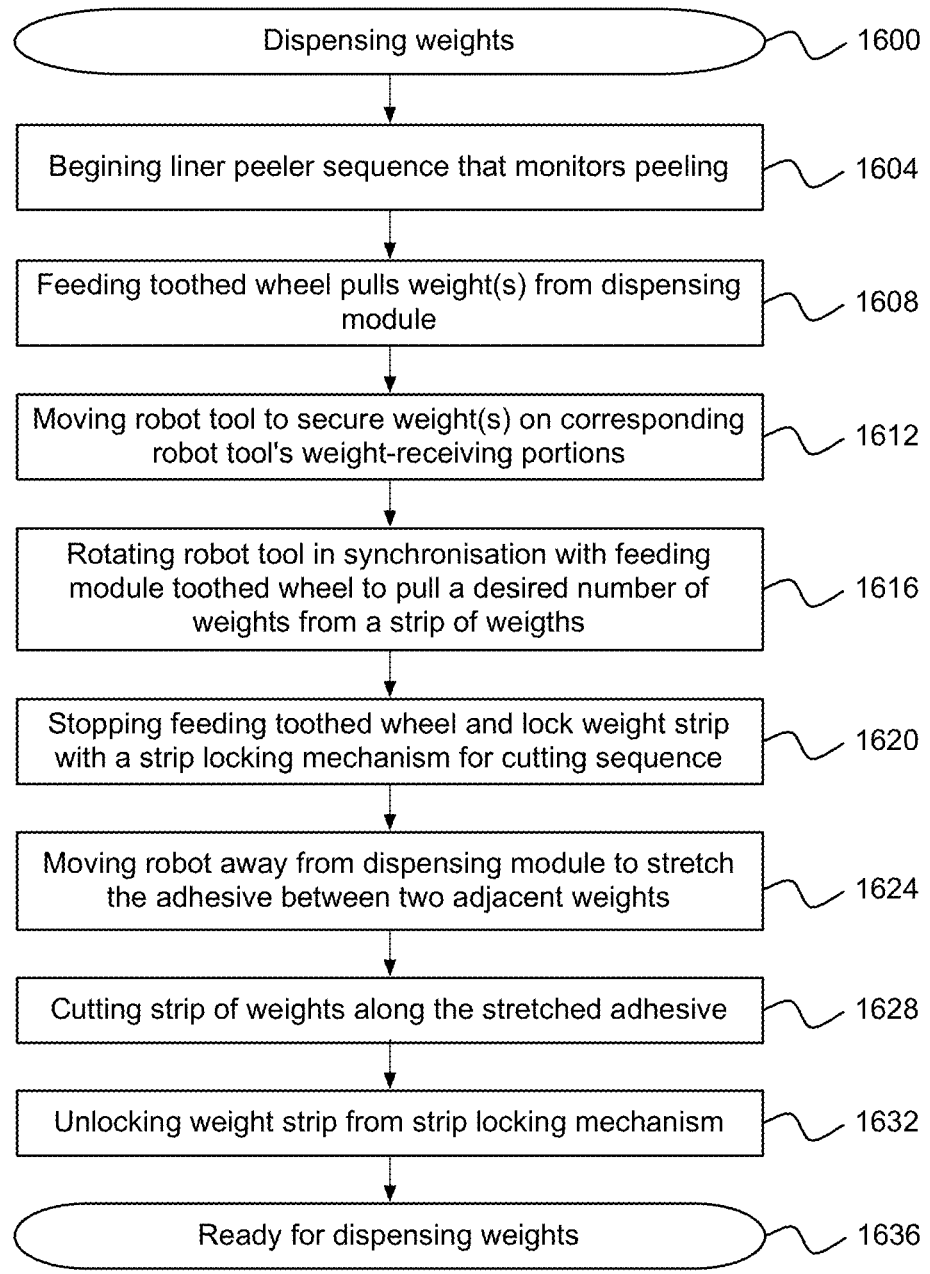
FIG. 45 is a flow chart of steps of a process in accordance with at least one embodiment of the invention.

The embodiment of the balancing weight application apparatus 10 using a toothed drive wheel 412 and the tool 640 to feed the strip 74 could use the following steps 1600 to 1636 from FIG. 45.

Figure 46:
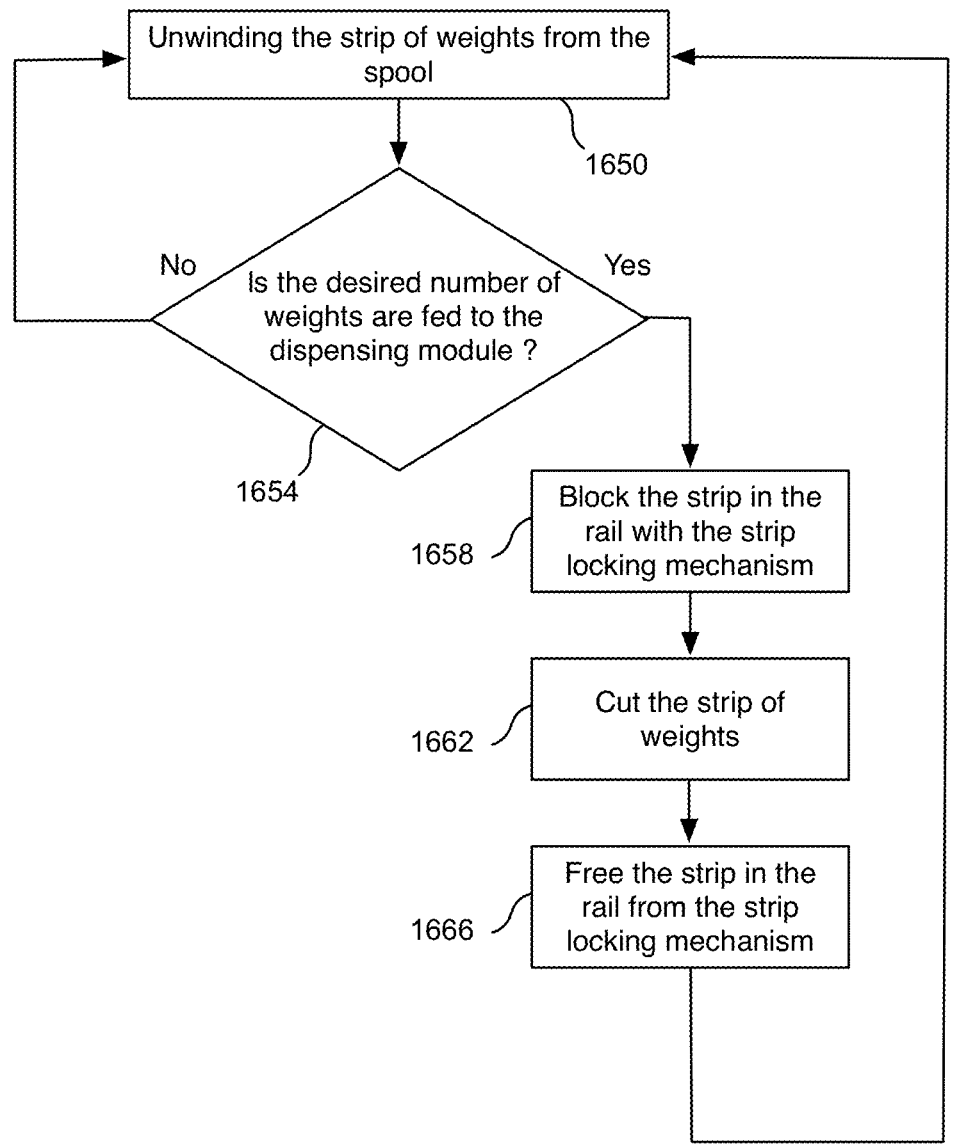
FIG. 46 is a flow chart of steps of a process in accordance with at least one embodiment of the invention.

FIG. 46 relates to counting of the weights 70 and the blocking of the strip 74 prior to cutting the strip 74 as illustrated in steps 1650 to 1666. Blocking of the strip 74 is desirable to prevent risks of interference between the means for cutting the strip 74 and a weight 70. Any movement of the strip 74 is also prevented when the strip 74 cutting occurs.

Figure 47:
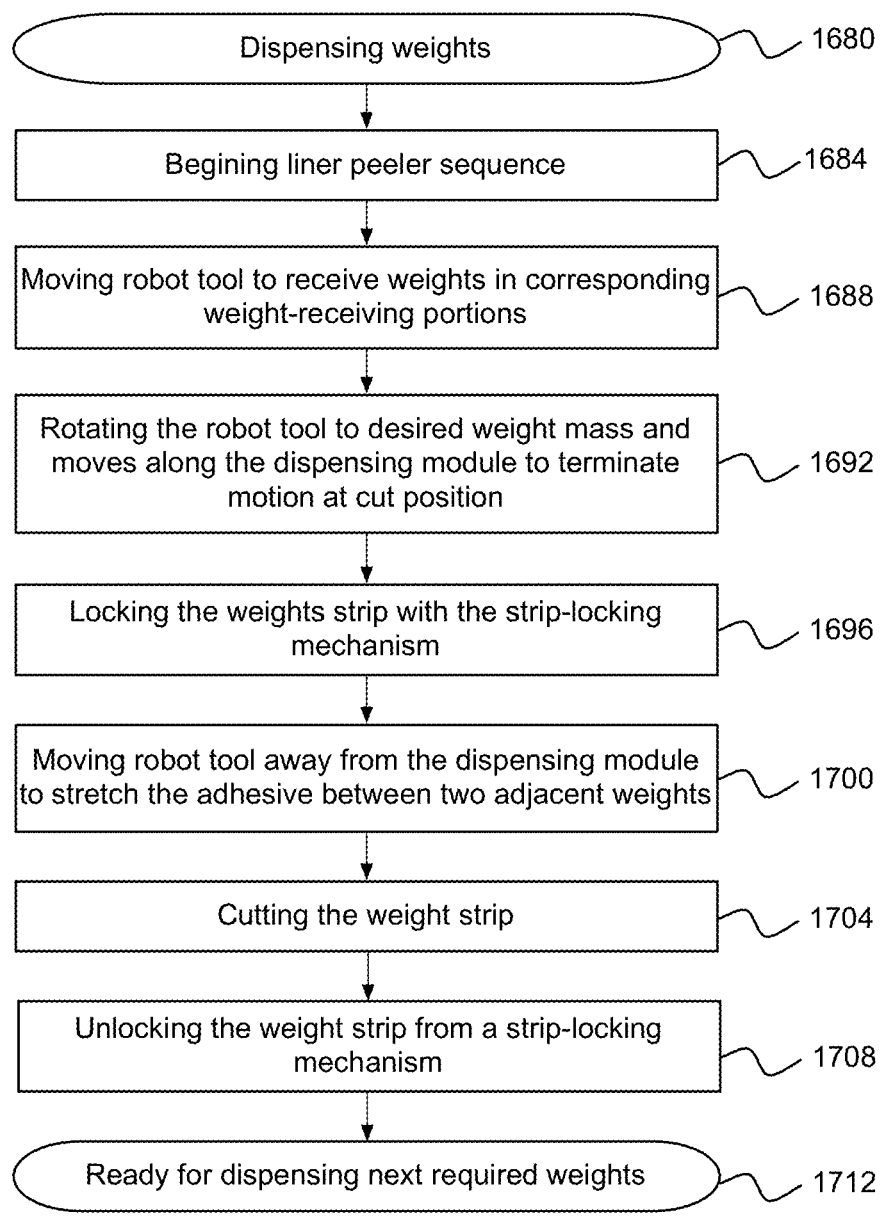
FIG. 47 is a flow chart of steps of a process in accordance with at least one embodiment of the invention.

Another exemplary strip 74 cutting and blocking sequence is illustrated in FIG. 47 with series of steps 1680 to 1712. A step can be added between step 1662 and step 1666 to make the robot wait in position before freeing the strip 74.

Figure 48:
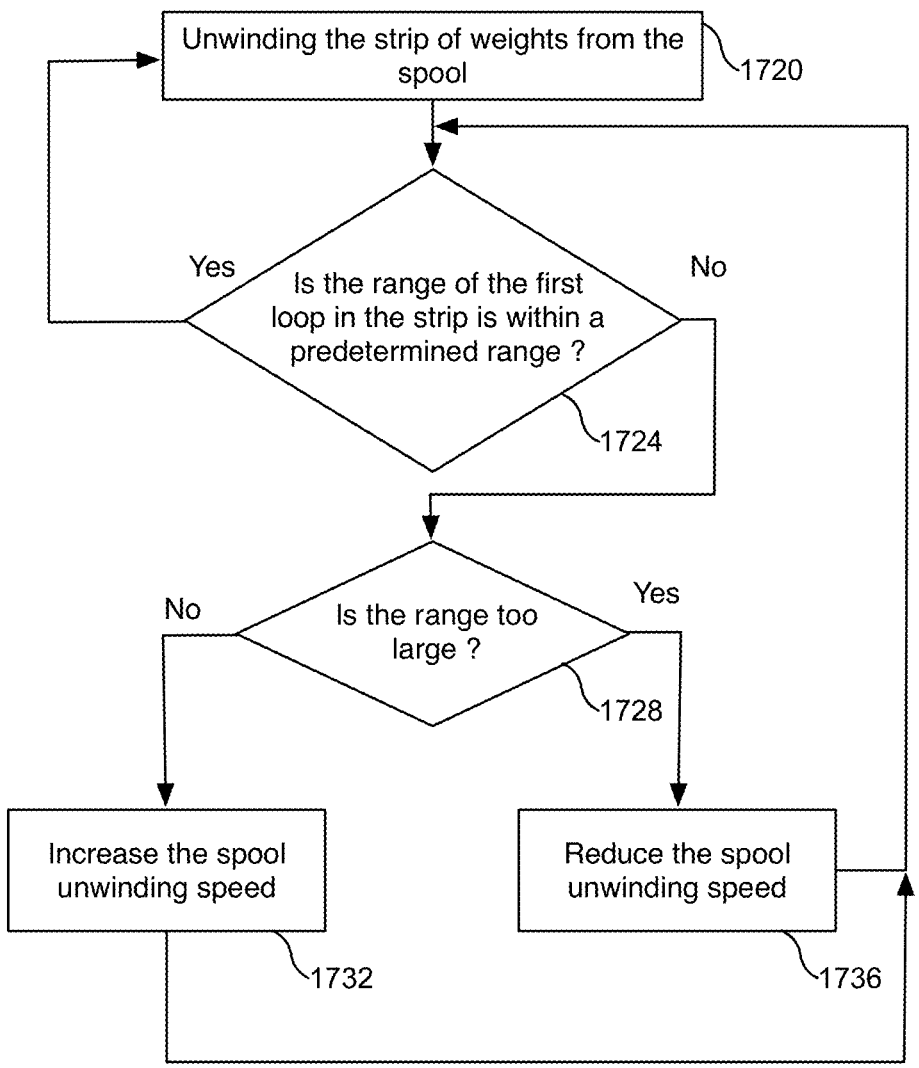
FIG. 48 is a flow chart of steps of a process in accordance with at least one embodiment of the invention.
Figure 49:
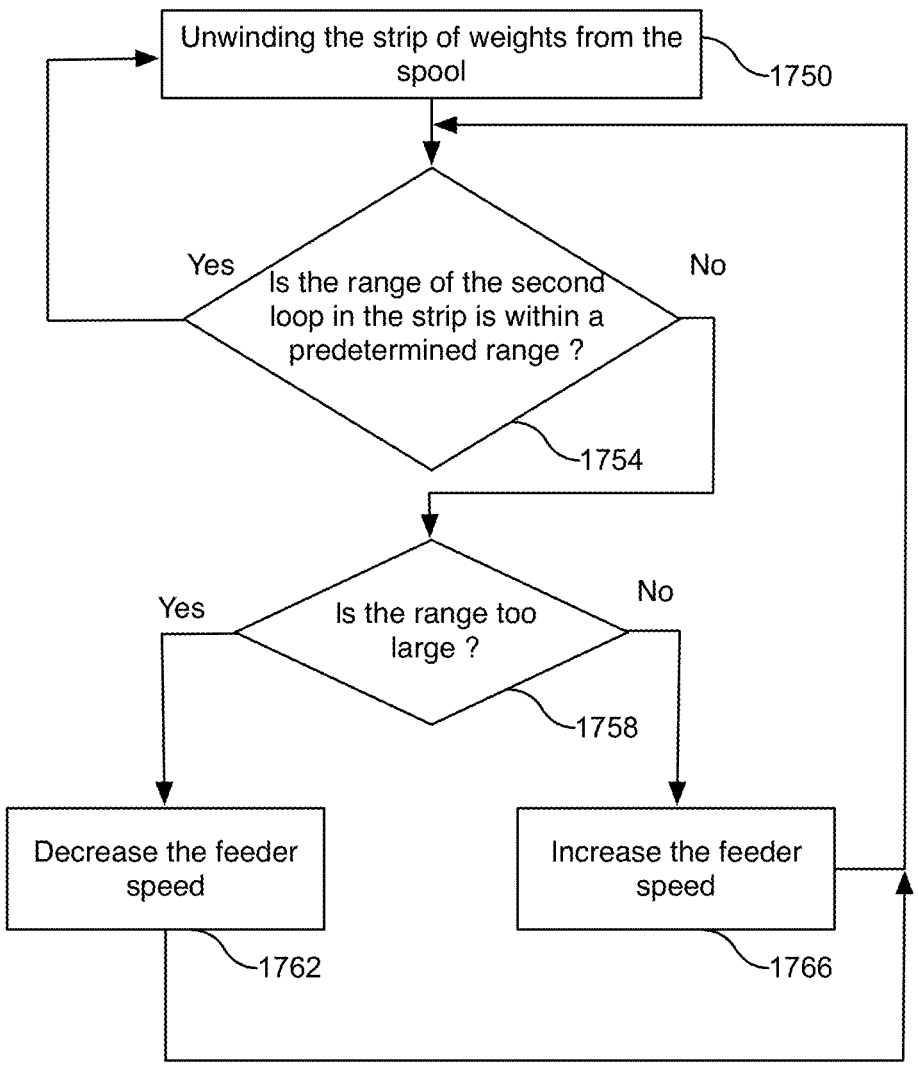
FIG. 49 is a flow chart of steps of a process in accordance with at least one embodiment of the invention.

Strip 74 accumulation loops 378, 386 described above are managed to keep a predetermined loop range. Steps 1720 to 1736 of FIG. 48 and steps 1750 to 1766 of FIG. 49 are exemplifying an embodiment of the invention.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A spool-supplying apparatus comprising:
   a spool support frame;
   a spool-supporting axle secured in cantilever, at a first end thereof, to the spool support frame, the spool-supporting axle being configured to support a plurality of axially-supported spools thereon, the plurality of spools axially engaging the spool-supporting axle through a second end thereof; and
   a spool unwinder operatively associated with the spool-supplying apparatus for unwinding a spool, the spool unwinder being configured to rotatably engage a first spool from the second end of the spool-supporting axle.

2. The spool-supplying apparatus of claim 1, wherein the spools on the spool-supporting axle includes, respectively, a strip of wheel-balancing weights wined thereon.

3. The spool-supplying apparatus of claim 2, wherein the strip of wheel-balancing weights is wined on the spool with a width of a single axial strip, layers of strip being wined on the spool over a previous layer of strip.

4. The spool-supplying apparatus of claim 1, further comprising a spool angular locating member operatively assembled to the spool-supplying apparatus for preventing rotation of the spools about the spool-supporting axle.

5. The spool-supplying apparatus of claim 1, further comprising a spool push member movable along the spool-supporting axle to push at least one spool on the spool-supporting shaft toward the second end of the spool-supporting axle.

6. The spool-supplying apparatus of claim 5, wherein the spool push member axially moves spools on the spool-supporting axle by increments of a spool thickness.

7. The spool-supplying apparatus of claim 1, wherein the spool unwinder is axially movable along the spool-supporting axle for radially aligning one of the plurality of spools on the spool-supporting axle.

8. The spool-supplying apparatus of claim 1, wherein the spool unwinder is managing an end of the strip to tread a new strip to feed an application module.

9. The spool-supplying apparatus of claim 1, wherein the spool contains between 8 kg and 10 kg of wheel-balancing weights thereon.

10. The spool-supplying apparatus of claim 1, wherein the plurality of spools includes an RFID and acknowledgement thereof by the spool-supplying apparatus is required before unwinding the at least one spool.

11. A spool-supplying apparatus kit comprising:
    a spool support module;
    a spool-supporting module including a spool-supporting axle secured in cantilever, at a first end thereof, to the spool support module, the spool-supporting axle being configured to support a plurality of axially-supported spools thereon, the plurality of spools axially engaging the spool-supporting axle through a second end thereof; and
    a spool unwinder module operatively associated with the spool-supplying apparatus for unwinding a spool, the spool unwinder being configured to rotatably engage a first spool from the second end of the spool-supporting axle.

12. The spool-supplying apparatus of claim 11, wherein the spools on the spool-supporting axle includes, respectively, a strip of wheel-balancing weights wined thereon.

13. The spool-supplying apparatus of claim 12, wherein the strip of wheel-balancing weights is wined on the spool with a width of a single axial strip, layers of strip being wined on the spool over a previous layer of strip.

14. The spool-supplying apparatus of claim 11, further comprising a spool angular locating module operatively assembled to the spool-supplying apparatus kit for preventing rotation of the spools about the spool-supporting axle.

15. The spool-supplying apparatus of claim 11, further comprising a spool push member module movable along the spool-supporting axle to push at least one spool on the spool-supporting axle toward the second end of the spool-supporting axle.

16. The spool-supplying apparatus of claim 15, wherein the spool push member axially moves spools along the spool-supporting axle by increments of a spool thickness.

17. The spool-supplying apparatus of claim 11, wherein the spool unwinder module is axially movable along the spool-supporting axle for radially aligning one of the plurality of spools on the spool-supporting axle.

18. The spool-supplying apparatus of claim 11, wherein the spool unwinder module is managing an end of the strip to tread a new strip to feed an application module.

19. The spool-supplying apparatus of claim 11, wherein the spool contains between 8 kg and 10 kg of wheel-balancing weights thereon.

20. The spool-supplying apparatus of claim 11, wherein the spool includes an RFID and acknowledgement thereof by the spool-supplying apparatus is required before unwinding the at least one spool.

* * * * *